United States Patent
Yoshida et al.

(10) Patent No.: US 9,129,262 B2
(45) Date of Patent: Sep. 8, 2015

(54) SHOP APPARATUS AND PURCHASER APPARATUS

(75) Inventors: Takuya Yoshida, Inagi (JP); Minako Tada, Komae (JP); Norikazu Hosaka, Fuchu (JP); Koji Okada, Tokyo (JP); Takehisa Kato, Fuchu (JP)

(73) Assignees: KABUSHIKI KAISHA TOSHIBA, Tokyo (JP); TOSHIBA SOLUTIONS CORPORATION, Tokyo (JP)

( * ) Notice: Subject to any disclaimer, the term of this patent is extended or adjusted under 35 U.S.C. 154(b) by 1871 days.

(21) Appl. No.: 11/963,138

(22) Filed: Dec. 21, 2007

(65) Prior Publication Data

US 2008/0177636 A1  Jul. 24, 2008

(30) Foreign Application Priority Data

Jan. 23, 2007  (JP) .................. 2007-012749

(51) Int. Cl.
  *G06Q 30/00*  (2012.01)
  *G06Q 30/06*  (2012.01)
  *G06Q 10/10*  (2012.01)

(52) U.S. Cl.
  CPC .......... *G06Q 10/107* (2013.01); *G06Q 30/0609* (2013.01); *G06Q 30/0615* (2013.01)

(58) Field of Classification Search
  USPC ..................................... 705/26–27
  See application file for complete search history.

(56) References Cited

U.S. PATENT DOCUMENTS

| | | | | |
|---|---|---|---|---|
| 5,703,949 A | * | 12/1997 | Rosen | 705/65 |
| 6,029,150 A | * | 2/2000 | Kravitz | 705/39 |
| 6,299,062 B1 | * | 10/2001 | Hwang | 235/379 |
| 6,317,729 B1 | * | 11/2001 | Camp et al. | 705/79 |
| 6,539,364 B2 | * | 3/2003 | Moribatake et al. | 705/69 |

(Continued)

FOREIGN PATENT DOCUMENTS

| | | |
|---|---|---|
| JP | 2004-54905 | 2/2004 |
| JP | 2004-320562 | 11/2004 |

(Continued)

OTHER PUBLICATIONS

Enzmann, M., & Schneider, M. (2005). Improving customer retention in E-commerce through a secure and privacy-enhanced loyalty system. Information Systems Frontiers, 7(4-5), 359-370. doi:http://dx.doi.org/10.1007/s10796-005-4808-2 [recovered from ProQuest on Mar. 14, 2014].*

(Continued)

*Primary Examiner* — Kathleen G Palavecino
(74) *Attorney, Agent, or Firm* — Oblon, McClelland, Maier & Neustadt, L.L.P.

(57) ABSTRACT

A purchaser apparatus stores "anonymous order information including an order ID and purchaser identity verifying information" and "purchaser identity proving secret information". A shop apparatus stores "anonymous order information including an order ID and purchaser identity verifying information". If necessary, a purchaser sends a request including an order ID and zero knowledge proving information that a purchaser knows the purchaser identity proving secret information, from a purchaser apparatus to a shop apparatus. A shop apparatus verifies the zero knowledge proving information, based on purchaser identity verifying information retrieved from an order ID included in the request. Therefore, the unlinkability for past use is eliminated if necessary, and inconvenience caused by the unlinkability is eliminated.

4 Claims, 34 Drawing Sheets

(56) References Cited

U.S. PATENT DOCUMENTS

| | | | |
|---|---|---|---|
| 6,708,157 B2* | 3/2004 | Stefik et al. | 705/59 |
| 6,807,530 B1* | 10/2004 | Shub et al. | 705/1.1 |
| 7,069,249 B2* | 6/2006 | Stolfo et al. | 705/74 |
| 2001/0011351 A1* | 8/2001 | Sako | 713/180 |
| 2001/0029472 A1* | 10/2001 | Hataguchi | 705/26 |
| 2002/0004900 A1* | 1/2002 | Patel | 713/155 |
| 2002/0116337 A1* | 8/2002 | Peled et al. | 705/51 |
| 2002/0120530 A1* | 8/2002 | Sutton et al. | 705/26 |
| 2003/0140225 A1* | 7/2003 | Banks et al. | 713/155 |
| 2003/0163416 A1* | 8/2003 | Kitajima | 705/39 |
| 2004/0073814 A1* | 4/2004 | Miyazaki et al. | 713/202 |
| 2007/0136823 A1 | 6/2007 | Miyazaki et al. | |
| 2007/0255661 A1 | 11/2007 | Yoshida et al. | |

FOREIGN PATENT DOCUMENTS

| | | |
|---|---|---|
| JP | 2006-119771 | 5/2006 |
| KR | 10-0555096 | 2/2006 |

OTHER PUBLICATIONS

David Chaum, et al., "Group Signatures", EUROCRYPT '91, LNCS 547, 1991, pp. 257-265.

Giuseppe Ateniese, et al., "A Practical and Provably Secure Coalition-Resistant Group Signature Scheme", CRYPTO 2000, LNCS 1880, 2000, 16 Pages.

A. Miyaji, et al., "Information Security", OHM, ISBN4-274-13284, pp. 112-114.

* cited by examiner

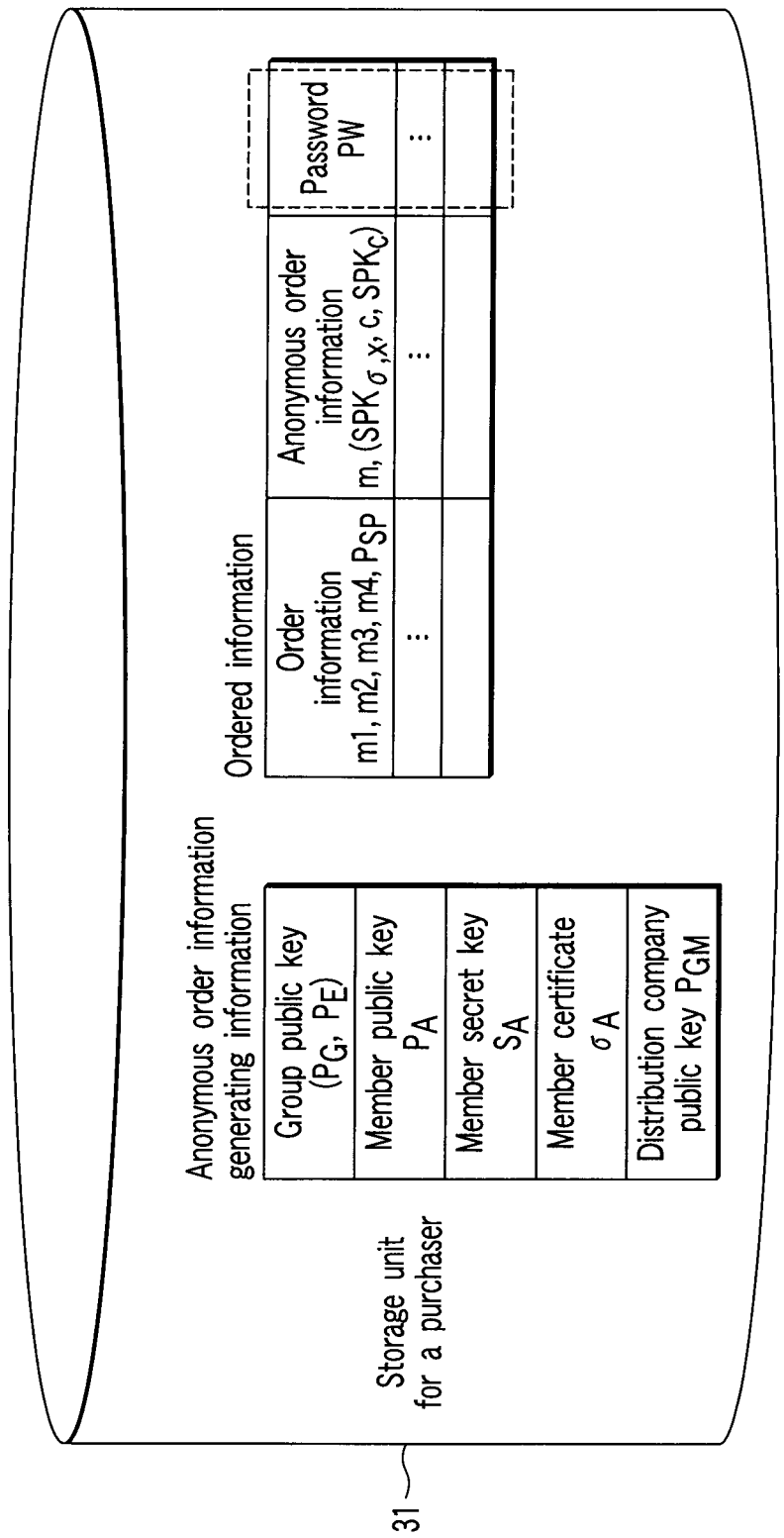
F I G. 5

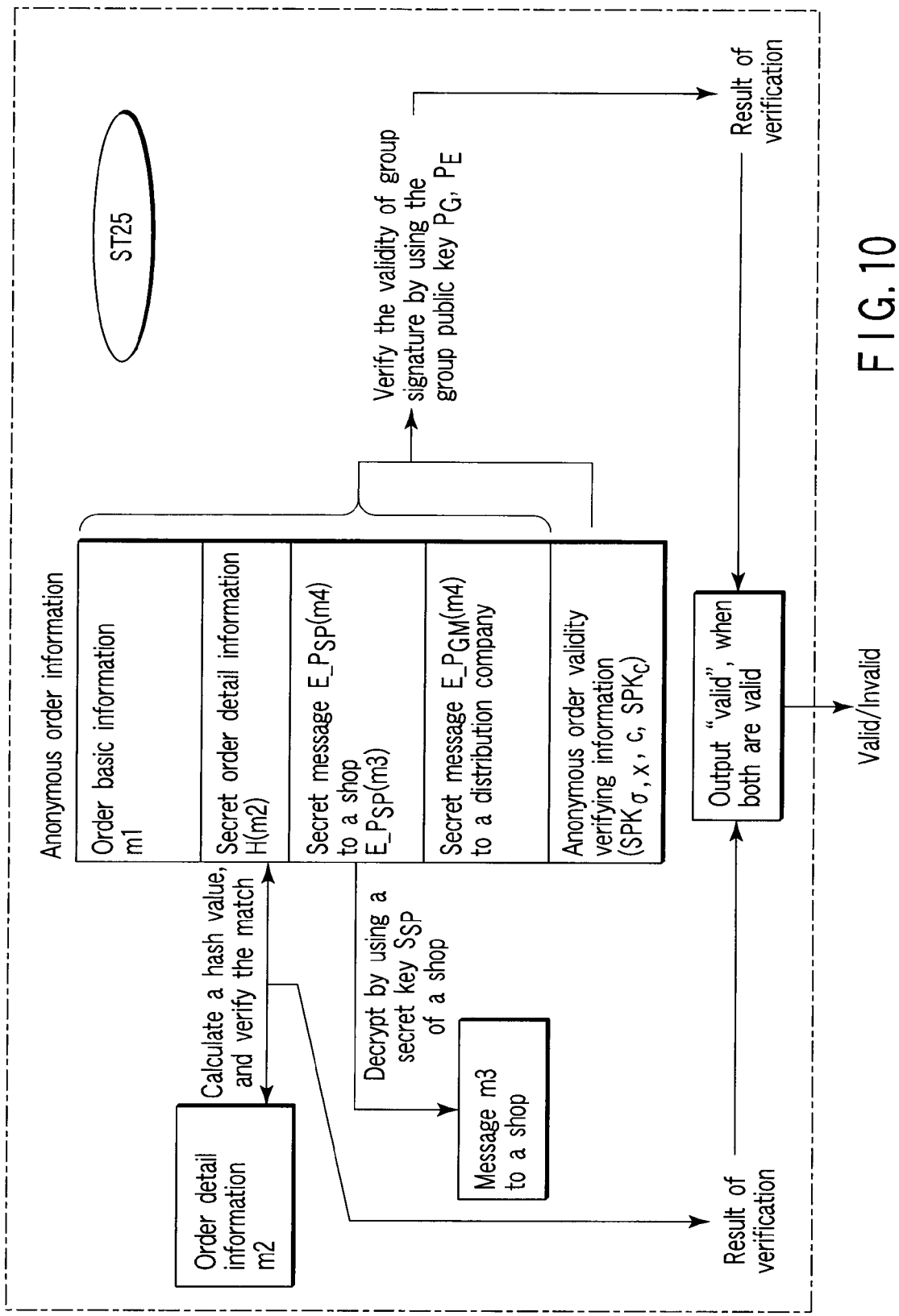
F I G. 10

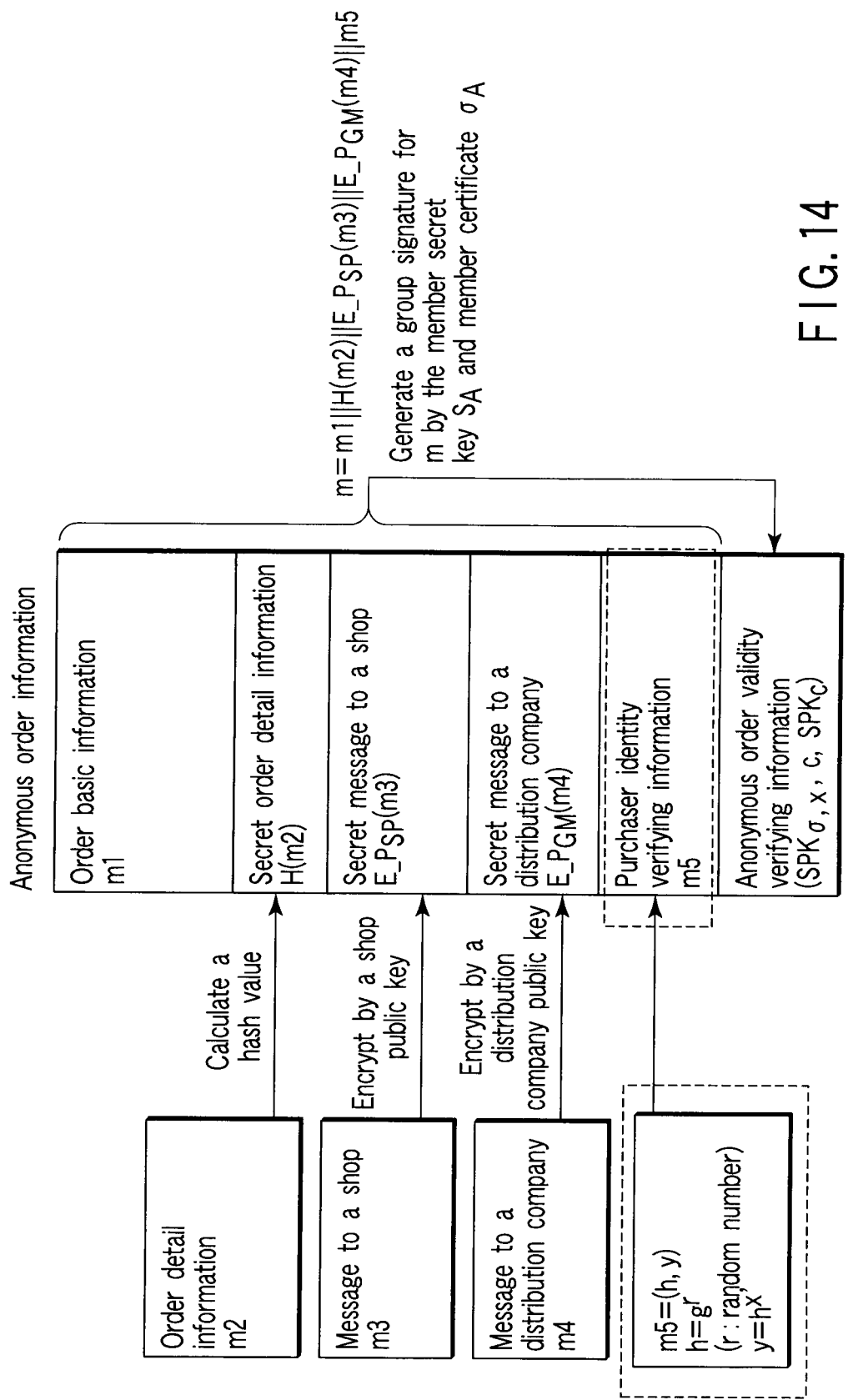
F I G. 14

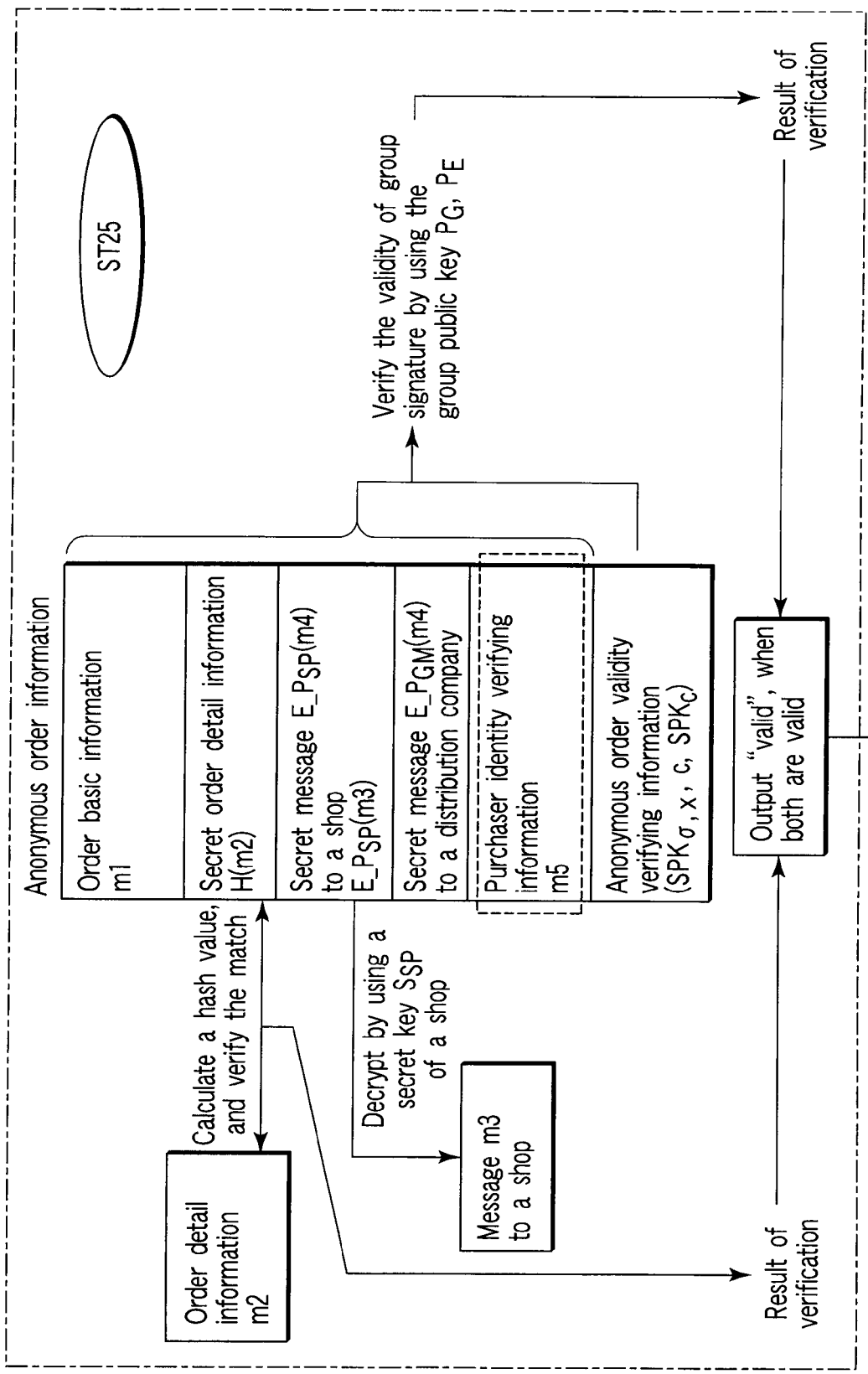
F I G. 17

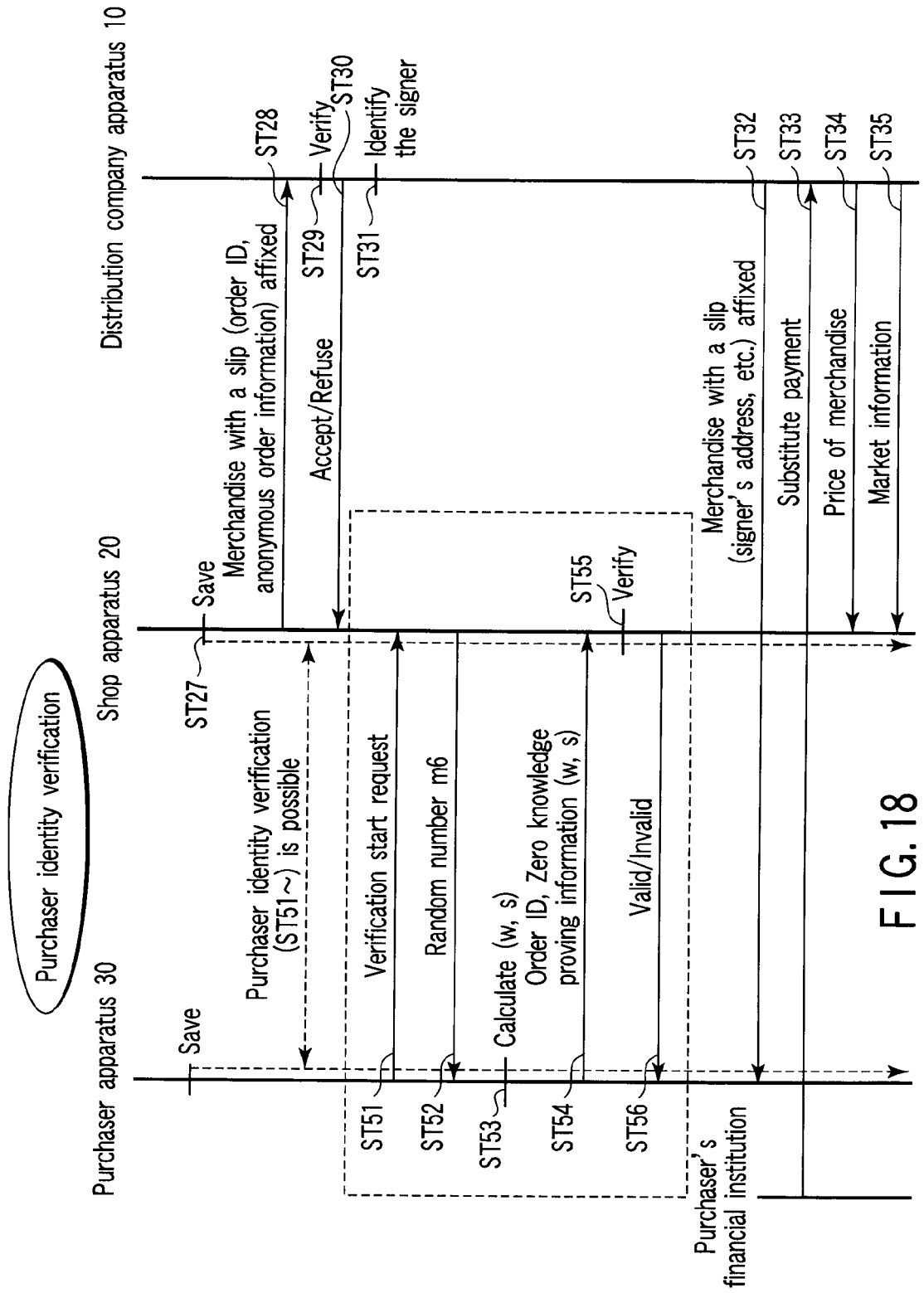
F I G. 18

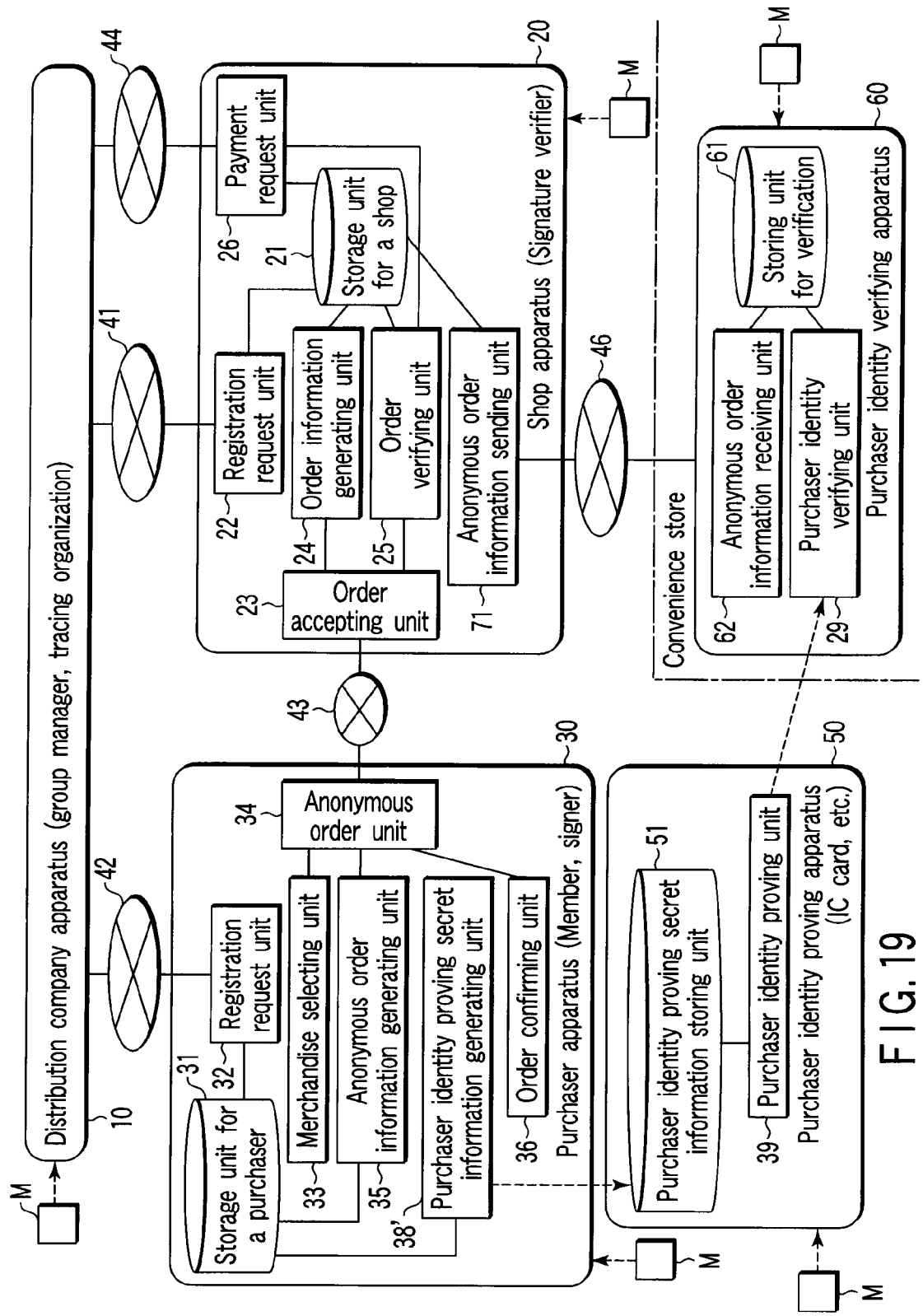
F I G. 19

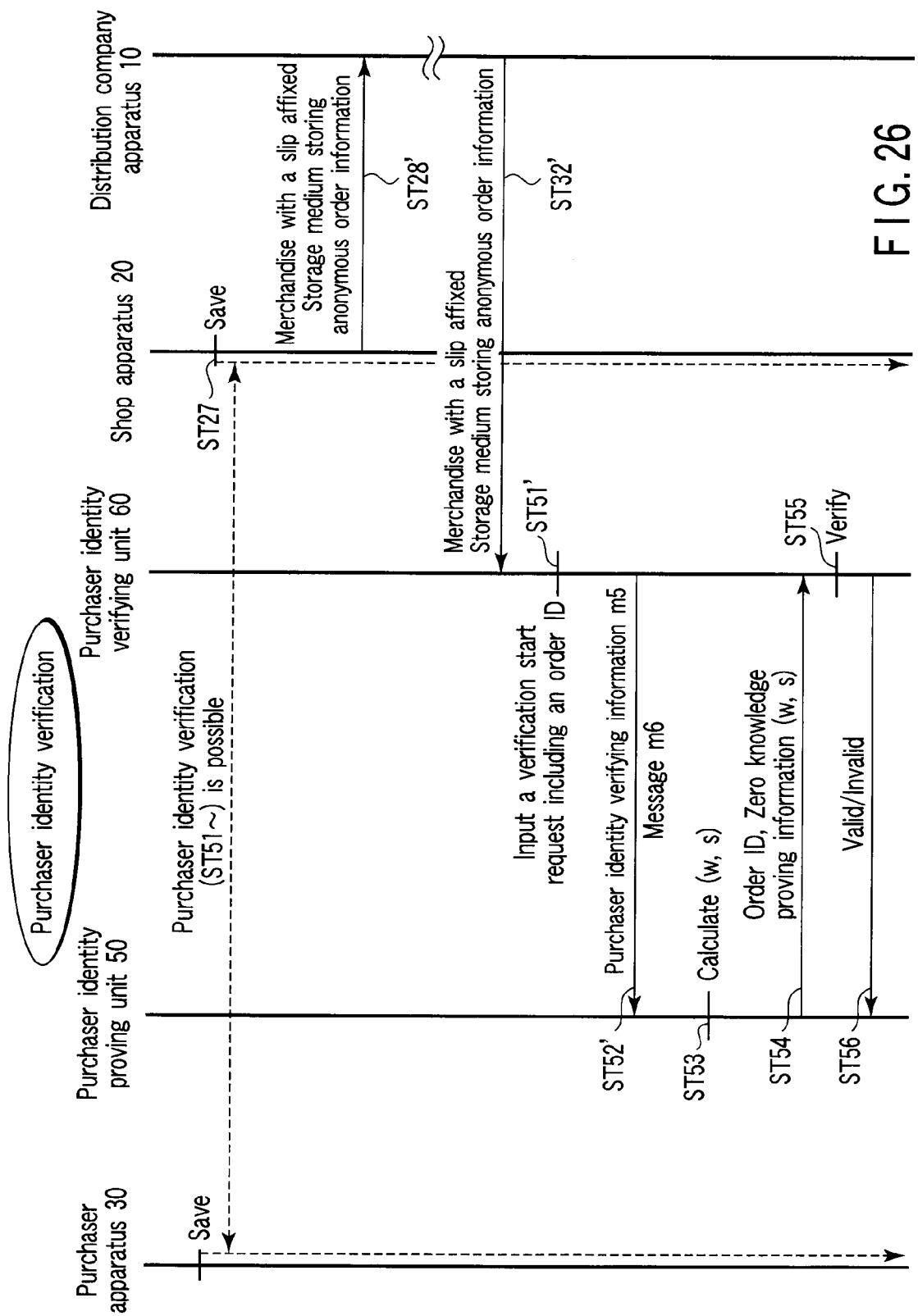
F I G. 26

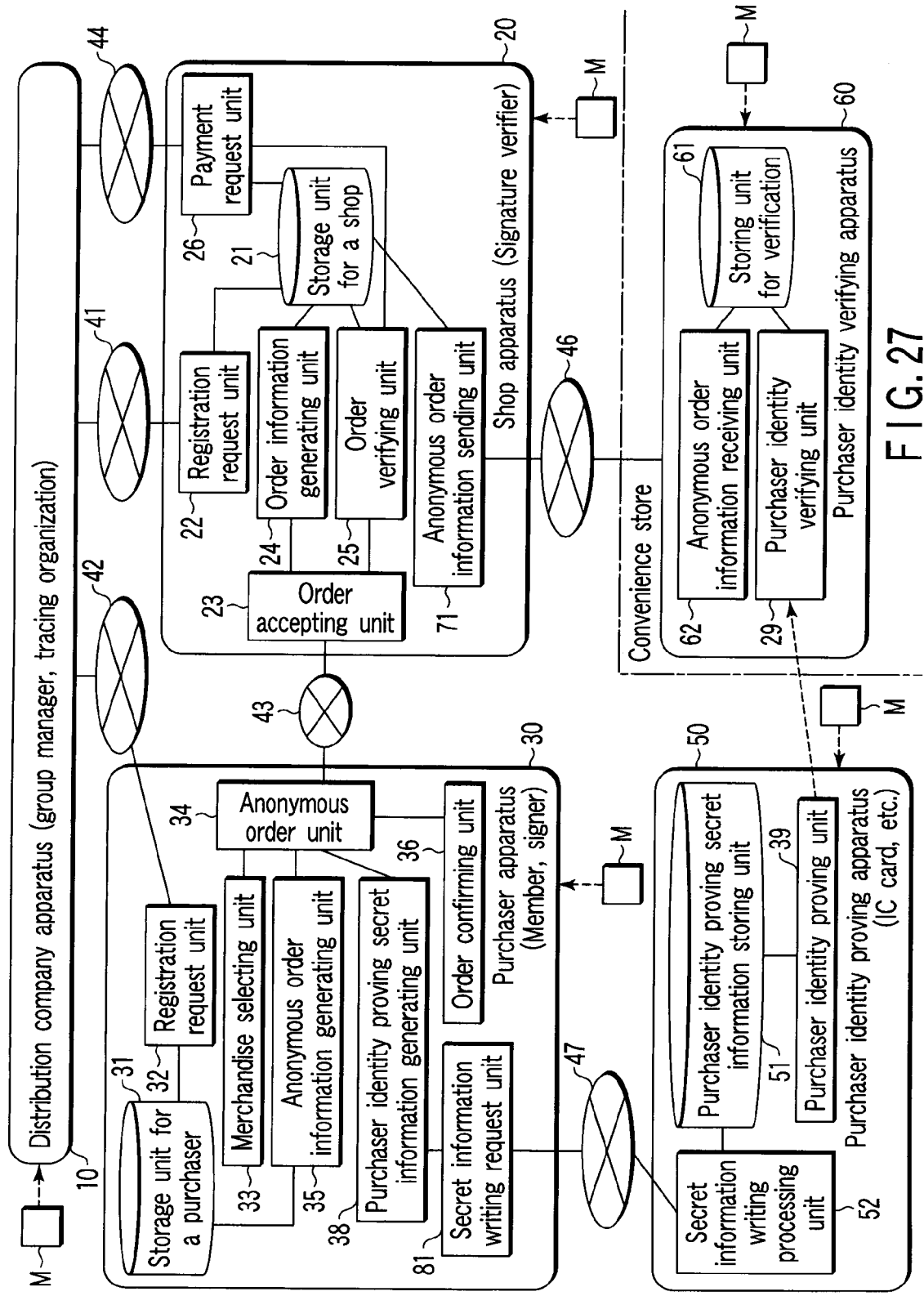
F I G. 27

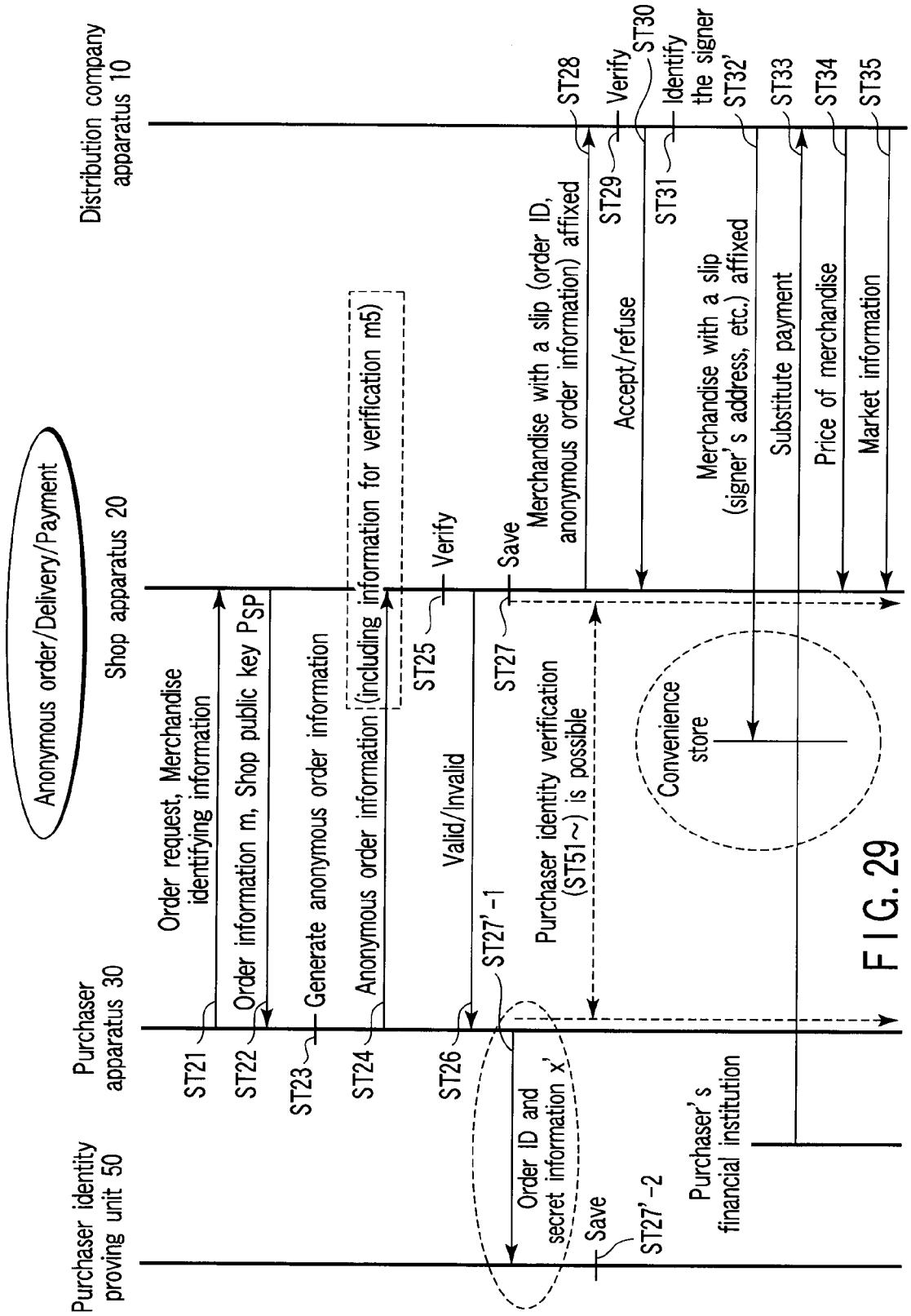
F I G. 29

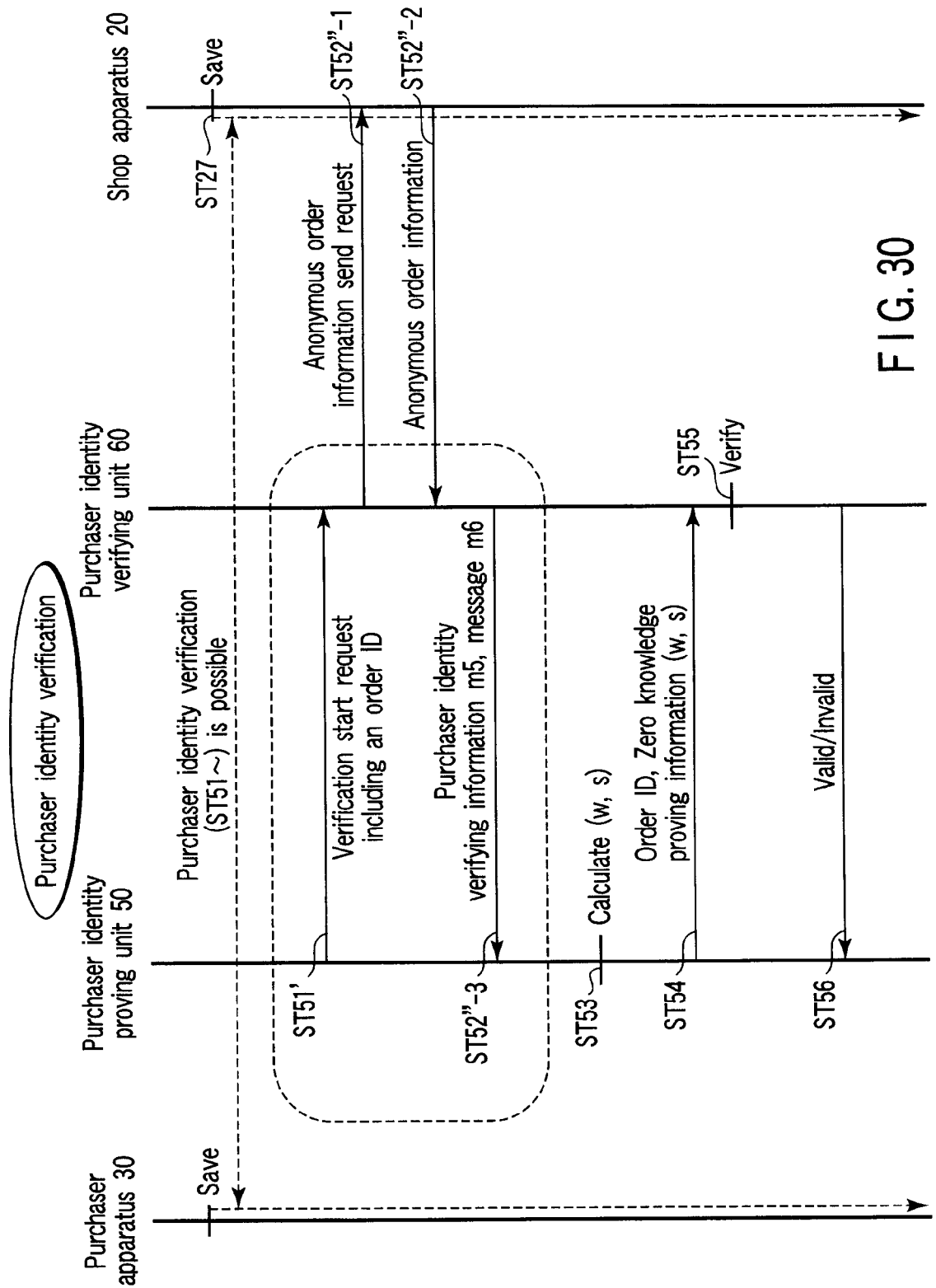
F I G. 30

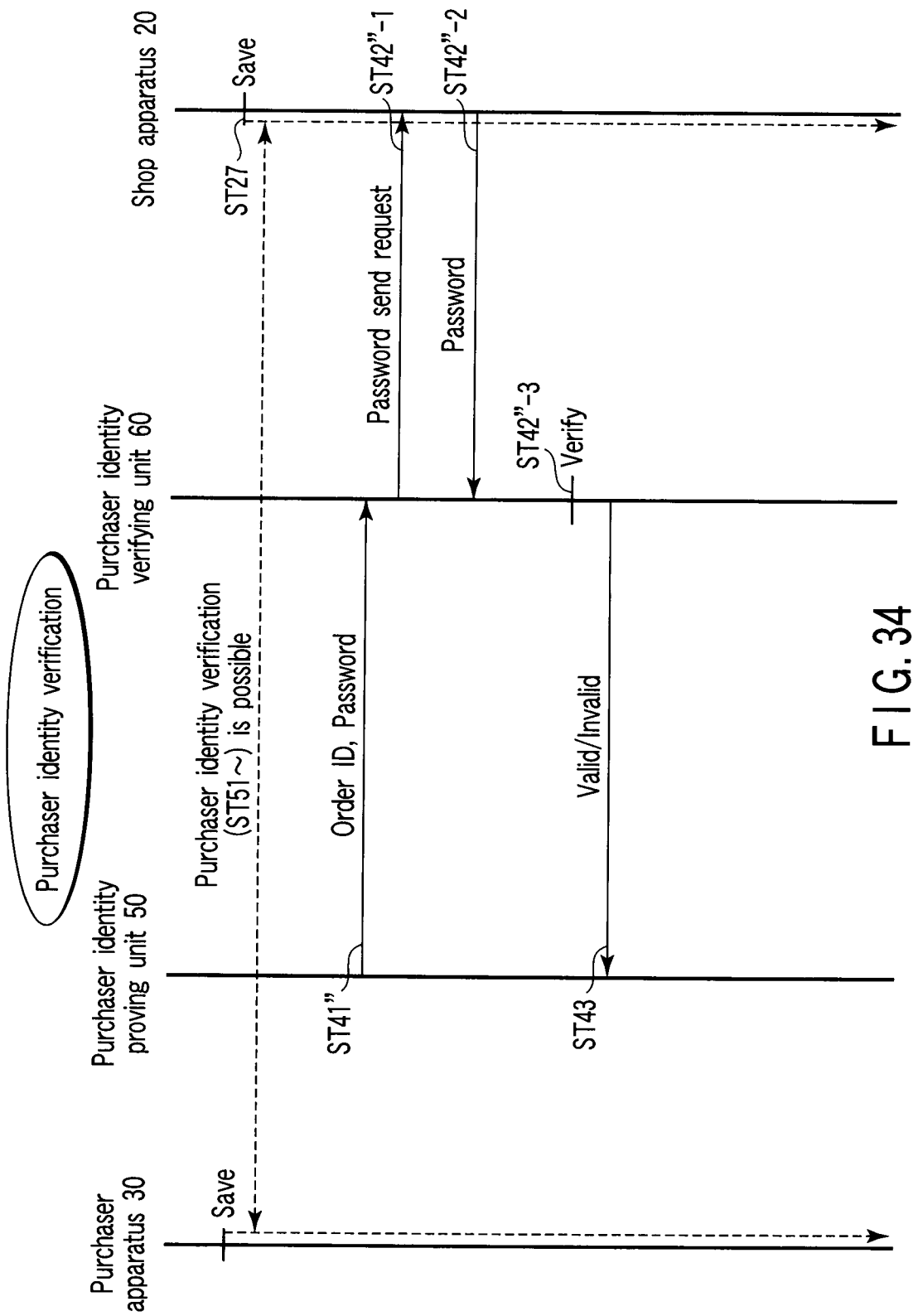
F I G. 34

SHOP APPARATUS AND PURCHASER APPARATUS

CROSS-REFERENCE TO RELATED APPLICATIONS

This application is based upon and claims the benefit of priority from prior Japanese Patent Application No. 2007-012749, filed Jan. 23, 2007, the entire contents of which are incorporated herein by reference.

BACKGROUND OF THE INVENTION

1. Field of the Invention

The present invention relates to a shop apparatus for an anonymous order, a purchaser apparatus, a purchaser identity proving apparatus, and a purchaser identity verifying apparatus using a group signature scheme.

2. Description of the Related Art

In the field of providing online sales service, techniques using a group signature scheme (for example, D. Chaum, E. Van Heyst, "Group Signatures", EUROCRYPT '91, LNCS 547, Springer-Verlag, pp. 257-265, 1991, G Ateniese, J. Camenisch, M. Joye and G. Tsudik, "A Practical and Provably Secure Coalition-Resistant Group Signature Scheme", CRYPT 2000, LNCS 1880, Springer-Verlag, pp. 255-270, 2000. Atsuko Miyaji, Hiroaki Kikuchi, "Information Security", Ohm, ISBN4-274-13284, pp. 112-114) has been proposed from the viewpoint of realizing protection of personal information and privacy (for example, Jpn. Pat. Appln. KOKAI Publication No. 2004-054905, 2004-320562 and 2006-119771).

In the proposed techniques, protection of personal information and privacy of users is realized by anonymity and unlinkability. Anonymity mentioned here refers to the property that prevents disclosure of personal identity. Unlinkability refers to the property of the inability to judge whether two different authentication requests are made by the same user.

The proposed techniques have traceability, and realize separate payments for each service in a usual operation and specification of an unauthorized user upon occurrence of an illegal access, at the same time. Traceability is a function in which only a predetermined personal information managing organization other than a service provider can identify a user.

However, although unlinkability is an important property from the viewpoint of protection of personal information and privacy, it may cause inconvenience to a service provider. For example, when a user wants to inquire about or return purchased goods and services, as unlinkability is given to the purchased goods and services, such user's requests may not be directly handled only between the user and service provider. Further, when the same user repeatedly uses the same service provider, as unlinkability is given to the purchased goods and services, the number of times the user uses the service provider is unknown. This means that benefits such as offering point services or the gathering of market information regarding usage cannot be carried out.

In the service providing systems used prior to the above-mentioned proposed techniques, as a person is always identified, although actions to inquire/request return of merchandise and provision of point service are easy to provide, protection of personal information and privacy is difficult to realize.

In the above proposed techniques, as unlinkability is always maintained, a high level of protection of personal information and privacy can be realized. On the other hand, having unlinkability may make it difficult to inquire based on past use or request to return merchandise, or provide point service based on past use.

BRIEF SUMMARY OF THE INVENTION

It is an object of the invention to provide a shop apparatus, a purchaser apparatus, a purchaser identity proving apparatus, and a purchaser identity verifying apparatus, which are configured to eliminate unlinkability for past use when necessary, and to eliminate inconvenience caused by unlinkability.

In a first aspect of the present invention, there is provided a shop apparatus configured to communicate with both of a manager apparatus configured to pay for a purchaser's anonymous order by a group signature scheme having a tracing function, and a purchaser apparatus for making an anonymous order for a sales object by the group signature scheme. The shop apparatus includes a storage device, an order ID issuing device, a signature verifying device, an anonymous order information writing device, an anonymous order sending device, a retrieving device, a zero knowledge verifying device, and a request accepting device. The storage device is configured to store anonymous order information, when the anonymous order information is received from the purchaser apparatus. The anonymous order information includes an order ID, purchaser identity verifying information and a group signature. The purchaser identity verifying information is generated based on purchaser identity proving secret information corresponding to the order ID and cannot be estimated. The purchaser identity proving secret information cannot be estimated from the manager apparatus and shop apparatus even based on the purchaser identity verifying information. The group signature is generated based on the order ID and the purchaser identity verifying information. The purchaser identity proving secret information, the purchaser identity verifying information and the group signature are generated by the purchaser apparatus.

The order ID issuing device is configured to issue the order ID based on sales object identifying information received from the purchaser apparatus of the purchaser, and to send the order ID to the purchaser apparatus. The signature verifying device is configured to verify a the group signature in the anonymous order information, when the anonymous order information is received from a purchaser apparatus. An anonymous order information writing device is configured to write the anonymous order information into the storage device, when the result of verifying the group signature is valid, The anonymous order sending device is configured to send the anonymous order information to the manager apparatus, The retrieving device is configured to retrieve the purchaser identity verifying information concerning a past order ID in a first request from the storage device, when the first request is received from the purchaser apparatus. The first request includes the past order ID and first zero knowledge proving information that the purchaser knows the purchaser identity proving secret information corresponding to the past order ID. The zero knowledge verifying device is configured to verify the first zero knowledge proving information, based on the retrieved purchaser identity verifying information. The request accepting device is configured to accept the first request, when the result of verifying the first zero knowledge proving information is valid.

In a second aspect of the present invention, there is provided a purchaser apparatus configured to communicate with both of a manager apparatus configured to pay for a purchaser's anonymous order by a group signature scheme having a tracing function, and a shop apparatus for accepting an anonymous order for a sales object by the group signature scheme. The purchaser apparatus includes a storage device, an anonymous order generating device, an anonymous order sending device, a retrieving device, a zero knowledge proof generating device, a request generation device, and a request sending device. The storage device is configured to store past anonymous order information and purchaser identity proving secret information being correlated with each other, the past anonymous order information including an order ID, purchaser identity verifying information corresponding to the order ID, and a group signature. The purchaser identity proving secret information cannot be estimated from the manager apparatus and the shop apparatus even based on the purchaser identity verifying information generated based on the purchaser identity proving secret information. The anonymous order generating device is configured to generate the anonymous order information including the order ID, the purchaser identity verifying information and the group signature, by the operation of the purchaser, when the order ID is received from the shop apparatus. The anonymous order sending device sends the generated anonymous order information to the shop apparatus. The retrieving device which is configured to retrieve the purchaser identity proving secret information concerning a past order ID from the storage device, by the operation of the purchaser. The zero knowledge proof generating device is configured to generate first zero knowledge proving information that the purchaser knows the purchaser identity proving secret information corresponding to the past order ID. The request generating device is configured to generate a first request including the past order ID and the first zero knowledge proving information, by the operation of the purchaser. The request sending device is configured to send the first request to the shop apparatus.

In a third aspect of the present invention, there is provided a purchaser identity proving unit to hold purchaser identity proving secret information written from a purchaser apparatus configured to communicate with both of a manager apparatus configured to pay for a purchaser's anonymous order by a group signature scheme having a tracing function, and a shop apparatus for receiving an anonymous order for a sales object by the group signature scheme, the purchaser identity proving unit including a secret information storing device, a zero knowledge proof generating device, a request generating device, and a request sending device. The secret information storing device is configured to store purchaser identity proving secret information written from the purchaser apparatus upon initial setting. The zero knowledge proof generating device is configured to be used independently of the purchaser apparatus, and to generate zero knowledge proving information that the purchaser identity proving secret information concerning one or more pieces of past order ID is common and the purchaser knows the purchaser identity proving secret information, based on the purchaser identity proving secret information in the secret information storing device The purchaser apparatus receives an order ID from the shop apparatus, generates anonymous order information based on a secret calculation value that is calculated from the purchaser identity proving secret information upon initial setting and held, and sends the generated anonymous information to the shop apparatus, the generated anonymous order information including the order ID, purchaser identity verifying information corresponding to the order ID, and a group signature. The purchaser identity proving secret information cannot be estimated from the manager apparatus and the shop apparatus even based on the purchaser identity verifying information generated based on the purchaser identity proving secret information. The request generating device is configured to generate a request including the one or more pieces of past order ID and zero knowledge proving information. The request sending device is configured to send the request to a purchaser identity verifying unit configured to obtain anonymous order information from the shop apparatus.

In a fourth aspect of the present invention, there is provided a purchaser apparatus is configured to communicate with a manager apparatus configured to pay for a purchaser's anonymous order by a group signature scheme having a tracing function, a shop apparatus for receiving an anonymous order for a sales object by the group signature scheme, and a purchaser identity proving unit for receiving the anonymously ordered sale object, and configured to write purchaser identity proving secret information into a purchaser identity proving unit upon initial setting. The purchaser apparatus includes a storage device, a device, an anonymous order generating device and an anonymous order sending device. The storage device is configured to store past anonymous order information and a secret calculation value correlated with each other. The past anonymous order information includes an order ID, purchaser identity verifying information, and a group signature. The secret calculation value is calculated from the purchaser identity proving secret information corresponding to the order ID and generated upon initial setting. The device is configured to write the purchaser identity proving secret information into the purchaser identity proving unit, and to write the secret calculation value into the storage device, upon the initial setting. The anonymous order generating device is configured to generate anonymous order information including an order ID, purchaser identity verifying information and a group signature, based on the secret calculation value, by the operation of the purchaser, upon reception of the order ID from the shop apparatus. The anonymous order sending device is configured to send obtained anonymous order information to the shop apparatus. The purchaser identity proving unit generates zero knowledge proving information that the purchaser identity proving secret information concerning one or more pieces of past order ID is common and the purchaser knows the purchaser identity proving secret information, based on previously stored purchaser identity proving secret information, upon reception of the sales object, and sends a request including the one or more past order ID and the zero knowledge proving information to a purchaser identity verifying unit configured to obtain anonymous order information from the shop apparatus.

In a fifth aspect of the present invention, there is provided a purchaser identity verifying unit configured to obtain anonymous order information from a shop apparatus configured to communicate with both of a manager apparatus configured to pay for a purchaser's anonymous order by a group signature scheme having a tracing function, and a purchaser apparatus for making an anonymous order for a sales object by the group signature scheme.

The purchaser identity verifying unit includes a first device, a storing device a second device a zero knowledge verifying device, and a request accepting device. The first device is configured to read one or more pieces of anonymous order information corresponding to one or more past order ID input after the anonymous order, from the shop apparatus. The storing device is configured to store the one or more pieces of anonymous order information read from the shop apparatus. The second device is configured to accept a request including the one or more past order ID and zero knowledge proving information that purchaser identity proving secret information corresponds to the one or more past order ID is common and that the purchaser knows the purchaser identity proving secret information, from the purchaser identity proving unit, the purchaser proving secret information being written from the purchaser apparatus upon initial setting into the purchaser identity proving unit. The zero knowledge verifying device is configured to verify the zero knowledge proving information, based on one or more pieces of purchaser identity verifying information included in one or more pieces of anonymous order information in the storing device, upon acceptance of the request. The request accepting device is configured to accept the request, when the result of verifying the zero knowledge proving information is valid. The shop apparatus issues an order ID based on sales object identifying information received from the purchaser apparatus, and sends the order ID to the purchaser apparatus. When anonymous order information is received from the purchaser apparatus, the anonymous order information includes the order ID, the purchaser identity verifying information and the group signature based on the order ID. The shop apparatus verifies the group signature, and when the result of verification is valid, stores the anonymous order information, and sends the anonymous order information to the manager apparatus. The purchaser identity verifying information is generated based on the purchaser identity proving secret information corresponding to the order ID and cannot be estimated. The purchaser identity proving secret information corresponding to the order ID cannot be estimated from the manager apparatus and the shop apparatus even based on the purchaser identity verifying information.

In first and second aspects of the invention, a purchaser apparatus stores "anonymous order information including an order ID and purchaser identity verifying information" and "purchaser identity proving secret information". A shop apparatus stores "anonymous order information including an order ID and purchaser identity verifying information". If necessary, a purchaser sends a request including an order ID and zero knowledge proving information that a purchaser knows the purchaser identity verifying secret information, from a purchaser apparatus to a shop apparatus. A shop apparatus verifies the zero knowledge proving information, based on the purchaser identity verifying information retrieved from an order ID included in this request. Therefore, the unlinkability for past use can be eliminated when necessary, and the inconvenience caused by the unlinkability can be eliminated.

In third to fifth aspects of the invention, a purchaser apparatus stores "anonymous order information including an order ID and purchaser identity verifying information" and "a secret calculation value calculated from purchaser identity proving secret information". A purchaser identity proving apparatus stores "purchaser identity proving secret information". A shop apparatus stores "anonymous order information including an order ID and purchaser identity verifying information". If necessary, a purchaser sends a request including one or more pieces of order ID and zero knowledge proving information that purchaser identity proving secret information is common and that a purchaser knows it, from a purchaser identity proving apparatus to a purchaser identity verifying apparatus. A purchaser identity verifying apparatus requests one or more pieces of anonymous order information corresponding to one or more pieces of order ID included in this request, from a shop apparatus, and verifies the zero knowledge proving information proving information based on one or more pieces of purchaser identity verifying information included in the obtained one or more pieces of anonymous order information. Therefore, the unlinkability for past use can be eliminated when necessary, and the inconvenience caused by the unlinkability can be eliminated. Further, as an apparatus for separating an anonymous order from an apparatus for receiving merchandise, the application range of an anonymous order can be enlarged, for example by a function of receiving merchandise anonymously ordered from home at a convenience store. Further, security for reception of merchandise by an illegal anonymous order can be improved.

BRIEF DESCRIPTION OF THE SEVERAL VIEWS OF THE DRAWING

FIG. 5 is a schematic diagram showing the configuration of a storage unit for a purchaser in the same embodiment;

FIG. 10 is a schematic diagram for explaining an anonymous order verifying process in the same embodiment;

FIG. 14 is a schematic diagram for explaining anonymous order information, etc. in the same embodiment;

FIG. 17 is a schematic diagram showing an anonymous order verifying process in the same embodiment;

FIG. 18 is a sequence diagram for explaining the operation of a purchaser identity verifying process in the same embodiment;

FIG. 19 is a schematic diagram showing the configuration of an anonymous order system according to a fourth embodiment;

FIG. 26 is a sequence diagram for explaining the operation of a purchaser identity verifying process of the same modification;

FIG. 27 is a schematic diagram showing the configuration of an anonymous order system according to a second modification of the fourth embodiment of the invention;

FIG. 29 is a sequence diagram for explaining the operations of an anonymous order, delivery and payment of the same modification;

FIG. 30 is a sequence diagram for explaining the operation of a purchaser identity verifying process in the same modification;

FIG. 34 is a sequence diagram for explaining the operation of another purchaser identity verifying process in the same modification;

DETAILED DESCRIPTION OF THE INVENTION

Figure 1:
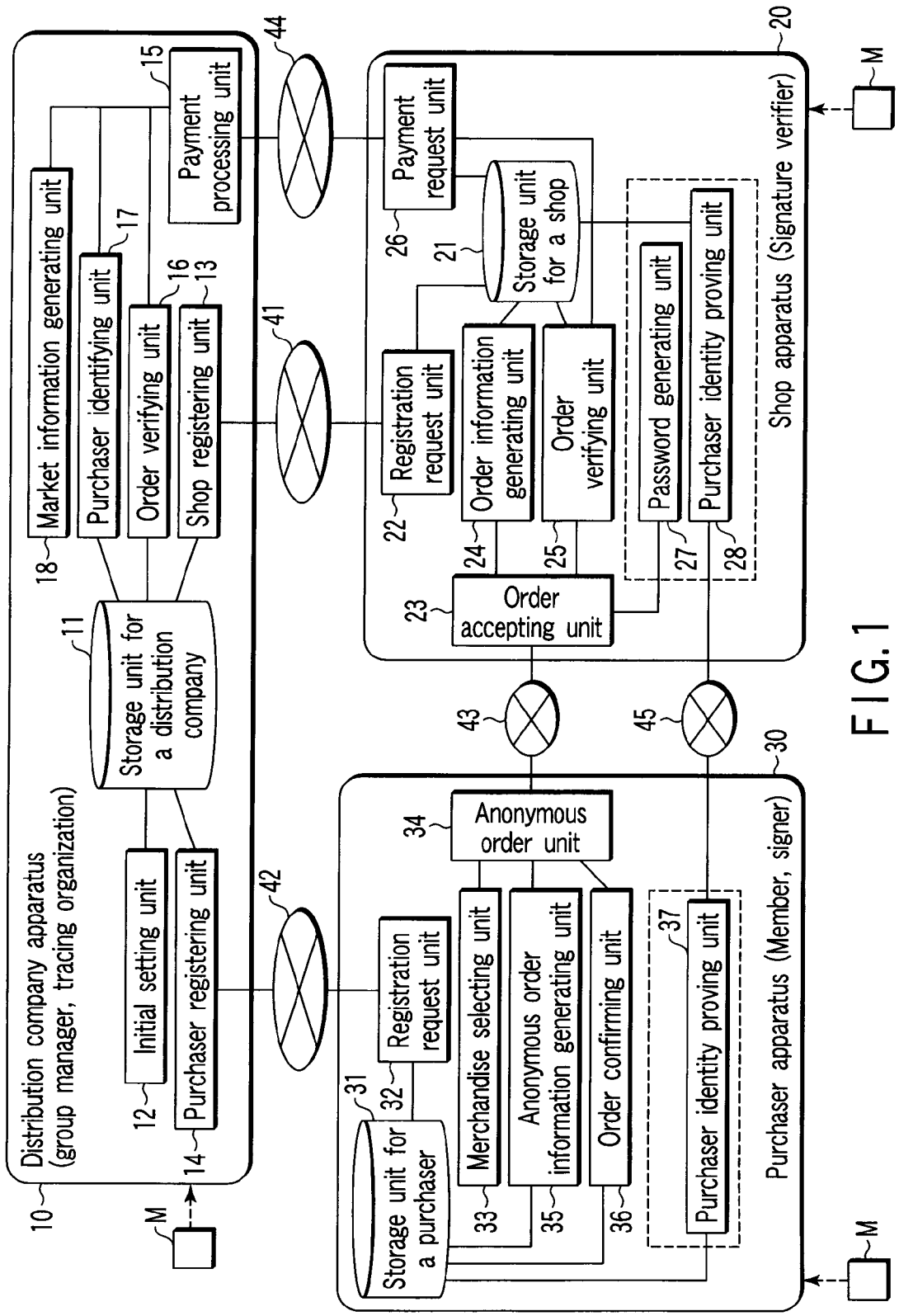
FIG. 1 is a schematic diagram showing the configuration of an anonymous order system according to a first embodiment of the invention.
Figure 2:
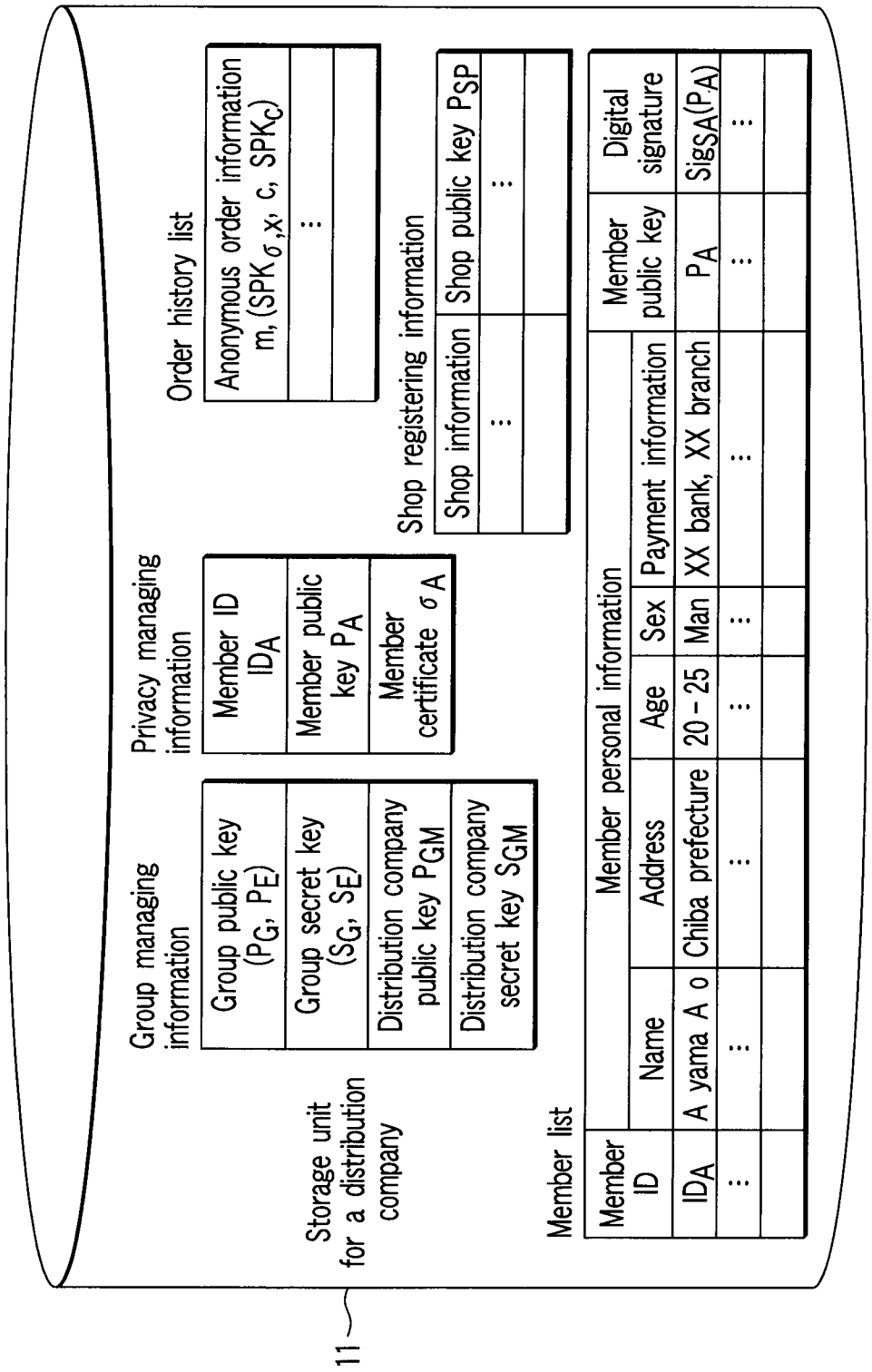
FIG. 2 is a schematic diagram showing the configuration of a storage unit for a distribution company in the same embodiment.

Embodiments of the invention will be explained hereinafter with reference to the accompanying drawings. The embodiments will be explained as examples applied to the anonymous order system described in Jpn. Pat. Appln. KOKAI Publication No. 2006-119771. The embodiments are not to be limited to this, and are applicable to the access control system described in Jpn. Pat. Appln. KOKAI Publication No. 2004-054905, and the anonymous order authentication system described in Jpn. Pat. Appln. KOKAI Publication No. 2004-320562. In addition, the embodiments described hereinafter are not limited to the systems described in these three patent applications, and are applicable to any other systems using user authentification based on a group signature scheme.

Before explaining each embodiment, an explanation will be given on the group signature scheme (Mitsuko Miyaji, Hiroaki Kikuchi, "Information Security", Ohmu, ISBN4-274-13284-6, pp. 112-114), which is a precondition for the anonymous order system described in Jpn. Pat. Appln. KOKAI Publication No. 2006-119771, as a standard example. The following table 1 shows standard symbols and their explanations in the group signature scheme.

TABLE 1

| Symbols | Explanation |
| --- | --- |
| SPK | Signature based on a proof of knowledge |
| α, β | Parameters satisfying the predicate |
| m | Message |
| ε | Constant to define the probability of permitting forgery |
| H( ) | Hash function |
| k | Bit length after calculating a hash function |
| g | Generation source of a multiplicative group |
| G | Multiplicative group: G = <g> |
| L | Order of the generator g |
| y | Public key of a signer, Source of the multiplicative group G: y ∈ G |
| x | Secret key of a signer: $y = g^x$ |
| r | Random number |
| u | Result of calculation of a signer; $u = g^r$, etc. |
| e | Result of calculation of hash function: e = H(g∥y∥u∥m) |
| v | Result of calculation of a signer: v = r − ex |
| GM | Group manager |
| EM | Tracing organization |
| A | Member |
| $P_G$ | Public key of a group manager GM |
| $S_G$ | Secret key of a group manager GM |
| $P_E$ | Public key of a tracing organization EM |
| $S_E$ | Secret key of a tracing organization EM |
| $P_A$ | Public key of a member $P_A$: $P_A = y$ (when the member A is a signer) |
| $S_A$ | Secret key of a member $S_A$: $S_A = x$ (when the member A signer) |
| $σ_A$ | Member certificate: $Sig_{SG}(P_A)$ |
| $Sig_{SG}( )$ | Digital signature by a secret key $S_G$ |
| $ID_A$ | Member ID |
| c | Value encrypted by a public key $P_E$: $c = E_{PE}(P_A) = P_A{}^{PE}$ |
| ^ | Sign to indicate a power |

(Initial Setting)

A group manager GM and a tracing organization EM generate respective corresponding pairs of public/secret keys ($P_G$, $S_G$) and ($P_E$, $S_E$). The group public key ($P_G$, $P_E$) and generator g are open to the public.

A user who becomes a member A generates a public/secret key pair ($P_A$, $S_A$) having the following relationship, based on the generator g, for example.

$$P_A = g^{S_A}$$

Next, the user places his (her) signature on the public key $P_A$ by using the secret key $S_A$, and obtains a digital signature $Sig_{SA}(P_A)$. The user generates the following SPK (Signature based on a Proof of Knowledge) indicating (predict) that the pair of keys ($P_A$, $S_A$) has been correctly generated. However, as this is an initial setting, a message m does not exist here.

$$SPK\{(α) | P_A = g^α\}(m) = SPK\{(S_A) | P_A = g^{S_A}\}(m)$$

This SPK is given by (e, v)∈{0, 1}$^k$×[−2|L|+k, 2ε(|L|+k)] satisfying e=H(g∥$P_A$∥$g^v P_A{}^e$∥m). The user calculates $u = g^r$ based on the random number r∈{0, 1}ε(|L|+k), determines e=H(g∥$P_A$∥u∥m), and obtains v=r−e$S_A$ as an integer.

Then, the user sends a group manager GM the public key $P_A$, digital signature $Sig_{SA}(P_A)$ and signature based on a proof of knowledge (SPK)=(e, v).

Receiving these $P_A$, $Sig_{SA}(P_A)$ and SPK, a group manager GM verifies the digital signature $Sig_{SA}(P_A)$ by the public key $P_A$, and verifies the signature based on a proof of knowledge (SPK) by the public key $P_A$ and generator g. The signature based on a proof of knowledge is verified based on e=H(g∥$P_A$∥$g^v P_A{}^e$∥m).

After confirming the validity by the above, a group manager GM places his (her) signature on the user's the public key $P_A$ by the GM's secret key $S_G$, as shown below, and returns the obtained member certificate $\sigma_A$ back to the user. By this operation, the user becomes a member A.

$$\sigma_A = Sig_{S_G}(P_A)$$

Further, a group manager GM stores a set of member ID, public key and member certificate ($ID_A$, $P_A$, $\sigma_A$) of a member A, in secret, and adds the pair of public key and digital signature ($P_A$, $Sig_{SA}(P_A)$) to a member list.

(Generation of a Group Signature)

A member A as a signer generates a signature based on a proof of knowledge $SPK\sigma,x$ proving that the member A has a pair of secret key and member certificate (x, $\sigma_A$), for a message m. Here, $x = S_A$.

$$SPK_{\sigma,x} = SPK\{(\alpha, \beta) \mid Verify_{P_G}(f(\alpha), \beta) = 1\}(m)$$
$$= SPK\{(x, \sigma_A) \mid Verify_{P_G}(f(x), \sigma_A) = 1\}(m)$$
$$= (e_1, v_1)$$

However, $e_1 = H(g\|P_A\|g^{r^{P_G}}\|m)$, $v_1 = r - e_1(x + \sigma_A)$.

Further, a member A as a signer generates a value $c = E_{PE}(P_A)$ obtained by encrypting the secret key $P_A$ by the public key $P_E$ of the tracing organization EM (traceability), and a signature based on a proof of knowledge $SPK_C$ proving that a member A has a secret key x corresponding to a plain text ($P_A$) of this value c, for the message m, as follows.

$$SPK_c = SPK\{(\alpha, \beta) \mid Verify_{P_E}(f(\alpha), \beta) = 1\}(m)$$
$$= SPK\{(x, c) \mid Verify_{P_E}(f(x), c) = 1\}(m)$$
$$= (e_2, v_2)$$

However, $e_2 = H(g\|P_A\|g^{r^{P_E}}\|m)$, $v_2 = r - e_2(x + c)$.

Thereafter, a member A sends a verifier the data ($SPK_{\sigma,x}$, c, $SPK_C$) as a signature, together with the message m. Here, c may be a value $c = E_{PE}(\sigma_A)$ that is a value obtained by encrypting the certificate $\sigma_A$.

(Verification of a Group Signature)

Receiving the data ($SPK_{\sigma,x}$, c, $SPK_C$) as a signature, together with the message m, a verifier verifies the signatures based on a proof of knowledge $SPK_{\sigma,x} = (e_1, v_1)$ and $SPK_c = (e_2, v_2)$, based on the group public key $P_G$, $P_E$.

$$e_1 = H(g\|P_A\|g^{v_1 P_G} P_A^{e_1 P_G\|m})$$

$$e_2 = H(g\|P_A\|g^{v_2 P_{EP}} P_A^{e_2 P_E\|m})$$

When the signatures generated by a member A are valid, a verifier executes the operation based on the message m. If the signatures generated by a member A are invalid, a verifier sends the encrypted value c to a tracing organization EM.

(Tracing Function)

A tracing organization EM decrypts the value c ($=E_{PE}(P_A)$) received from a verifier by the EM's secret key $S_E$, and sends the obtained public key $P_A$ of a member A to a group manager GM. A group manager GM identifies a member A from the public key $P_A$.

The above is a standard group signature scheme. Other group signature schemes have similar characteristics. The following embodiments are of course applicable to other group signature schemes.

Each apparatus in the following embodiments is executable as hardware and as combination of hardware resources and software. As hardware-software combination software, a program which is previously installed in computers of the corresponding apparatus 10, 20, 30, 50 and 60, from a network or a storage medium M, as shown in FIGS. 1, 12, 19, 25, 27, 31 and 35, for realizing the functions of the corresponding apparatus, is used.

Embodiment 1

FIG. 1 is a schematic diagram showing the configuration of an anonymous order system according to a first embodiment of the invention. In this anonymous order system, a distribution company apparatus 10, a shop apparatus 20 and a purchaser apparatus 30 are connected through networks 41-45. The broken line in the drawing indicates the elements largely different from the anonymous order system described in Jpn. Pat. Appln. KOKAI Publication No. 2006-119771.

Here, the distribution company apparatus 10 comprises a storage unit 11 for a distribution company, an initial setting unit 12, a shop registering unit 13, a purchaser registering unit 14, a payment processing unit, an order verifying unit 16, a purchaser identifying unit 17 and a market information generating unit 18.

The storage unit for a distribution company 11 is a memory readable/writable from the units 12-18, and stores group management information, privacy management information, a member list, shop registration information and an order history list.

Here, group management information consists of a group public key ($P_G$, $P_E$), a group secret key ($S_G$, $S_E$), a distribution company public key $P_{GM}$, and a distribution company secret key $S_{GM}$.

Privacy management information (information related to a purchaser's group signature) consists of a member ID, a member public key $P_A$, and a member certificate $\sigma_A$ of each member.

A member list consists of personal information, public key $P_A$ and digital signature $Sig_{SA}(P_A)$ of each member ID. The member's personal information consists of name, address, age bracket, sex and payment information (bank account information, or credit card number), for example. A network address, such as an E-mail address and IP address, and a telephone number may be optionally added to the member's personal information, if necessary. A member's public key in a member list also falls into the information related to a purchaser's group signature.

Shop registration information consists of shop information and a shop public key $P_{SP}$. Shop information consists of a name, address, telephone number, E-mail address and payment information (band account information or credit card number) of a shop, for example.

An order history list is a list of anonymous order information m in the past orders.

The initial setting unit 12 has the following functions (f12-1)-(f12-3).

(f12-1): This function is used only once upon start-up of a system, and generates a corresponding pairs of group public keys and secret keys (($P_G$, $S_G$) and ($P_E$, $S_E$)).

(f12-2): This function generates a public/secret key pair ($P_{GM}$, $S_{GM}$) of a distribution company.

(f12-3): This function writes group management information consisting of the generated pair of keys, into the storage unit for a distribution company storage 11.

The shop registering unit 13 has the following functions (f13-1) and (f13-2).

(f13-1): This function writes shop registration information including shop information and shop public key $P_{SP}$ received from the shop apparatus 20, into the storage unit 11 for a distribution company, upon registration of a shop.

(f13-2): This function returns a group public key ($P_G$, $P_E$) in the storage unit 11 for a distribution company to the shop apparatus 20, after the writing operation.

The purchaser registering unit 14 has the following functions (f14-1) and (f14-7).

(f14-1): This function examines whether a purchaser can receive an anonymous order service, based on personal information received from the purchaser apparatus 30.

(f14-2): This function informs the purchaser apparatus 30 of the result of the examination.

(f14-3): This function performs a challenge-response authentication with the purchaser apparatus 30, when the result of the examination is acceptable.

(f14-4): This function verifies the digital signature $\text{Sig}_{SA}(P_A)$ and signature based on a proof of knowledge SPK received from the purchaser apparatus 30.

(f14-5): When the validity is confirmed by verifying the above both signatures, this function places s signature on a member public key $P_A$ by using a group secret key $S_G$, and generates a member certificate $\sigma_A$ (=$\text{Sig}_{SG}(P_A)$).

(f14-6): This function stores privacy management information consisting of a set of member ID, public key and certificate of a member A ($ID_A$, $P_A$ and $\sigma_A$), in a tamper-resistant area of the storage unit for a distribution company 11, and adds a pair of member public key $P_A$ and digital signature ($P_A$, $\text{Sig}_{SA}(P_A)$) to a member list.

(f14-7): This function sends a member certificate $\sigma_A$ to the purchaser apparatus 30.

The payment processing unit 15 has a function of substitute payment based on members' personal information included in a member list in the storage unit for a distribution company 11.

The order verifying unit 16 has the following functions (f16-1)-(f16-3).

(f16-1): When anonymous order information is received from a shop, this function checks whether the same information is included in an order history list in the storage unit for a distribution company 11, and when the same information is included in the list, judges such anonymous order information to be an illegal request, refuses delivery and payment of merchandise, and when the same information is not included in the list, verifies the validity of the group signature included in the anonymous order information.

(f16-2): This function refuses delivery and payment of merchandise, when the signature is illegal.

(f16-3): Only when the validity of the signature is confirmed, this function accepts an order, and adds the anonymous order information to an order history list, and saves it in the storage unit for a distribution company 11.

The purchaser identifying unit 17 has a tracing function, which decrypts a group signature c (=$E_{PE}(P_A)$) in anonymous order information in the storage unit for a distribution company 11 by a group secret key $S_E$, and identifies a signer (=a purchaser) by an obtained member public key PA, by referring to a member list.

The market information generating unit 18 generates market information by deleting information (e.g., a name and an address) able to identify a person, from the information about a signer identified by the purchaser identifying unit 17, and has a function of sending obtained market information to the shop apparatus 20. Market information is information, among those concerning an order, unable to identify a person, and effective in indicating a class of a merchandise purchaser.

The shop apparatus 20 comprises a storage unit for a shop 21, a registration request unit 22, an order accepting unit 23, an order information generating unit 24, an order verifying unit 25, a payment request unit 26, a password generating unit 27, and a purchaser identity verifying unit 28.

Figure 3:
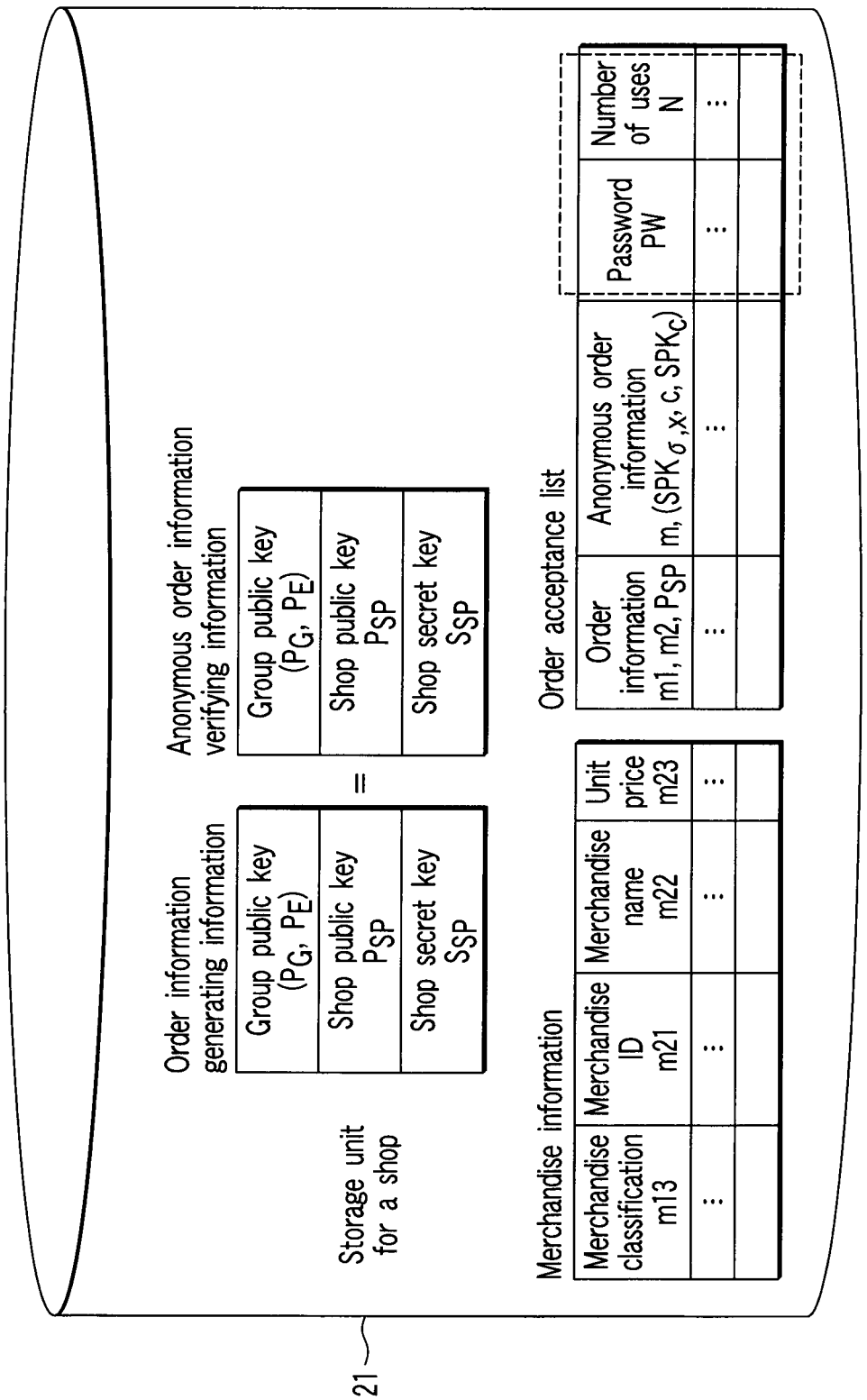
FIG. 3 is a schematic diagram showing the configuration of a storage unit for a shop in the same embodiment.

The storage unit for a shop 21 is a memory readable and writable from the units 22-28, and stores order information generating information (=anonymous order information verifying information), merchandise information, and an order acceptance list, as shown in FIG. 3.

Order information generating information consists of a group public key ($P_G$, $P_E$), a shop public key $P_{SP}$ and a shop secret key $S_{SP}$.

Figure 4:
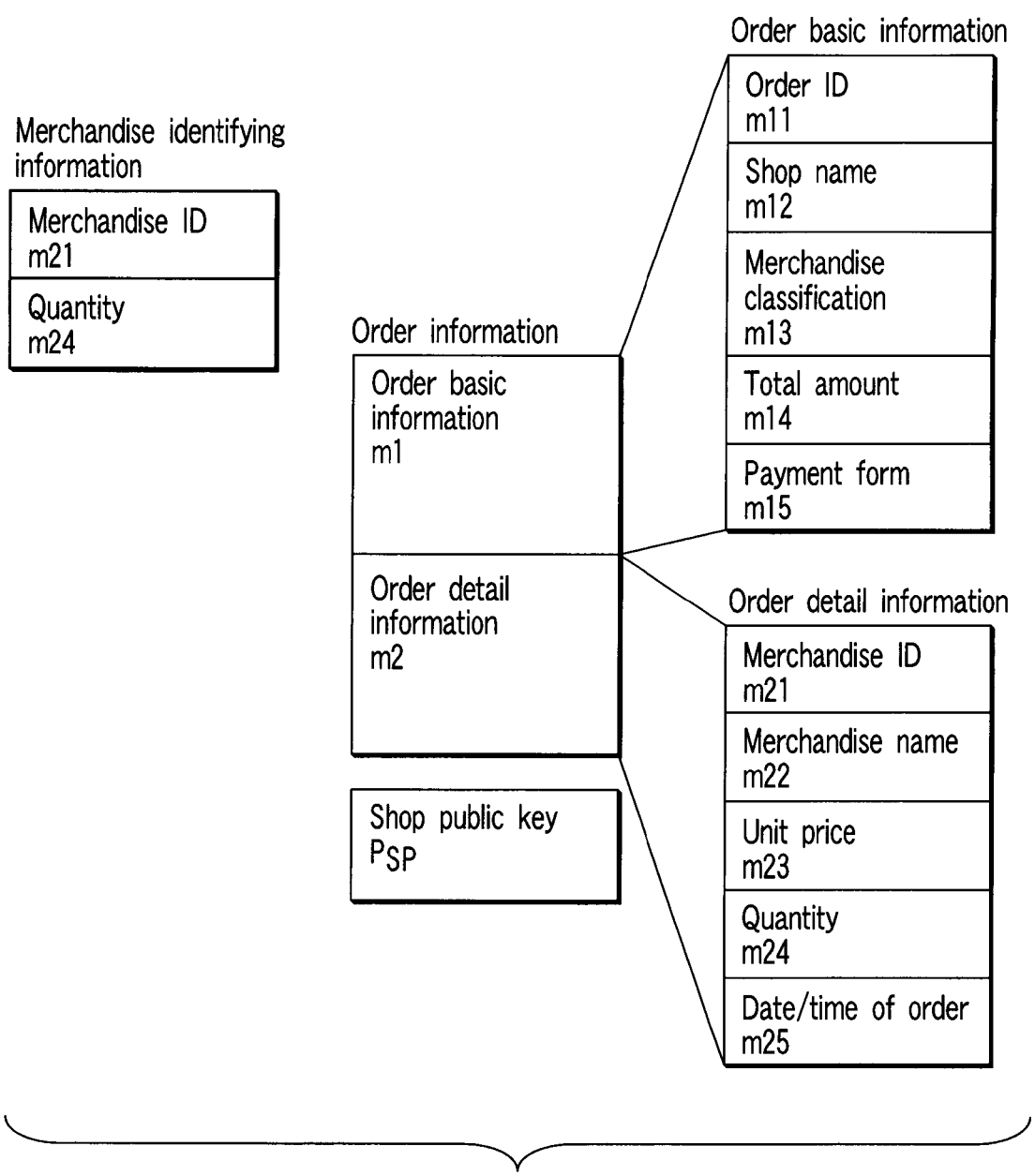
FIG. 4 is a schematic diagram for explaining order information, etc. in the same embodiment.

Merchandise information is related information for generating order information from merchandise information (sales object identifying information) received from the purchaser unit 30, and includes merchandise classification m13, merchandise ID m21, merchandise name m22 and unit price m23, for example. Merchandise identifying information is information for identifying merchandise provided by a shop, and undesirable to be known by a manager. As merchandise identifying information, a merchandise ID (e.g., a merchandise number) m21, quantity m24, etc. can be used, as shown in FIG. 4.

An order acceptance list is a list of order information m1, m2 received from the purchaser unit 30, anonymous order information m ($\text{SPK}_{o,x}$, c, $\text{SPK}_C$) and issued password PWs. An order acceptance list may include the number of past use N (=the number of order IDs having the purchaser identity), when the purchaser identity is verified in two or more order IDs in the purchaser identity verifying operation described later. Further, the number of past use N may be used as market information, if necessary.

Order information includes order basic information m1 and order detail information.

The order basic information m1 is least necessary information for payment of merchandise, and consists of an order ID m11, a shop name m12, a merchandise classification m13, total amount m14 and a form of payment m15, for example.

The order detail information m2 is information, among those concerning merchandise, desirably kept in secret except for that concerning a shop (a manager) from the viewpoint of protection of privacy, and includes at least merchandise identifying information, and includes other optionally added information. The order detail information m2 consists of a merchandise ID m21, a merchandise name m22, a unit price m23, quantity m24, and order date and time m25, for example.

Anonymous order information will be described later.

A password PW is purchaser authentication information, which is generated by the password generating unit 27, and sent to the purchaser apparatus 30. As a password PW is stored in the storage unit for a shop 21, in being correlated with anonymous order information, when an order ID and a password PW are presented, the unlinkability of a group signature scheme can be canceled.

The registration request unit 22 has the following functions (f22-1) and (f22-2).

(f22-1): The function is used by the registration request unit 22 to send a shop public key $P_{SP}$ and shop information to the distribution company apparatus 10, by the operation of a salesclerk at a shop.

(f22-2): This function writes the group public key ($P_G$, $P_E$) received from the distribution company apparatus 10, into the storage unit for a shop 21.

The order accepting unit 23 has an interface function positioned between the purchaser apparatus 30 and the units 24, 25 and 27 in the shop apparatus 20.

The order information generating unit 24 has the following functions (f24-1) and (f24-2).

(f24-1): This function generates order information m consisting of order basic information m1 and order detail information m2, from the merchandise identifying information received from the purchaser apparatus 30, based on order information generating information.

(f24-2): This function sends the purchaser apparatus 30 the generated order information m and shop public key $P_{SP}$.

The order verifying unit 25 has the following functions (f25-1)-(f25-3).

(f25-1): When anonymous order information is received from the purchaser apparatus 30, this function verifies the validity of the anonymous order information based on the anonymous order verifying information in the storage unit for a shop 21.

(f25-2): This function accepts an order, and saves order information and anonymous order information in the storage unit for a shop 21, when the validity is confirmed.

(f25-3): This function issues a slip including an order ID, instead of a delivery address, together with anonymous order information.

The payment request unit 26 has the following functions (f26-1) and (f26-2).

(f26-1): This function sends anonymous order information to the distribution company apparatus 10, and requests payment.

(f26-2): After the payment is finished, this function saves the market information received from the distribution company apparatus 10, in the storage unit for a distribution company 11.

The payment request function (f26-1) of the payment request unit 26 is not used to request payment, because in this embodiment, payment is requested by anonymous order information described on a slip, but is preferably used when merchandise is digital content.

The password generating unit 27 has the following functions (f27-1) and (f27-2).

(f27-1): When the result of verifying the anonymous order information by the order verifying unit 25 is invalid, this function issues a password PW according to the anonymous order recent information, and saves the anonymous order information and password PW in the storage unit for a shop 21.

(f27-2): This function sends the issued password PW and the result of verification to the purchaser apparatus 30 through the order accepting unit 23.

The purchaser identity verifying unit 28 has the following functions (f28-1) and (f28-2).

(f28-1): When a request including a past order ID and password is received from the purchaser apparatus 30, this function verifies the past order ID and password by referring to the storage unit for a shop 21.

(f28-2): When the result of verifying the order ID and password is valid, this function accepts the request.

As a request, concerning an order identified by a past order ID, an inquiry request, a merchandise return request and a point service supply request, for example, are applicable.

The purchaser apparatus 30 comprises a storage unit for a purchaser 31, a registration request unit 32, a merchandise selecting unit 33, an anonymous order unit 34, an anonymous order information generating unit 35, an order confirming unit 36, and a purchaser identity verifying unit 37.

The storage unit for a purchaser 31 is a memory readable and writable from the units 32-37, and stores anonymous order information generating information and ordered information, as shown in FIG. 5.

Anonymous order information generating information consists of a group public key ($P_G$, $P_E$), a member public key $P_A$, a member secret key $S_A$, a member certificate $\sigma_A$, and a distribution company public key $P_{GM}$.

Ordered information is information, in which order information m1, m2, anonymous order information m, ($SPK_{o,x}$, c, $SPK_C$) and a password PW are correlated with each other.

Figure 6:
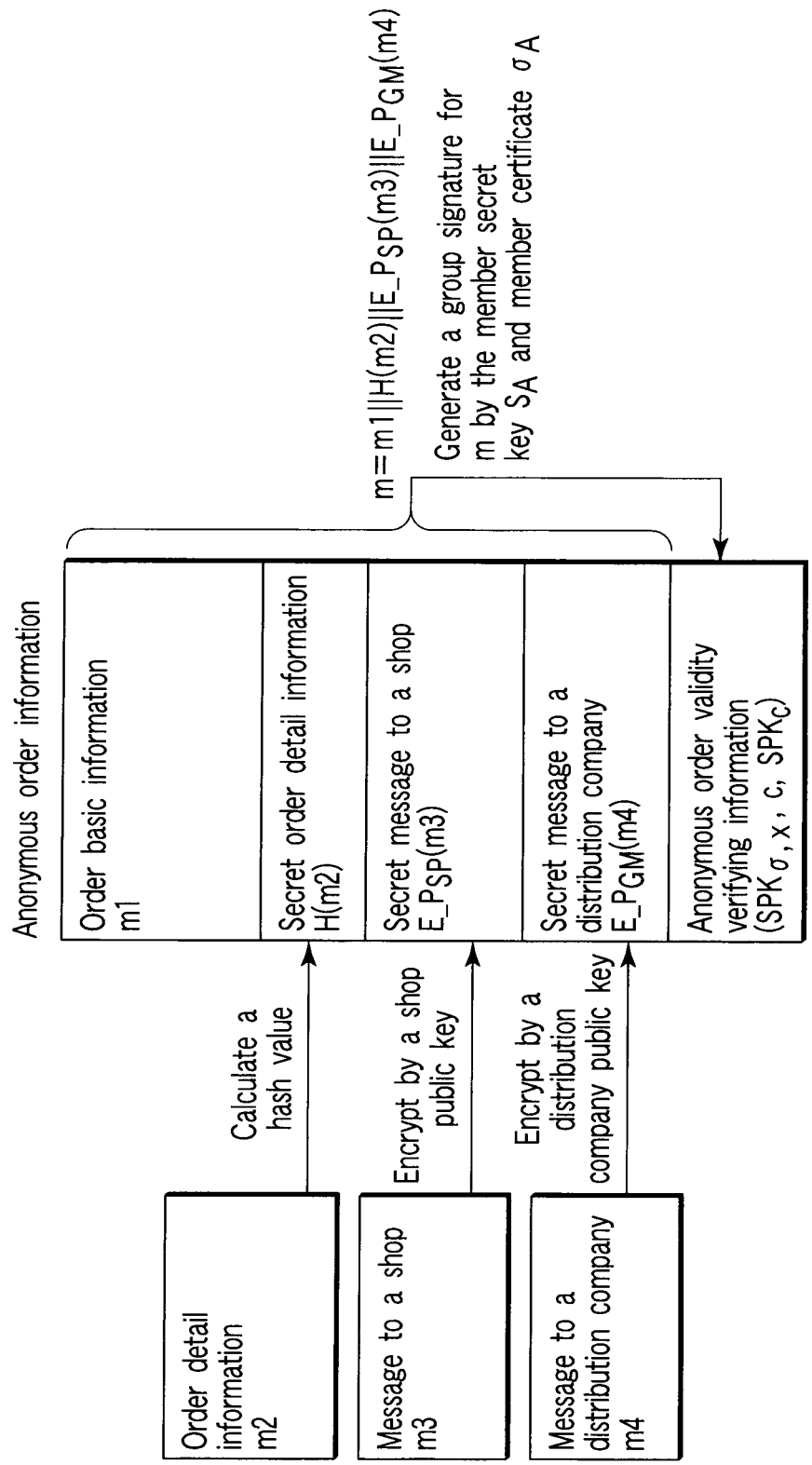
FIG. 6 is a schematic diagram for explaining anonymous order information, etc. in the same embodiment.

Anonymous order information includes order basic information m1, secret order detail information H (m2), a secret message to a shop $E_{P\_SP}$ (m3), a secret message to a distribution company $E_{P\_GM}$ (m4), and anonymous order validity verifying information ($SPK_{o,x}$, C, $SPK_C$), as shown in FIG. 6.

Secret order detail information H (m2) is information that cannot be created without knowing the order detail information m2, and is used by a shop that receives an order to verify the validity of anonymous order information. However, the order detail information m2 may not be restored from the secret order detail information H (m2). Therefore, a hash value H (m2) is used here, but is not limited to this, and may be replaced by order detail information m2 encrypted by the public key $P_{GM}$ of a shop.

A secret message to a shop $E_{P\_SP}$ (m3) is a message wanted by a purchaser to inform only a shop of a coupon number, a keyword for discount, etc., and encrypted in a form that can be decrypted only by a shop.

A secret message for a distribution company $E_{P\_GM}$ (m4) is a message wanted by a purchaser to inform only a distribution company of a merchandise delivery address, and encrypted in a form that can be decrypted only by a distribution company.

Anonymous order validity verifying information ($SPK_{o,x}$, c, $SPK_C$) is a group signature for verifying the validity of anonymous order information. The validity can be verified by the order verifying unit 25, based on anonymous order verifying information. By this information, a shop can confirm that an order may be accepted, but cannot obtain any personal information. Further, the validity can be verified together with group management information by the purchaser identifying unit 14. When the validity is conformed, the purchaser who generates the information can be identified.

The registration request unit 32 has the following functions (f32-1)-(f32-3).

(f32-1): This function sends personal information to the distribution company apparatus 10 by the operation of a purchaser, generates a member public/secret key pair ($P_A$ and $S_A$) as a member of an anonymous order system, and writes the pair into the storage unit for a purchaser 31, based on the notice from the distribution company apparatus 10 stating that the purchaser has passed the examination.

(f32-2): This function executes challenge-response authentification with the distribution company apparatus.

(f32-3): This function generates a digital signature $Sig_{SA}$ ($P_A$) and a signature based on a proof of knowledge SPK=(e, v), and sends the digital signature $Sig_{SA}$ ($P_A$) and signature based on a proof of knowledge SPK, to the distribution company apparatus 10.

(f32-4): This function saves the member certificate $\sigma_A$ received from the distribution company apparatus 10, in the storage unit for a purchaser 31.

The merchandise selecting unit 33 sends an order request and merchandise identifying information to the shop apparatus 20, by the operation of a purchaser.

The anonymous order unit 34 has an interface function positioned between the shop apparatus 20 and the units 33, 35 and 36 in the purchaser apparatus 30.

The anonymous order information generating unit 35 has the following functions (f35-1)-(f35-3).

(f35-1): This function generates anonymous order information from the order basic information m1 and order detail information m2, by the operation of a purchaser, based on the anonymous order generating information in the storage unit for a purchaser 31.

(f35-2): This function sends the generated anonymous order information to the shop apparatus 20 through the anonymous order unit 34.

(f35-3): This function writes a password PW received from the shop apparatus 20 in response to the sending, in the storage unit for a purchaser 31, by correlation with the anonymous order recent information.

The order confirming unit 36 has a function of displaying the order basic information m1 and order detail information m2 received from the shop apparatus 20 on a screen, and urges a purchaser to confirm the contents of an order.

The purchaser identity verifying unit 37 has the following functions (f37-1) and (f37-2).

(f37-1): This function generates a request including an order ID (m11) and password PW stored in the storage unit for a purchaser 31, by the operation of a purchaser.

(f37-2): This function sends the generated request to the shop apparatus 20.

Next, an explanation will be given on an anonymous order system configured as described above.

Figure 7:
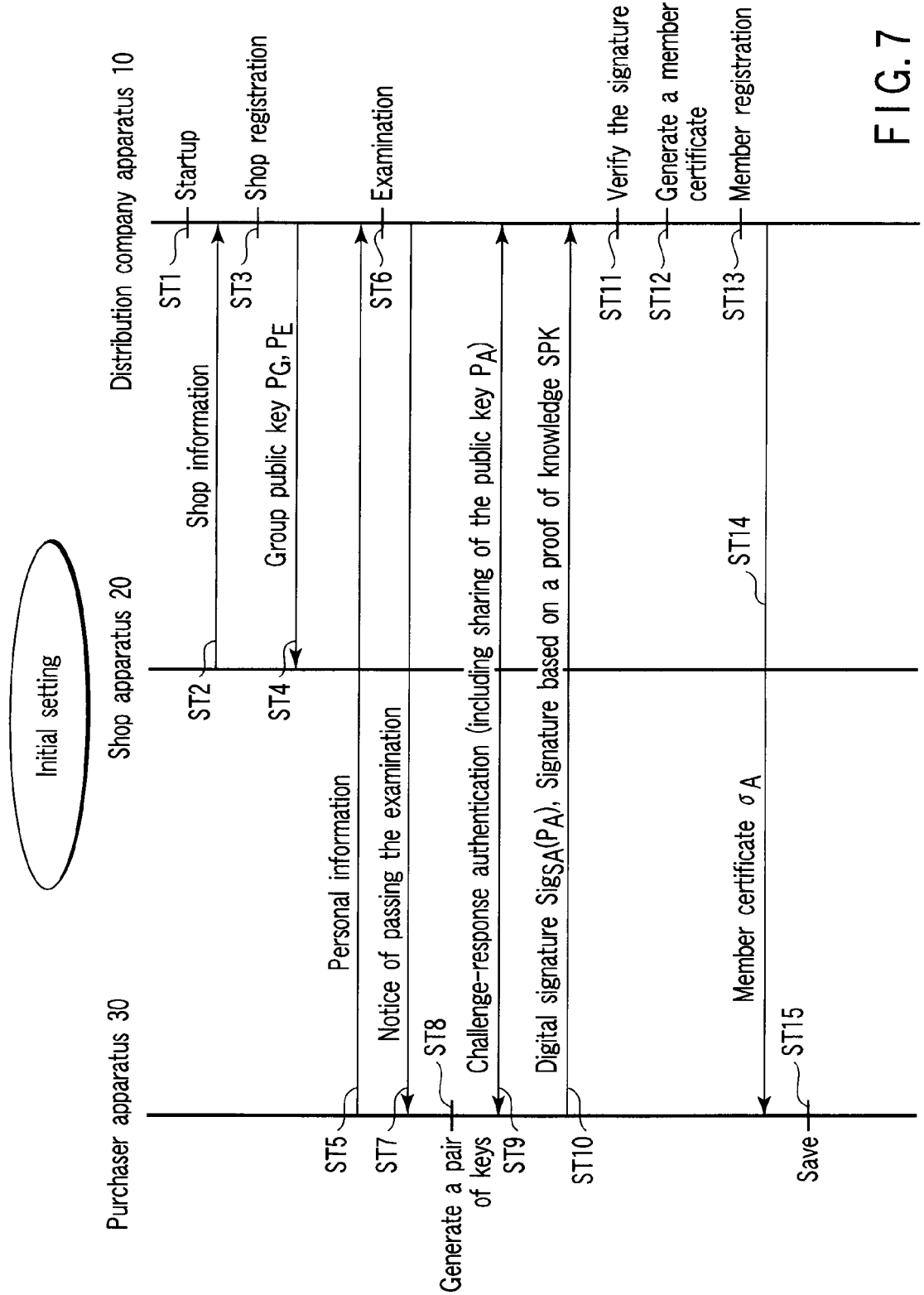
FIG. 7 is a sequence diagram for explaining the operation of initial setting in the same embodiment.

(Initial Setting; FIG. 7)

In the distribution company apparatus 10, when starting an anonymous order service (ST1), the initial setting unit 12 sets up a group for an anonymous order, generates group public/secret key pair ($P_G$, $S_G$) and ($P_E$, $S_E$), generates a public key/secret key pair of its own distribution company ($P_{GM}$, $S_{GM}$), and writes group management information consisting of these key pairs, into the storage unit for a distribution company 11, by the operation of a company staff. The distribution company apparatus 10 may perform the above operations only once upon start-up of the service. Thereafter, the distribution company apparatus 10 can provide an anonymous order service.

In the shop apparatus 20, when an anonymous order service is started, the registration request unit 22 sends a shop public key $P_{SP}$ and shop information to the distribution company apparatus 10, by the operation of a salesclerk at the shop (ST2).

In the distribution company apparatus 10, the shop registration unit 13 writes shop registration information including these shop information and shop public key $P_{SE}$, into the storage unit for a distribution company 11, and executes registration of a shop (ST3). The shop registration unit 13 returns a group public key ($P_G$, $P_E$) in the storage unit for a distribution company 11 to the shop apparatus 20 (ST4).

In the shop apparatus 20, the registration request unit 22 writes a group public key ($P_G$, $P_E$) into the storage unit for a shop 21, as a part of order information generating information and anonymous order information verifying information. As the other parts of order information generating information and anonymous order information verifying information, there is a shop public/secret key pair ($P_{SP}$, $S_{SP}$). In the shop apparatus 20, the above operation may be performed only once at the beginning of registration in a distribution company.

In the purchaser apparatus 30, the registration request unit 32 sends personal information to the distribution company apparatus 10, by the operation of a purchaser (ST5). In the distribution company apparatus 10, the purchaser registering unit 14 examines whether a purchaser can receive an anonymous order service (ST6), based on the personal information, and informs the purchaser apparatus 30 that a purchaser passes the examination (ST7).

In the purchaser apparatus 30, based on the above information, the registration request unit 32 generates a member public/secret key pair ($P_A$, $S_A$) as a member of an anonymous order system, and writes the pair of keys into the storage unit for a purchaser 31 (ST8). Thereafter, in the purchaser apparatus 30, the registration request unit 32 executes challenge-response authentification with the distribution company apparatus 10 (ST9). During the challenge-response authentication, a member public key $P_A$ and a distribution company public key $P_{GM}$ are shared between the purchaser apparatus 30 and distribution company apparatus 10.

When the authentication is completed by the challenge-response in the step ST9, the registration request unit 32 in the purchaser apparatus 30 generates a digital signature $Sig_{SA}$ ($P_A$) and a signature based on a proof of knowledge SPK=(e, v), and sends the digital signature $Sig_{SA}$ ($P_A$) and signature based on a proof of knowledge SPK to the distribution company apparatus 10 (ST10).

In the distribution company apparatus 10, the purchaser registering unit 14 verifies the digital signature $Sig_{SA}$ ($P_A$) and signature based on a proof of knowledge SPK, and when the validity is confirmed by verifying both signatures, places a signature on a member public key $P_A$ by a group secret key $S_G$, and generates a member certificate $\sigma_A$ (=$Sig_{SG}(P_A)$) (ST12).

Thereafter, the purchaser registering unit 14 stores privacy management information consisting of a set of member ID, public key and certificate ($ID_A$, $P_A$ and $\sigma_A$) of a member A in a tamper-resistant area of the storage unit for a distribution company 11, and adds a member public key $P_A$/digital signature pair ($P_A$, $Sig_{SA}(P_A)$) to a member list. The member is registered by this operation (ST13).

Further, in the distribution company apparatus 10, the purchaser registering unit 14 sends the member certificate $\sigma_A$ to the purchaser apparatus 30 (ST14). In the purchaser apparatus 30, the registration request unit 32 saves the member certificate $\sigma_A$ in the storage unit for a purchaser 31 (ST15). The purchaser apparatus 30 may execute the above operation only once at the beginning of registration of a member. A purchaser can make an anonymous order at any time by using the generated member secret key $S_A$ and member certificate $\sigma_A$.

Figure 8:
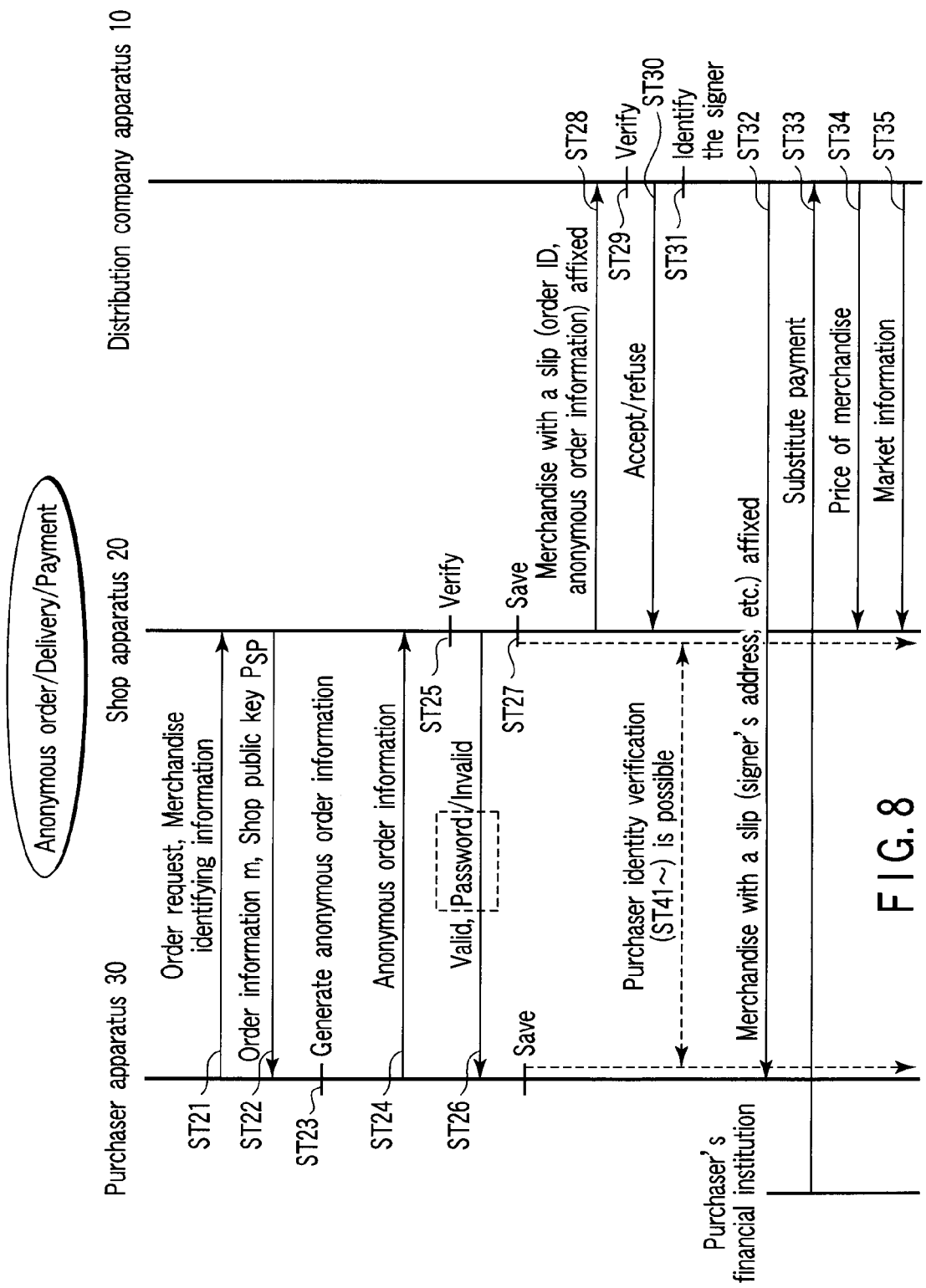
FIG. 8 is a sequence diagram for explaining the operations of anonymous order, delivery and payment in the same embodiment.
Figure 9:
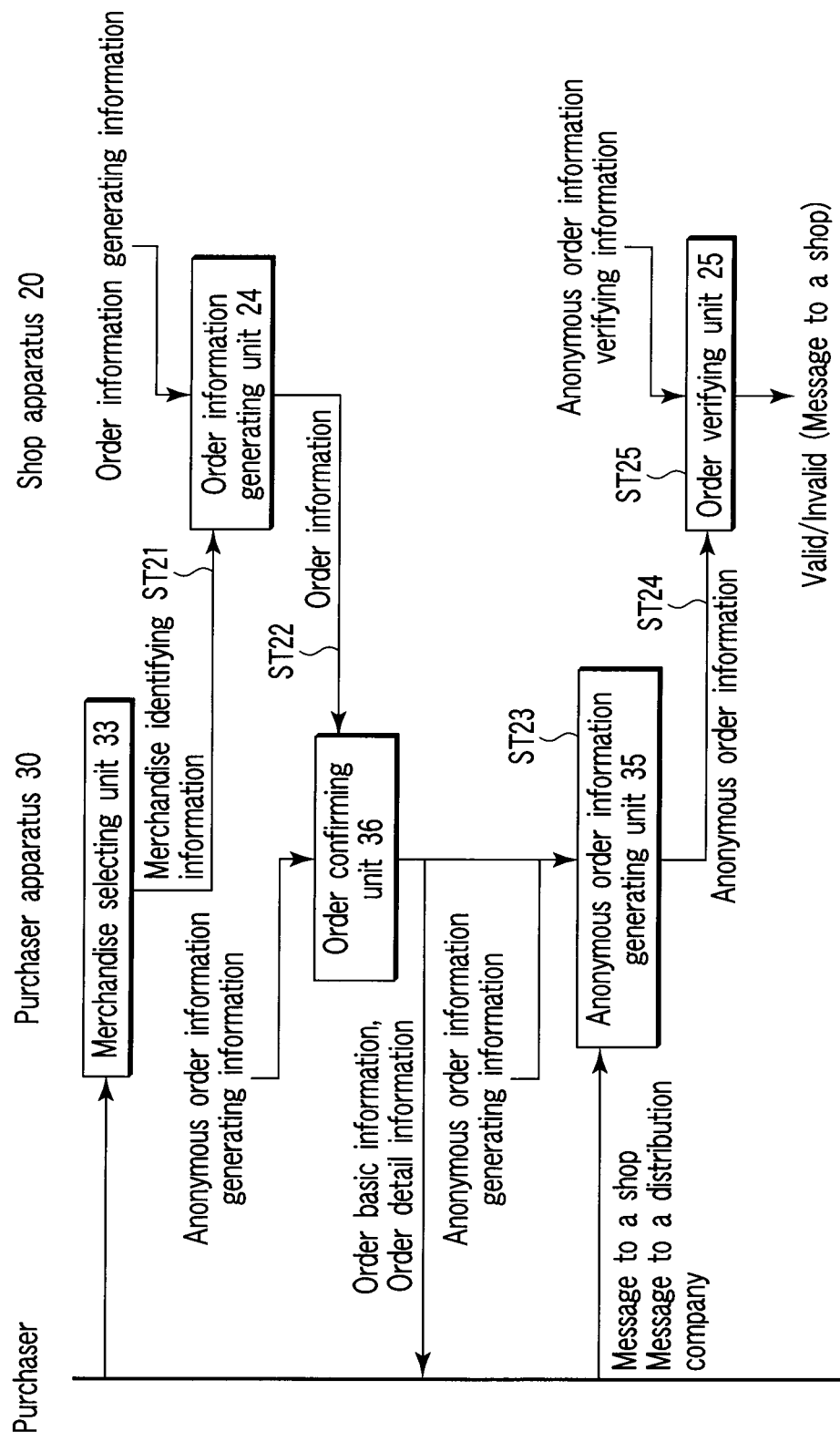
FIG. 9 is a schematic diagram for explaining the operation of an anonymous order in detail in the same embodiment.

(Anonymous Order/Delivery/Payment; FIGS. 8-10)

In the purchaser apparatus 30, the merchandise selecting unit 33 sends an order request and merchandise identifying information to the shop apparatus 20, by the operation of a purchaser (ST21).

In the shop apparatus 20, the order information generating unit 24 generates order information m consisting of order basic information m1 and order detail information m2, from the merchandise identifying information, based on order information generating information, and sends the obtained order information and shop public key $P_{SP}$ to the purchaser apparatus 30 (ST22).

The order information m consists of order basic information m1 and order detail information m2, which are connected to each other (m={m1∥m2}).

Order basic information is information least necessary for a distribution company to perform delivery/payment of merchandise, and includes an order ID that is information for uniquely identifying an order. Order detail information is the other detail information, and is desirably kept in secret to a distribution company from the viewpoint of protection of the purchaser's privacy.

Examples of order basic information m1 and order detail information m2 are taken below (refer to FIG. 4).

Order basic information $m1$=(Order ID∥shop name∥merchandise classification total amount∥payment form)= $(m11\|m12\|m13\|m14\|m15)$ Order detail information $m2$=(Merchandise No.∥merchandise name∥unit price∥quantity∥order date/time)=$(m21\|m22\|m23\|m24\|m25)$ The order classification 13 indicates CD, DVD, etc. The merchandise name m22 indicates a title of merchandise.

In the purchaser apparatus 30, the order confirming unit 36 displays the order basic information m1 and order detail information m2 on a screen. According to the screen display, a purchaser confirms that the contents of an order are correct, and operates the purchaser apparatus 30. By the purchaser's operation, the anonymous order information generating unit 35 in the purchaser apparatus 30 generates anonymous order information from the order basic information m1 and order detail information 2 (ST23), based on the anonymous order generating information in the storage unit for a purchaser 31, and sends the generated anonymous order information to the shop apparatus 20 through the anonymous order unit 34 (ST24).

Anonymous order information consists of at least order basic information m1, a hash value H(m2) of order detail information, a secret message to a shop $E_{P\ SP}$ (m3), a secret message to a distribution company $E_{P\ GM}$ (m4), and a group signature (SPK$_{o, x}$, c, SPK$_C$) for a message m (=m1∥H(m2) ∥$E_{P\ SP}$ (m3)∥$E_{P\ GM}$ (m4)) connecting the information and messages (refer to FIG. 6). The secret messages $E_{P\ SP}$ (m3) and $E_{P\ GM}$ (m4) are omissible. In the following description, they are omitted.

The group signature (SPK, x, c, SPK$_C$) is calculated from a group public key ($P_G$, $P_E$) and purchaser's member secret key $S_A$, and certificate $\sigma_A$. Assuming a group signature generating function to be GrSig, anonymous order information is expressed by the following equation.

Anonymous order information=$(m\|GrSig(m))$=$(m1\|H(m2)\|GrSig(m1)\|H(m2)$

When a secret message is not omitted, m in the above equation may be substituted by m1∥H(m2)∥$E_{P\ SP}$ (m3)∥$E_{P\ GM}$ (m4). In either case that a secret message is omitted or not omitted, a method of generating a group signature is as described above, but the configuration of message m is different from the conventional configuration.

The anonymous order information generating unit 35 writes this anonymous order information into the storage unit for a purchaser 31, together with m1, m2, m3, m4 and $P_{SP}$. When a secret message is not omitted, m3 and m4 are also written in the storage unit for a purchaser 31, together with the above-mentioned anonymous order information, m1, m2 and $P_{SP}$.

Receiving the anonymous order information, the order verifying unit 25 in the shop apparatus 20 verifies the validity of the anonymous order information, based on the anonymous order verifying information in the storage unit for a shop 21, as shown in FIG. 10 (ST25). The order verifying unit 25 accepts an order, only when it is confirmed as a result of the verification that a hash value H (m2) of order detail information is correctly calculated and a group signature (SPK$_{o, x}$, SPK$_C$) is valid, and refuses an order in the other cases.

When accepting an order, the password generating unit 27 in the shop apparatus 20 generates a password PW, and sends the password PW to the purchaser apparatus 30, together with the verification result "valid" (ST26; valid). The purchaser apparatus 30 writes the password PW into the storage unit for a purchaser 31, by correlating with anonymous order recent information. When refusing an order, the shop apparatus 20 sends the verification result "invalid" to the purchaser apparatus 30 (ST26; invalid), and finishes the operation.

When the order verifying unit 25 accepts an order, the shop apparatus 20 saves order information, anonymous order information and password PW in the storage unit for a shop 21, by correlating them with one another (ST27). When the password PW is saved in the storage unit for a shop 21 and the storage unit for a purchaser 31, the purchaser identity verifying operation described later becomes possible.

The shop apparatus 20 issues a slip that includes an order ID instead of a delivery address, together with anonymous order information. This slip is stuck to a packed merchandise and delivered by a salesclerk at the shop (ST28). This slip is used also as a substitute payment request.

In the above-mentioned anonymous order, the order detail information m2 is kept in secret by the anonymous order information concealed by the hash value H (m2), and the merchandise purchased by a purchaser is concealed, and the purchaser's privacy concerning the ordered contents can be protected.

During the period from a request to the start of an order procedure to define an order, the personal information about a purchaser including kana (characters) and ID is not sent, and no access is made to a distribution company. This is one of the characteristic features of an anonymous order.

Next, an explanation will be given on delivery and payment of merchandise.

A distribution company performs delivery and payment of the merchandise ordered from a shop. To prevent an illegal action by a shop, the distribution company apparatus 10 saves anonymous order information received in the past as an order history list in the storage unit for a distribution company 11.

When anonymous order information is received from a shop, the order verifying unit 16 in the distribution company apparatus 10 checks the order history list for the same information, and when the same information is found, regards the received order illegal, and refuses delivery/payment of merchandise. In the other cases, the order verifying unit verifies the validity of a group signature included in the received anonymous order information (ST29).

When the signature is illegal, the order verifying unit 16 refuses delivery/payment of merchandise (ST30; refuse). Only when the validity of the signature is confirmed (ST30; accept), the order verifying unit accepts the order, adds anonymous order information to an order history list, and saves it in the storage unit for distribution company 11. Thereby, a distribution company prevents an illegal request from a shop.

Then, in the distribution company apparatus 10, the purchaser identifying unit 17 decrypts a group signature c (=EPE ($P_A$)) in anonymous order information by a group secret key $S_E$, identifies the signer from the obtained member public key $P_A$ (ST31) by referring to a member list (ST31), and displays the identified contents, such as a name and an address on a screen, or issues them as an attachment seal.

A staff member of a distribution company writes the information on the identified signer on a slip of corresponding merchandise, and delivers the merchandise (ST32). The signer identifying operation can be executed only by the distribution company apparatus 10, which is the only one apparatus having group management information and member personal information. In the distribution company apparatus 10, the payment processing unit 15 performs substitute payment from a purchaser's financial institution (ST33), and pays a shop (a financial institute) for the price of the merchandise (ST34). Further, in the distribution company apparatus 10, the market information generating unit 18 deletes the information (e.g., a name and address) capable of identifying a person from the information on the identified signer, generates market information consisting of the remaining information, and sends the market information to the shop apparatus 20 (ST35). The remaining information is information (e.g., age, sex and district) unable to identify a person.

The shop apparatus 20 saves the market information, and makes it usable for various analyses.

Figure 11:
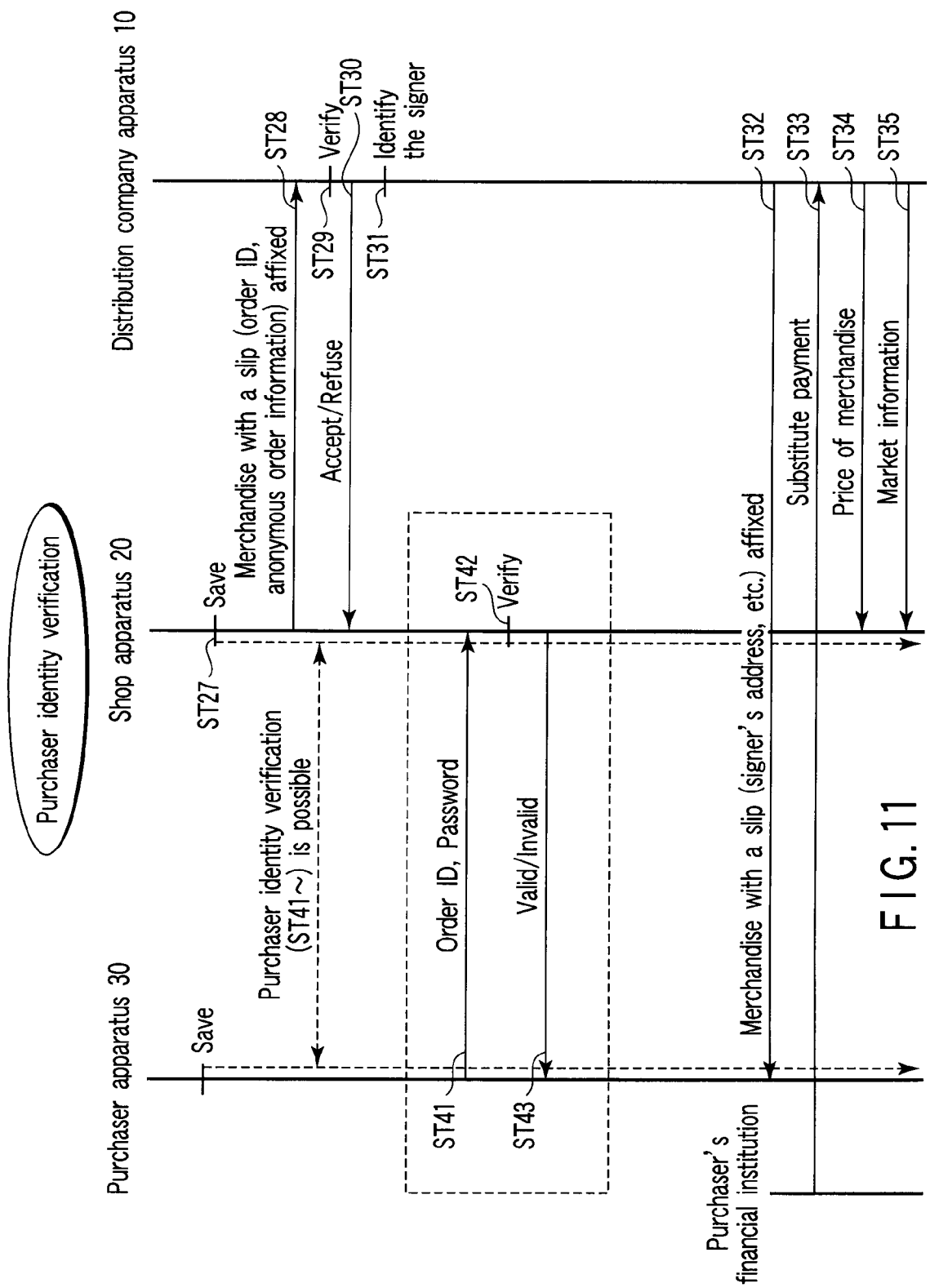
FIG. 11 is a sequence diagram for explaining the operation of a purchaser identity verifying process in the same embodiment.

(Purchaser Identity Verification; FIG. 11)

It is assumed that after the above-mentioned step ST27, a purchaser wants to make a request concerning a past order to the shop apparatus 20.

In the purchaser apparatus 30, the purchaser identity verifying unit 37 reads an order ID to identify a requested order and a related password PW from the storage unit for a purchaser 31, by the operation of a purchaser. Thereafter, the purchaser identity verifying unit 37 generates a request including an order ID and password PW, and sends the request to the shop apparatus 20, by the operation of a purchaser (ST41).

In the shop apparatus 20, when a request including a past order ID and a password is received from the purchaser apparatus 30, the purchaser identifying unit 28 verifies that the order ID is included in the order acceptance list stored in the storage unit for a shop 21 (ST42).

When the order ID is found included in the order acceptance list as a result of the verification, the purchaser identity verifying unit 28 further verifies that a password PW concerning the order ID matches the received password PW, and when they are matched, returns the verification result "valid" to the purchaser apparatus 30 (ST43; valid), and accepts the request.

When the accepted request is an inquiry request or a merchandise return request, the request may be answered by operating the shop apparatus 20 by a salesclerk at the shop. When the accepted request is a point service supply request, the purchaser identity verifying unit 28 writes the quantity of order IDs with the purchaser identity verified as the number N of use into an order acceptance list in the storage unit for a shop 21. Therefore, in the shop apparatus 20, a predetermined point service corresponding to the number N of use can be executed. As a point service, for example, a discount service of payment amount by the payment request unit 26 is considered. The operations for the other accepted demands are the same in the following embodiments.

Contrarily, when a corresponding order ID is found not existing in the storage unit for a shop 21 as a result of verification in step ST42, or when a password PW does not match even if the order ID exists, the verification result "invalid" is returned to the purchaser apparatus 30 (ST43; invalid).

In the above purchaser identity verifying operation, it is preferable to use an encrypted communication protocol such as SSL (Secure Sockets Layer) between the purchaser apparatus 30 and shop apparatus 20, from the viewpoint of preventing leakage of a password by wiretapping.

According to this embodiment, as described above, the purchaser apparatus 30 and shop apparatus 20 store anonymous order information including an order ID and a password in being correlated with each other. A purchaser sends a request including an order ID and a password, from the purchaser apparatus 30 to the shop apparatus 20, when necessary. The shop apparatus 20 verifies an order ID and password included in this request. This eliminates unlinkability for past use, when necessary, and eliminates the inconvenience caused by the unlinkability.

In addition, authentication is possible without unlinkability only when the user so intends. Therefore, the user can make an inquiry about purchased service or merchandise, or make a request to return a purchased piece of merchandise, or receive a point service, by showing the user identity only when it is necessary. The service provider can improve the service quality and enrich market information by knowing the user identity. Moreover, as the advantage of anonymous authentication is not lost, protection of personal information and privacy can be ensured, and at the same time the inconvenience caused by the unlinkability can be eliminated and the service quality can be improved.

Further, as a password PW is used and complex processing is unnecessary, the processing is simple. However, a separate scheme is necessary to prevent an illegal action caused by leakage of a password PW to a third party.

Modification of Embodiment 1

<1-1> This embodiment can be applied to the access control system described in Jpn. Pat. Appln. KOKAI Publication No. 2004-054905 and the anonymous authentication system described in Jpn. Pat. Appln. KOKAI Publication No. 2004-320562. When the embodiment is applied to the systems of these two publications, an ID capable of uniquely identifying a service request may be used, instead of the above-mentioned order ID. For example, if the length of challenge is sufficiently long in the anonymous authentication system described in Jpn. Pat. Appln. KOKAI Publication No. 2004-320562, a challenge may be used.

<1-2> As a method of selecting a requested order ID by the purchaser identity proving unit 37, a purchaser may explicitly select such, or the purchaser apparatus 30 may automatically select such.

For example, when a purchaser wants to make an inquiry about certain merchandise or a merchandise return request, the purchaser must select the method. On the other hand, when a latest order ID is selected, the purchaser apparatus 30 can automatically select the method. When a purchaser explicitly selects the method, it is preferable from the viewpoint of operability that the purchaser identity verifying unit 37 has a function of displaying an ordered information list in the storage unit for a purchaser 31, and a function of identifying an order ID from the ordered information included in the list.

<1-3> If an order ID has a form difficult for a third party to imagine, a password PW may be omitted.

<1-4> A password PW may not be generated by the shop apparatus 20, but may be generated by the purchaser apparatus 30. In this case, the password generating unit 27 may be omitted from the shop apparatus 20, and may be provided in the purchaser apparatus 30. Otherwise, a purchaser may identify a password PW. In this case, the password generating unit 27 becomes unnecessary for both shop apparatus 20 and purchaser apparatus 30, and a password input unit becomes necessary in the purchaser apparatus 30.

<1-5> A timing of sending a password PW from the purchaser apparatus 30 to the shop apparatus 20 may be any one of before sending an order request simultaneously with sending an order request, simultaneously with sending anonymous order information, and after sending anonymous order information.

<1-6> When a past order ID and password are previously displayed and a purchaser is confirmed the same, it is not necessary for the password generating unit to issue a different password PW for each order ID, and a password may be the same as the past one.

<1-7> When it is necessary to strictly verify the identity of a purchaser, a group signature for an order ID and password PW may be used, in addition to an order ID and password PW, just in case an order ID and password PW are leaked to a third party.

<1-8> When it is desired to cancel the unlinkability with a past order ID upon making of an order, the order ID and password PW of an order with cancelled unlinkability may be included in anonymous order information. In this case, a secret message $EP_{SP}(m3)$ to a shop may be created, by taking the order ID and password of a past order as a message m3. However, as an encryption method for generating a secret message, it is necessary to use an encryption method capable of calculating a different encrypted message every time, even if a message is plain text, so that the unlinkability is maintained even if a third party reads an encrypted message. As such an encryption method, a method using random numbers, such as the ElGamal encryption method or RSA-OAEP method is possible.

Embodiment 2

Figure 12:
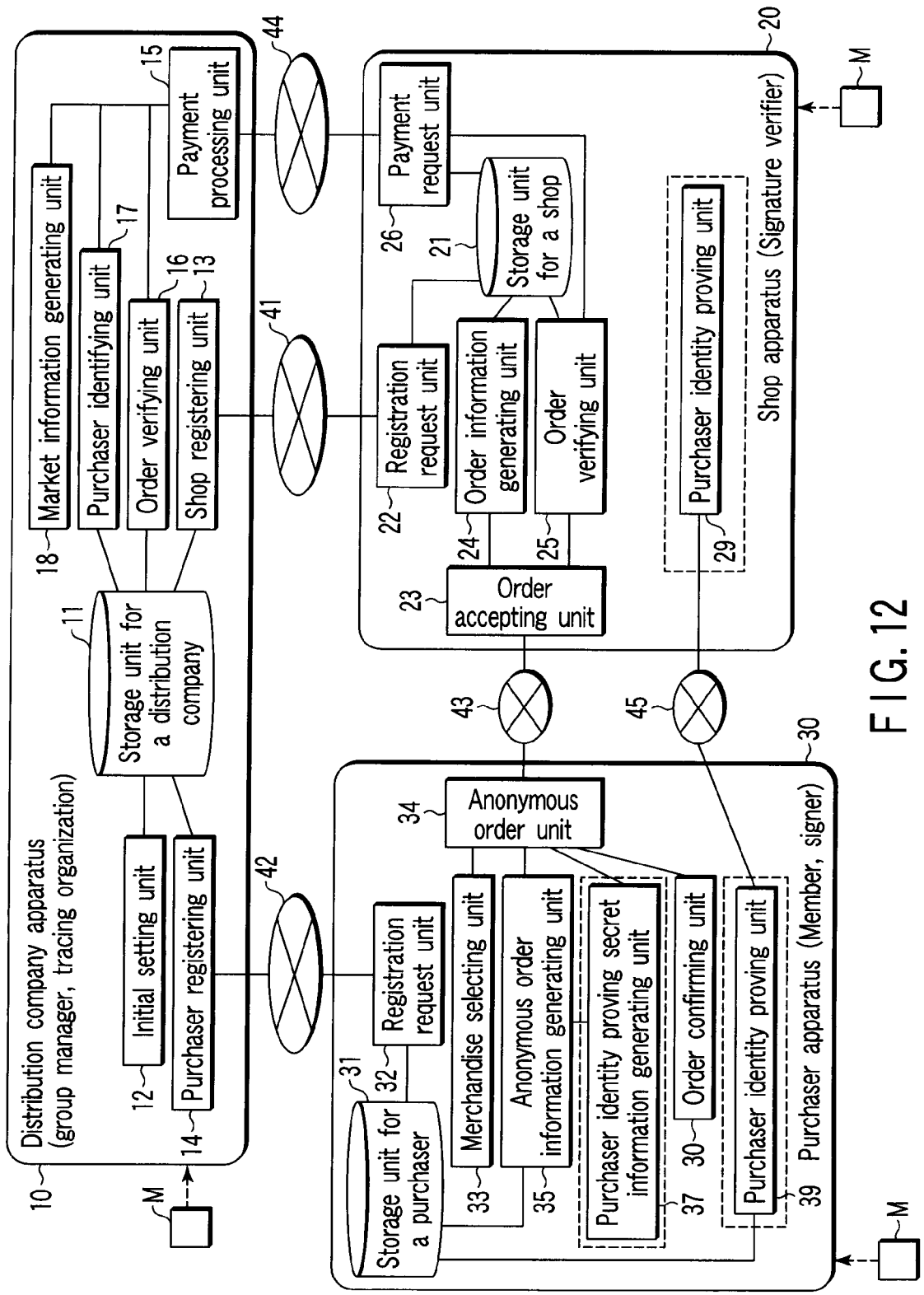
FIG. 12 is a schematic diagram showing the configuration of an anonymous order system according to a second embodiment.

FIG. 12 is a schematic diagram showing the configuration of an anonymous order system according to a second embodiment of the invention. The same parts as those in FIG. 1 are given the same reference numerals, and a detailed explanation of these parts will be omitted. Only different parts will be described here. In the following embodiments, repetition of the same explanation will be omitted.

Namely, this embodiment is a modification of the first embodiment, and is a system designed to cancel unlinkability with a part order by using zero knowledge proof instead of a password.

For example, in the purchaser apparatus 30, when anonymous order information is generated, a secret value specific to that order (hereinafter, called a purchaser identity proving secret information x') is generated, and a value calculated based on the purchaser identity proving secret information x' (hereinafter, called purchaser identity proving information) m5 is embedded in anonymous order information.

When a purchaser wants to cancel the unlinkability with an object past order, the purchaser apparatus 30 sends the shop apparatus 20 a request including an order ID and zero knowledge proving information that a purchaser knows the order ID and x'. When a purchaser does not want to cancel the unlinkability with a past order, the purchaser apparatus does not send the shop apparatus 20 a past order ID and zero knowledge proving information. The shop apparatus 20 accepts the request only when the zero knowledge proving information is found valid as a result of verifying the information.

Figure 13:
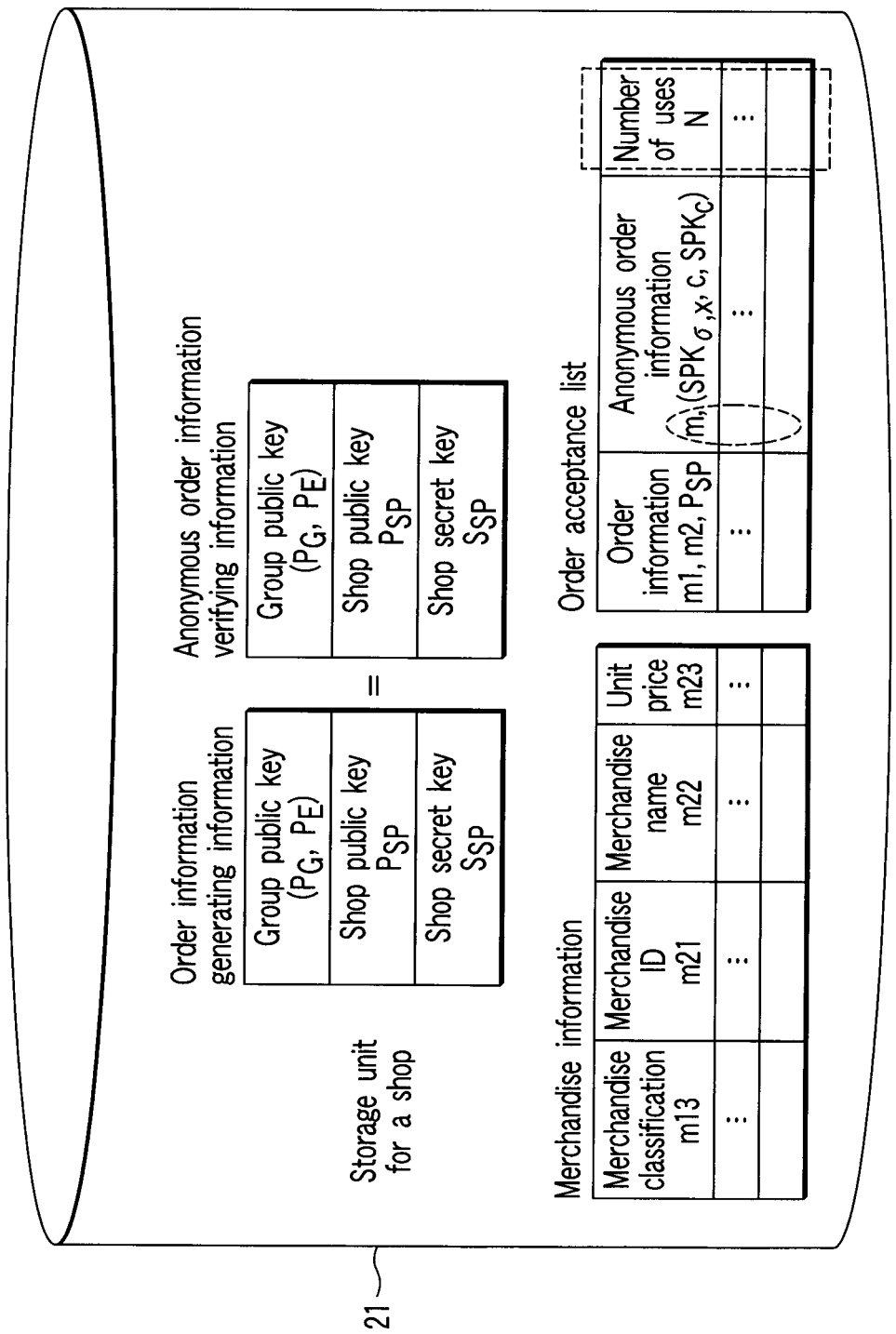
FIG. 13 is a schematic diagram showing the configuration of a storage unit for a shop in the same embodiment.

More specifically, the shop apparatus 20 is provided with a purchaser identity verifying unit 29 based on zero knowledge proof, instead of the purchaser identity verifying unit 28 based on the above-mentioned password generating unit 27 and password. Thus, a password PW is not saved in the storage unit for a shop 21, as shown in FIG. 13, and anonymous order information includes purchaser identity verifying information m5 in a message m, as shown in FIG. 4.

The purchaser identity verifying unit 29 has the following functions (f29-1)-(f29-3).

(f29-1): When a request including zero knowledge proving information (W, s) that a purchaser knows the purchaser identity proving secret information x' is received from the purchaser apparatus 30, based on the past order ID and purchaser identity proving secret information x' corresponding to this order ID, this function retrieves the purchaser identity verifying information m5 concerning the order ID from the storage unit for a shop 21.

(f29-2): This function verifies zero knowledge proving information (w, s) based on the retrieved purchaser identity verifying information m5.

(f29-3): This function accepts a request when the result of verifying the zero knowledge proving information (w, s) is valid.

Figure 15:
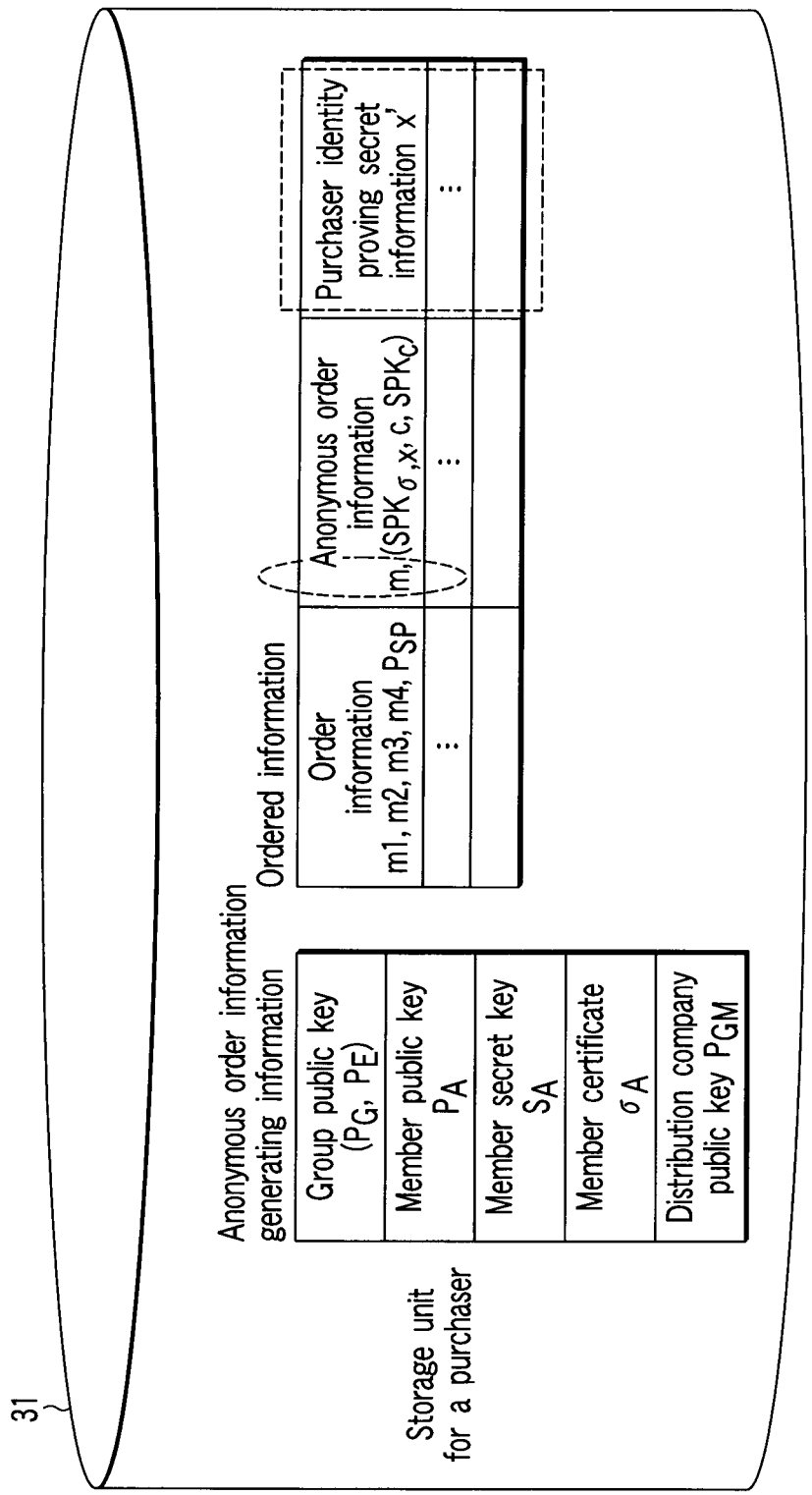
FIG. 15 is a schematic diagram showing the configuration of a storage unit for a purchaser in the same embodiment.

The purchaser apparatus 30 is provided with a purchaser identity proving secret information generating unit 38 and a purchaser identity proving unit 39 based on zero knowledge proof, instead of the purchaser identity proving unit 37 based on a password as described above. Thus, the storage unit for a purchaser 31 stores the purchaser identity proving secret information x' by correlating it with anonymous order information, instead of a password PW, as shown in FIG. 15.

The purchaser identity proving secret information generating unit 38 has the following functions (f38-1)-(f38-4).

(f38-1): This function generates the purchaser identity proving secret information x' in correspondence with an order ID.

(f38-2): This function generates the purchaser identity verifying information m5 by calculation taking the purchaser identity verifying secret information x' as a power exponent, based on the purchaser identity proving secret information x'.

(f38-3): This function sends the purchaser identity verifying information m5 to the anonymous order information generating unit 35.

(f38-4): This function writes the anonymous order information generated by the anonymous order information generating unit 35 and purchaser identity proving secret information x', in the storage unit for a purchaser 31, by correlating them with each other.

The purchaser identity proving secret information x' must be unable to be estimated by a third party, and may be generated as a random number, for example. In addition, the purchaser identity proving secret information x' itself is information that cannot be estimated by a third party (the manager apparatus 10 and shop apparatus 20), and cannot be estimated by a third party (the manager apparatus 10 and shop apparatus 20), even if estimated based on the purchaser identity verifying information m5. This is the same in following embodiments, that is, the purchaser identity proving secret information x' cannot be estimated by a third party (even if estimated based on the purchaser identity verifying information m5).

Thus, the anonymous order information generating unit 35 is configured to generate anonymous order information, based on the message m including the purchaser identity verifying information m5.

The purchaser identity proving unit 39 has the following functions (f39-1)-(f39-4).

(f39-1): This function retrieves the purchaser identity proving secret information x' concerning a past order ID, from the storage unit for a purchaser 31, by the operation of a purchaser.

(f39-2): This function generates the zero knowledge proving information (w, s) that a purchaser knows the purchaser identity proving secret information x', based on the retrieved purchaser identity proving secret information x'.

(f39-3): This function generates a request including an order ID and zero knowledge proving information (w, s), by the operation of a purchaser.

(f39-4): This function sends the generated request to the shop apparatus 20.

Next, an explanation will be given on the anonymous order system configured as described above.

Figure 16:
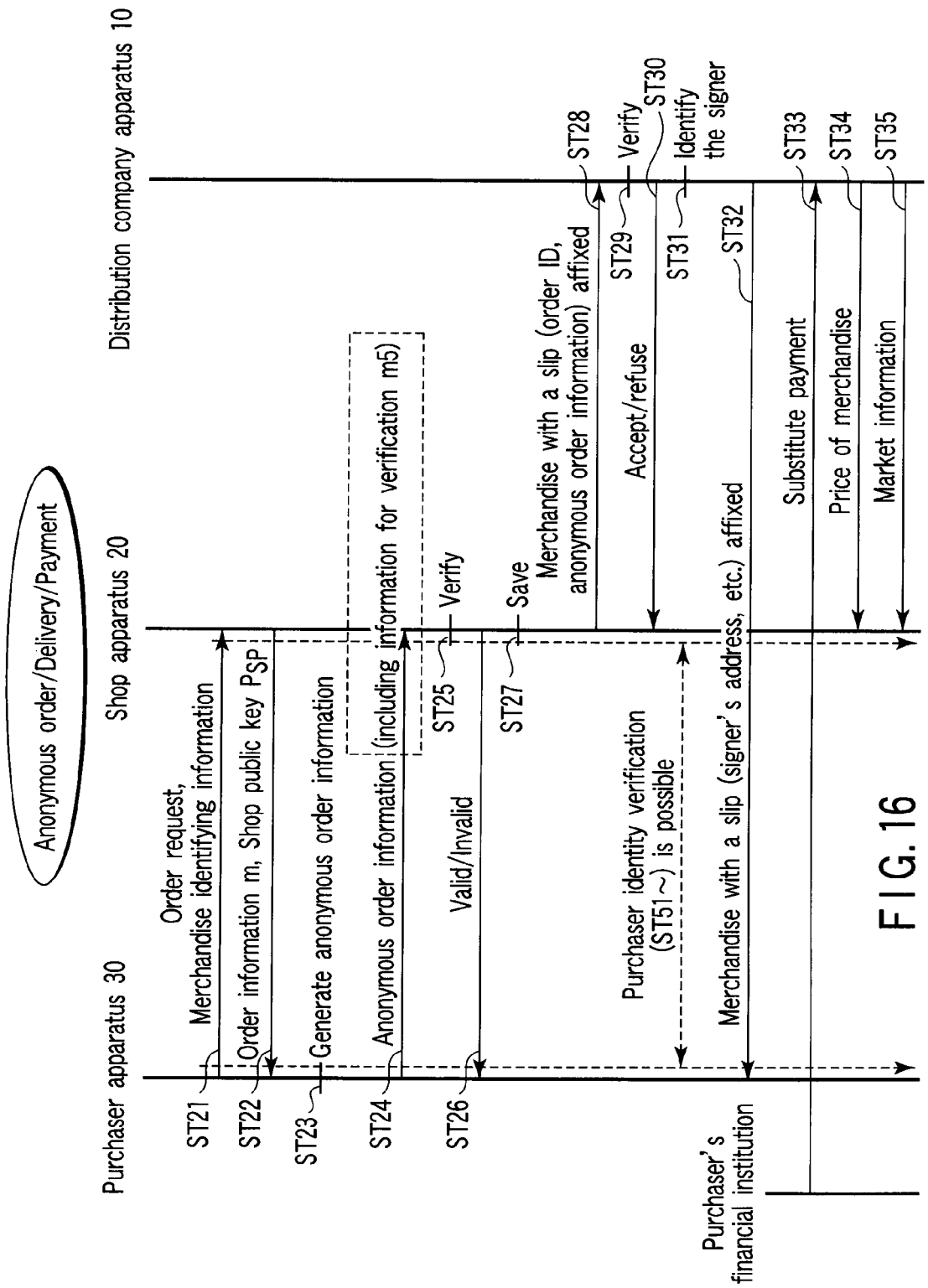
FIG. 16 is a sequence diagram for explaining the operations of an anonymous order, delivery and payment in the same embodiment.

(Anonymous Order/Delivery/Payment; FIG. 16 and FIG. 17)

Here, as purchaser identity proving secret information and zero knowledge proof knowing it, an explanation will be given on an example of using "a signature of knowledge of the discrete logarithm of y=g^x' w.r.t. base g, on a message m" in Definition 4 described in G. Ateniese, J. Camenisch, M. Joye and G. Tsudik, "A Practical and Provably Secure Coalition-Resistant Group Signature Scheme", CRYPTO 2000, LNCS 1880, Springer-Verlag, pp. 255-270, 2000.

Here, G is assumed to be a cyclic group whose order #G is unknown, and a generator of the cyclic group G is assumed to be g. The bit length L of the order #G should be an integer L, which permits $2^{(L-1)} \leq \#G < 2^L$. The "^" indicates a power. One-way hash function H is $\{0, 1\}^* \to \{0, 1\}^k$. The "k" indicates the bit length of a hash function after calculation. The "E" is a security parameter, and E>1, for example. In the following description, y, g, h, E G, and $\epsilon$ E Z. The "z" is the whole set of integers.

Now, steps ST21-ST22 are assumed to be executed, as described hereinbefore.

Next, in the purchaser apparatus 30, the purchaser identity proving secret information x' by the purchaser identity proving secret information generating unit 38 generates, when generating anonymous order information.

Then, the purchaser identity verifying information m5=(h, y) consisting of sets of h=g^r and y=h^x' is calculated based on the purchaser identity proving secret information x', random number r and base g, and the purchaser identity verifying information m5=(h, y) is sent to the anonymous order information generating unit 35.

The anonymous order information generating unit 35 generates anonymous order information that includes the purchaser identity verifying information m5 in a message m (ST23), sends the anonymous order information to the shop apparatus 20 through the anonymous order unit 34, as well as sending to the purchaser identity proving secret information generating unit 38 (ST24). The purchaser identity proving secret information generating unit 38 writes the anonymous order information and purchaser identity proving secret information into the storage unit for a purchaser 31, by correlating both information.

When the anonymous order information is received, the order verifying unit 25 in the shop apparatus 20 verifies the validity of the anonymous order information based on the anonymous order verifying information in the storage unit for a shop 21, as shown in FIG. 17 (ST25). The order verifying unit 25 accepts an order only when it is confirmed as a result of the verification that a hash value H (m2) of order detail information is correctly calculated and a group signature (SPK$_{\sigma, x}$, SPK$_c$) is valid, and refuses an order in the other cases.

When accepting an order, the order verifying unit 25 of the shop apparatus 20 sends the verification result "valid" to the purchaser apparatus 30 (ST26; valid). When refusing an order, the order verifying unit 25 in the shop apparatus 20 sends the verification result "invalid" to the purchaser apparatus 30 (ST26; invalid), and finishes the operation.

Further, when the order verifying unit 25 accepts an order, the shop apparatus 20 saves order information and anonymous order information in the storage unit for a shop 21, by correlating them with each other (ST27). When the order information and anonymous order information are saved in the storage unit for a shop apparatus 21, the purchaser identity verifying operation described later becomes possible.

The delivery and payment processes in the subsequent steps ST28-ST34 are executed as described hereinbefore.

(Purchaser Identity Verification; FIG. 18)

It is assumed that after the above-mentioned step ST27, a purchaser wants to make a request concerning a past order to the shop apparatus 20.

In the purchaser apparatus 30, the purchaser identity verifying unit 39 reads anonymous order information including an order ID to identify a requested order and related purchaser identity proving secret information x' from the storage unit for a purchaser 31, by the operation of a purchaser.

Thereafter, the purchaser identity verifying unit 39 sends the shop apparatus 20 a verification start request including an order ID (ST51). Receiving the verification start request, the shop apparatus 20 generates a message m6 including a random number a, and sends the message m6 back to the purchaser apparatus 30.

Receiving the message m6, the purchaser identity proving unit 39 in the purchaser apparatus 30 selects a random number t$\in \pm\{0, 1\}^{\{\epsilon(L+k)\}}$, and calculates the zero knowledge proving information w, s$\in$z, as shown in the equation given below, based on the random number t, purchaser identity proving secret information x', purchaser identity verifying information m5=(y, h) and message m6 (ST53).

$$w = H(y\|h\|h^t\|m6)$$

$$s = t - wx'$$

The "$\|$" indicates concatenation. The "(w, s)" satisfies (w, s)$\in \pm\{0, 1\}^k \times \pm\{0, 1\}^{\{\epsilon(L+k)+1\}}$. The "w" is a hash value. The "s" is a power exponent in a verifying equation described later. The random number "a" is information to prevent illegal reuse of zero knowledge proving information, but not essential. For example, the random number "a" may be omitted from the message m6, or a current time may be included in the message m6, instead of the random number "a".

Thereafter, the purchaser identity proving unit 39 sends the shop apparatus 20 a request including an order ID and zero knowledge proving information (w, s), by the operation of a purchaser (ST54).

Receiving a request including a past order ID and zero knowledge proving information (w, s), the purchaser identity verifying unit 29 in the shop apparatus 20 checks whether the order ID is included in the order acceptance list in the storage unit for a shop 21 (ST55).

When existence of the order ID is confirmed as a result of verification, the purchaser identity verifying unit 29 further checks whether the following verifying equation is established, based on the purchaser identity verifying information m5=(h, y) included in the anonymous order information related to that order ID, received zero knowledge proving information (w, s), and the message m including a random number a.

$$w = H(y\|h\|h^s \cdot h^w\|m6)$$

When the verifying equation is found established as a result of the verification, the purchaser identity verifying unit 29 returns the verification "valid" to the purchaser apparatus 30 (ST56; valid), and accepts the request. The operations for the accepted request are executed as described hereinbefore.

As described above, according to this embodiment, the purchaser apparatus 30 stores "anonymous order information including an order ID and purchaser identity verifying information m5" and "purchaser identity proving secret information x'". The shop apparatus 20 stores "anonymous order information including an order ID and purchaser identity verifying information m5". A purchaser sends a request including an order ID and zero knowledge proving information (w, s), from the purchaser apparatus 30 to the shop apparatus 20, when necessary. The shop apparatus 20 verifies the zero knowledge proving information (w, s) based on the purchaser identity verifying information m5 retrieved from the order ID included in this request. This can cancel the unlinkability for the past use when necessary, and eliminate the inconvenience caused by the unlinkability.

Further, according to this embodiment, although the calculation amount is larger than in the first embodiment, the shop apparatus 20 does not need to manage a password PW, which therefore lowers the management cost of a shop.

Modification of Embodiment 2

<2-1>, <2-2> The first and second modifications <1-1> and <1-2> of the first embodiment can also be realized as modifications of this embodiment.

<2-3> This embodiment can be modified to use zero knowledge proof of other systems, in addition to the zero knowledge proof of Definition 4 described in G. Ateniese, J. Camenisch, M. Joye and G. Tsudik, "A Practical and Provably Secure Coalition-Resistant Group Signature Scheme", CRYPTO 2000, LNCS 1880, Springer-Verlag, pp. 255-270, 2000.

<2-4> This embodiment can be modified to use a traceable signature instead of a group signature, and to use claiming in a traceable signature instead of zero knowledge proof (e.g., refer to A. Kiayias, Y. Tsioumis, M. Young, "Traceable Signatures", EUROCRPT 2004, lncs 3027, Springer-Verlag, pp. 571-589, 2004).

<2-5> this embodiment dos not use a different value for each order as purchaser identity proving secret information, but can use a value common to all orders. In this case, values need not be managed for each order, and may be managed just like a member secret key.

Embodiment 3

An explanation will be given on an anonymous order system according to a third embodiment of the invention with reference to FIG. 12-FIG. 18.

Namely, this embodiment is a modification of the second embodiment. When a purchaser wants to show a shop that the purchaser has made one or more orders from, the same purchaser identity proving secret information x' is embedded in one or more pieces of anonymous order information, and zero knowledge proof is used to show that a purchaser knows the value of x'. Each piece of anonymous order information is assumed to include purchaser identity verifying information m5=(h, y)=(g^r, h^x') obtained by calculating r as a different random number.

When the number of order IDs is one, the operation is the same as in the second embodiment except that the purchaser identity proving secret information ox' is common to all orders. When the number of order IDs is three or more, it is easy to expand from the case of two order IDs. Therefore, an explanation will be given on the case of two order IDs.

In the purchaser identity proving unit 29, an equation to generate the hash value w in the zero knowledge proving information (x, s) is "w=H (y||y'||h||h||h'||h^t||h'^t||m6)".

Namely, the purchaser identity verifying unit 29 has the following functions (f29-1)-(f29-3).

(f29-1): When a past order ID and a request including "zero knowledge proving information (w, s) that the purchaser identity proving secret information x' is common and that a purchaser knows the value of x', based on the purchaser identity proving secret information x' corresponding to the order ID" is received from the purchaser apparatus 30, this function retrieves the purchaser identity verifying information m5 related to the order ID from the storage unit for a shop 21.

(f29-2): This function verifies zero knowledge proving information (w, s), based on the retrieved purchaser identity verifying information m5.

(f29-3): This function accepts an order, when the result of verifying the zero knowledge proving information (w, s) is valid.

Likewise, in the purchaser identity verifying unit 29, an equation to verify the zero knowledge proving information (w, s) is "w=H(y||y'||h||h'||h^s·y'^w||h'^s·y'^w||m6)".

Namely, the purchaser identity verifying secret information generating unit 38 has a function of using the purchaser identity proving secret information x' generated corresponding to a past order ID for the purchaser identity proving secret information x' corresponding to an order ID of this time, in the above-mentioned function, by the operation of a purchaser. In addition, the purchaser identity proving secret information x' is common secret information that is independent of an order ID.

The purchaser identity proving unit 39 has the following functions (f39-1)-(f39-4).

(f39-1): This function retrieves common purchaser identity proving secret information x' related to two past order IDs from the storage unit for a purchaser 31, by the operation of a purchaser.

(f39-2): This function generates the zero knowledge proving information (w, s) that the purchaser identity proving secret information x' is common and that a purchaser knows the value of x', based on the retrieved purchaser identity proving secret information x'.

(f39-3): This function generates a request including an order ID and zero knowledge proving information (w, s), by the operation of a purchaser.

(f39-4): This function sends the generated request to the shop apparatus 20.

Next, an explanation will be given on the operations of the anonymous order system configured as described above.

(Anonymous Order/Delivery/Payment; FIG. 16 and FIG. 17)

Here, as zero knowledge proof that the same purchaser identity proving secret information is embedded in two pieces of purchaser identity proving secret information, an explanation will be given on an example of using "a signature of knowledge of the discrete logarithm of both y__1=g^x' w.r.t. base g and y__2=h^x7 w.r.t. base h, on a message m" in Definition 5 described in G. Ateniese, J. Camenisch, M. Joye and G. Tsudik, "A Practical and Provably Secure Coalition-Resistant Group Signature Scheme", CRYPTO 2000, LNCS 1880, Springer-Verlag, pp. 255-270, 2000. Unless otherwise specified, the definition of reference numerals is the same as those in the second embodiment.

Now, steps ST21-ST22 are assumed to be executed, as described hereinbefore.

Next, in the purchaser apparatus 30, when anonymous order information is generated, the purchaser identity proving secret information generating unit 38 generates the purchaser identity proving secret information x'. The purchaser identity proving secret information x' is assumed to be the same value as the purchaser identity proving secret information x' of a past order ID intended to cancel unlinkability. The purchaser identity proving secret information generated first must be difficult to be estimated by a third party, and may be generated as a random number, for example.

Then, the purchaser identity proving secret information generating unit 38 calculates the purchaser identity verifying information m5=(h, y) consisting of sets of h=g^r and y=h^x', based on the purchaser identity proving secret information x', random number r and base g, and sends the purchaser identity verifying information m5=(h, y) to the anonymous order information generating unit 35.

Thereafter, the anonymous order process of steps ST23-ST27 is executed, as described hereinbefore. The delivery/payment processes of steps ST28-ST34 are also executed.

(Purchaser Identity Verification; FIG. 18)

It is assumed that after the above-mentioned step ST27, a purchaser wants to make a request concerning a past order to the shop apparatus 20.

In the purchaser apparatus 30, the purchaser identity verifying unit 39 reads two pieces of anonymous order information including two order IDs to identify two requested order and related purchaser identity proving secret information x' from the storage unit for a purchaser 31, by the operation of a purchaser. The two anonymous order information separately include the purchaser identity verifying information m5=(h, y) or m5'=(h', y') (here, h=g^r, y=h^x', h'=g^r', y'=h'^x').

Thereafter, the purchaser identity verifying unit 39 sends the shop apparatus 20 a verification start request including an order ID (ST51). Receiving the verification start request, the shop apparatus 20 generates a message m6 including a random number a, and sends it back to the purchaser apparatus 30. The random number a is information for preventing illegal reuse of zero knowledge proving information, but is not essential. For example, the random number a may be omitted from the message m6, or a current time may be included in the message m6, instead of the random number a.

Receiving the message m6, the purchaser identity proving unit 39 in the purchaser apparatus 30 selects a random number t∈±{0, 1}^{∈(L+k)}, and calculates the zero knowledge proving information w, s∈z, as shown in the equation given below, based on the random number t, common purchaser identity proving secret information x', two pieces of purchaser identity verifying information m5=(y, h) and m5'=(h', y'), and message m6 (ST53). This zero knowledge proof (w, s) indicates that the discrete logarithm x' of y for the base h is the same as the discrete logarithm x' of y' for the base h'.

$$w = H(y\|y'\|h\|h'\|h^t\|h'^t\|m6)$$

$$s = t - wx'$$

Thereafter, the purchaser identity proving unit 39 sends the shop apparatus 20 a request including two order IDs and zero knowledge proving information (w, s), by the operation of a purchaser (ST54).

Receiving a request including two past order IDs and zero knowledge proving information (w, s), the purchaser identity verifying unit 29 in the shop apparatus 20 checks whether the order ID is included in the order acceptance list in the storage unit for a shop 21 (ST55).

When existence of the order ID is confirmed by the verification result, the purchaser identity verifying unit 29 further checks whether the following verifying equation is established, based on the purchaser identity verifying information m5=(h, y) and m5'=(h', y') included in two pieces of anonymous order information related to each order ID, received zero knowledge proving information (w, s), and message m6 including a random number a.

$$w = H(y\|y'\|h\|h'\|h^s \cdot y^w\|h'^s \cdot y'^w\|m6)$$

When the verifying equation is found established as a result of the verification, the purchaser identity verifying unit 29 returns the verification result "valid" to the purchaser apparatus 30 (ST56; valid), and accepts the request. The operations for the accepted request are executed as described hereinbefore.

As described above, according to this embodiment, the purchaser apparatus 30 stores "anonymous order information including an order ID and purchaser identity verifying information m5" and "purchaser identity proving secret information x'". The shop apparatus 20 stores "anonymous order information including an order ID and purchaser identity verifying information m5". A purchaser sends a request including two or more pieces of order ID and zero knowledge proving information (w, s), from the purchaser apparatus 30 to the shop apparatus 20, when necessary. The shop apparatus 20 verifies the zero knowledge proving information (w, s) based on two pieces of purchaser identity verifying information, m5 and m5' retrieved from one or more pieces of order ID included in this request. This can cancel the unlinkability for the past use, when necessary, and eliminate the inconvenience caused by the unlinkability.

Further, according to this embodiment, the following effect is provided in addition to the effect of the first embodiment.

It is possible to indicate that two or more purchasers who generate anonymous order information are the same purchasers. This is effective when a purchaser receives a point service by showing that two or more orders are the same. Further, when an order is suspected to be illegal, a purchaser can be identified by the distribution company apparatus 10 in some cases, and the identity of a purchaser can be strictly verified.

On the other hand, as a relatively heavy processing is required, the first or second embodiment is more suitable for cases where the identity of a purchaser may not be strictly verified (e.g., upon inquiry about an order).

Modification of Embodiment 3

<3-1>, <3-2> The first and second modifications <1-1> and <1-2> of the first embodiment can also be realized as modifications of this embodiment.

<3-3> This embodiment can be modified to use zero knowledge proof of other systems, in addition to the zero knowledge proof of Definition 5 described in G. Ateniese, J. Camenisch, M. Joye and G. Tsudik, "A Practical and Provably Secure Coalition-Resistant Group Signature Scheme", CRYPTO 2000, LNCS 1880, Springer-Verlag, pp. 255-270, 2000.

<3-4> This embodiment can use purchaser identity proving secret information common to all orders. In this case, it is unnecessary to manage a value for each order, and the value may be managed just like a member secret key.

Embodiment 4

Figure 20:
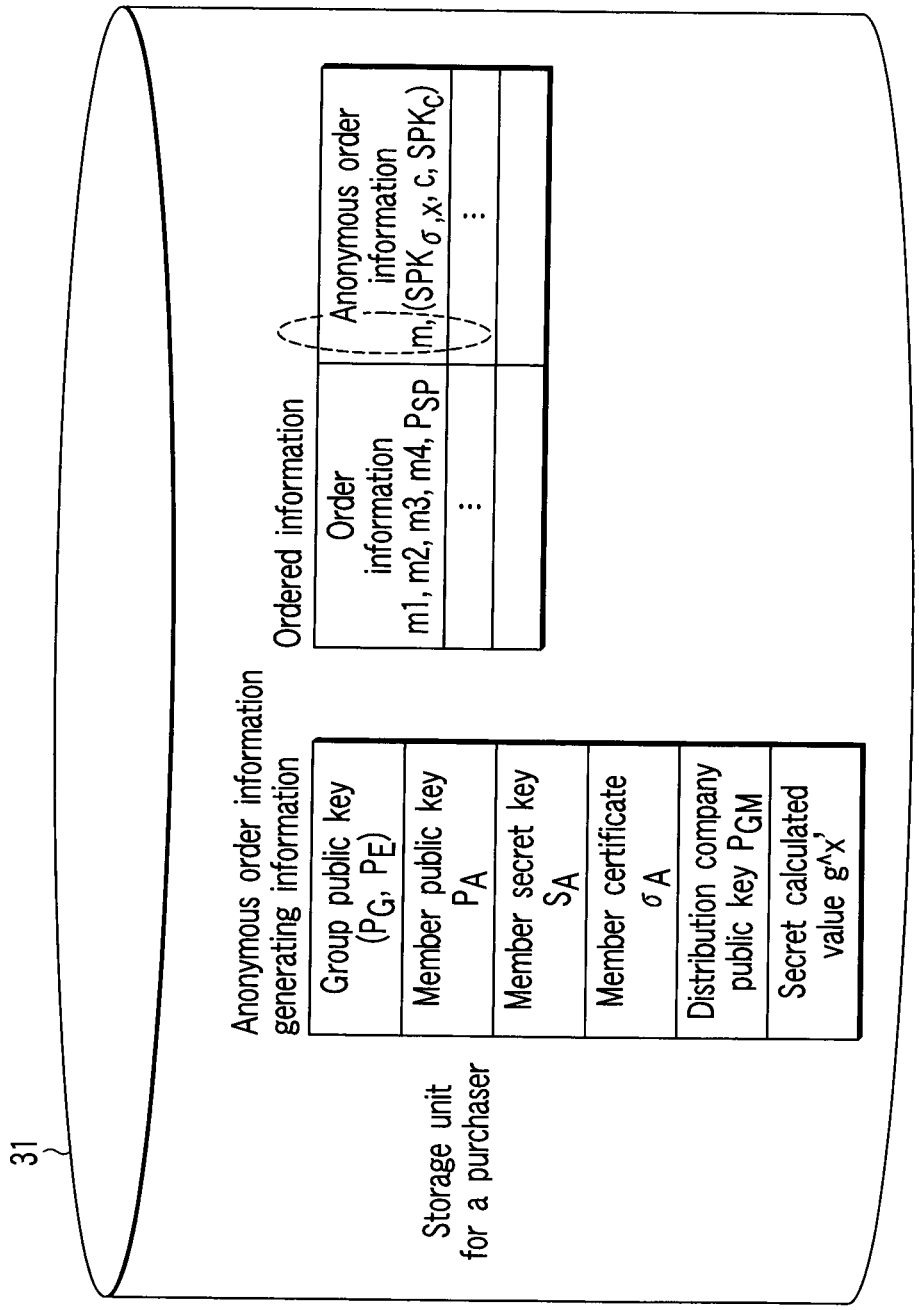
FIG. 20 is a schematic diagram showing the configuration of a storage unit for a purchaser in the same embodiment.
Figure 21:
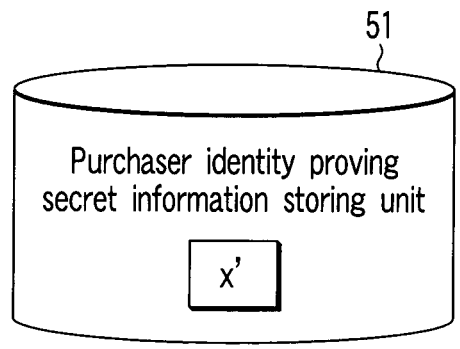
FIG. 21 is a schematic diagram showing the configuration of a purchaser identity proving secret information storing unit in the same embodiment.

FIG. 19 is a schematic diagram showing the configuration of an anonymous order system according to a fourth embodiment of the invention. FIG. 20 and FIG. 21 are schematic diagrams showing a storage unit for a purchaser, and a purchaser identity proving secret information storing unit, respectively, in the same embodiment.

This embodiment is a modification of the third embodiment. More specifically, the purchaser identity proving unit 39 and purchaser identity verifying unit 29 are separated from the purchaser apparatus 30 and shop apparatus 20, respectively, and constructed as a purchaser identity proving unit 50 and a purchaser identity verifying unit 60, respectively.

In the purchaser unit 30, among the parts 31-36, 38 and 39 shown in FIG. 12, the purchaser identity proving unit 39 is omitted, and the purchaser identity proving secret information generating unit 38 is modified a little as a purchaser identity proving secret information generating unit 38'.

The purchaser identity proving secret information generating unit 38' has the following functions (f38'-1)-(f38'-4).

(f38'-1): This function generates purchaser identity proving secret information x' upon initial setting.

(f38'-2): This function writes the generated purchaser identity proving secret information x' into the purchaser identity proving unit 50.

(f38'-3): This function calculates a secret calculation value g^x' by taking the purchaser identity proving secret information x' as a power exponent.

(f38'-4): This function writes the calculated secret calculation value g^x' into the storage unit for a purchaser 31.

In the storage unit for a purchaser 30, the secret calculation value g^x' is held as a part of anonymous order information generating information, and the purchaser identity proving secret information x' is omitted from ordered information, as shown in FIG. 20, unlike in FIG. 15.

In addition to the functions described above, the anonymous order information generating unit 35 has a function of separately generating the purchaser identity verifying information m5=(h, y)=(g^r, h^x') or m5'=(h', y')=(g^r', h'^x') (y=h^x'=(g^x')^r, y'=h'^x'=(g^x')^r'), based on the secret calculation value g^x' stored in the storage unit for a purchaser 31, generated random number r/f' and predetermined base g. Generation of the purchaser identity verifying information m5 and m5' is executed by using the secret calculation value g^x', without using the purchaser identity proving information x'.

On the other hand, the purchaser identity proving unit 50 is a unit that can be carried by a purchaser, like an IC card, and more specifically, provided with the purchaser identity proving secret information storing unit 51 and purchaser identity proving unit 39.

The purchaser identity proving secret information storing unit 51 is a memory to store the purchaser identity proving secret information x' written from a purchaser apparatus upon initial setting, and can be read from the purchaser identity proving unit 39, as shown in FIG. 21. The x' and g^x' may be written into the storing units 51 and 31 only once upon initial setting, and may be manually written into respective or one of the storing units 51 and 31. It is also permitted for the units 30 and 50 to be previously connected and the value x' corresponding to the secret calculation value g^x' to be automatically written into the purchaser identity proving secret information storing unit 51.

The purchaser identity proving unit 39 has the following functions (f39-1)-(f39-3).

(f39-1): This function generates zero knowledge proving information that the purchaser identity proving secret information x' related to one or more pieces of past order ID is common and that a purchaser knows it, based on the purchaser identity proving secret information x' in the purchaser identity proving secret information storing unit 51.

(f39-2): This function generates a request including one or more pieces of order ID and zero knowledge proving information.

(f39-3): This function sends the obtained request to "the purchaser identity verifying unit 60 configured to obtain anonymous order information from the shop apparatus 20".

In the shop apparatus 20, the purchaser identity verifying unit 29 among the units 21-26 and 29 is omitted, and an anonymous order information sending unit 71 is added. The anonymous order information sending unit 71 has the following functions (f71-1)-(f71-3).

(f71-1): When a request including an order ID is received from the purchaser identity verifying unit 60, this function verifies that the order ID exists in the order acceptance list stored in the storage unit for a shop 21.

(f71-2): When the order ID is found existing in the storage unit as a result of verification, this function reads anonymous order information corresponding to the order ID from the storage unit for a shop 21, and sends it to the purchaser identity verifying unit 60.

(f71-3): When no order ID is found in the storage unit as a result of verification, this function sends error information to the purchaser identity verifying unit 60.

The purchaser identity verifying unit 60 is a unit installed in many shops such as a convenience store, and more specifically, provided with a storing unit for verification 61, an anonymous order information receiving unit 62 and a purchaser identity verifying unit 29.

The storing unit for verification 61 is a memory writable from the anonymous order information receiving unit 62, and is readable/writable from the purchaser identity verifying unit 29, and is used to store anonymous order information received from the shop apparatus 20.

The anonymous order information receiving unit 62 has the following functions (f62-1) and (f62-2).

(f62-1): This function is controlled by the purchaser identity verifying unit 29, and reads one or more pieces of anonymous order information corresponding to the input "one or more order ID", from the shop apparatus 20.

(f62-2): This function writes one more anonymous order information read (received) from the shop apparatus 20, into the storing unit for verification 61.

The purchaser identity verifying unit 29 has the following functions (f29-1)-(f29-4).

(f29-1): This function controls the anonymous order information receiving unit 62 to read one or more pieces of anonymous order information corresponding to the input "one or more past order ID" from the shop apparatus 20.

(f29-2): This function receives a request including "one or more past order ID" and "zero knowledge proving information that the purchaser identity proving secret information corresponding to the one or more order ID is common and that a purchaser knows it", from the purchaser identity proving unit 50.

(f29-3): When the request is received, this function verifies the zero knowledge proving information, based on one or more pieces of purchaser identity verifying information included in one or more pieces of anonymous order information in the storing unit for verification 61.

(f29-4): When the result of verifying the zero knowledge verifying information is valid, this function accepts the request.

Next, an explanation will be given on the operations of the anonymous order system configured as described above.

Figure 22:
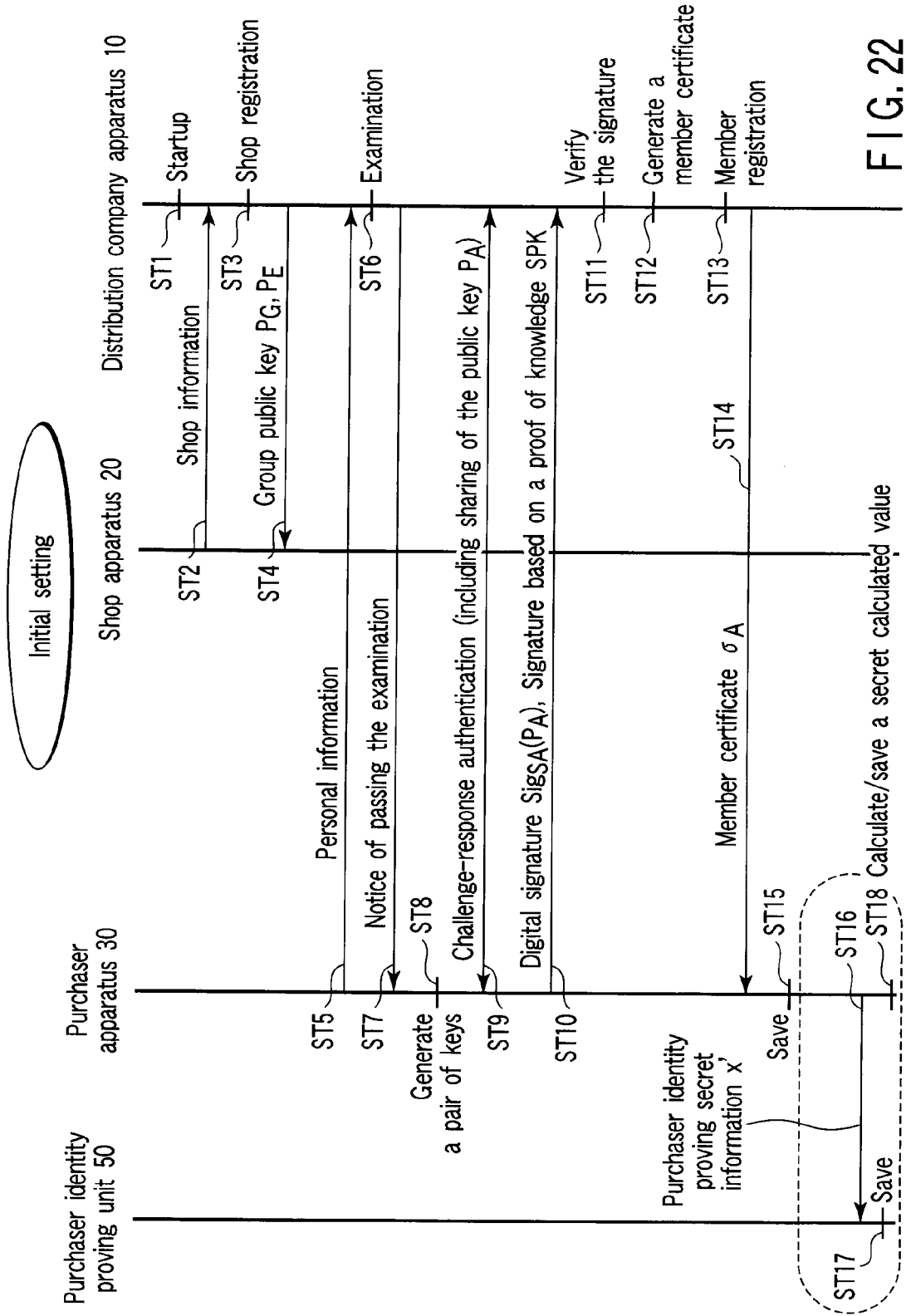
FIG. 22 is a sequence diagram for explaining the operation of initial setting in the same embodiment.

(Initial Setting: FIG. 22)

It is assumed that steps ST1-ST15 are executed as described before, and the member certificate σA is saved in the storage unit for a purchaser 31 in the purchaser apparatus 30.

Thereafter, in the purchaser apparatus 30, a purchaser identity proving secret information generating unit 38' generates the purchaser identity proving secret information x', and inputs the purchaser identity proving secret information x' into the purchaser identity proving unit 50 (ST16). In the purchaser identity proving unit 50, the purchaser identity proving secret information x' is written and saved in the purchaser identity proving secret information storing unit 51 (ST17).

In the purchaser apparatus 30, the purchaser identity proving secret information generating unit 38' calculates the secret calculation value g^x' by taking the purchaser identity proving secret information x' as a power exponent, and writes the secret calculation value g^x' into the storage unit for a purchaser 31 (ST18).

The purchaser apparatus 30 and purchaser identity proving unit 50 may perform the operations subsequent to the added step ST16 only once upon registration of a member (initial setting). Thereafter, a purchaser can make an anonymous order and receive merchandise any number of times by using the secret calculation value g^x' and purchaser identity proving secret information x' stored upon initial setting.

Figure 23:
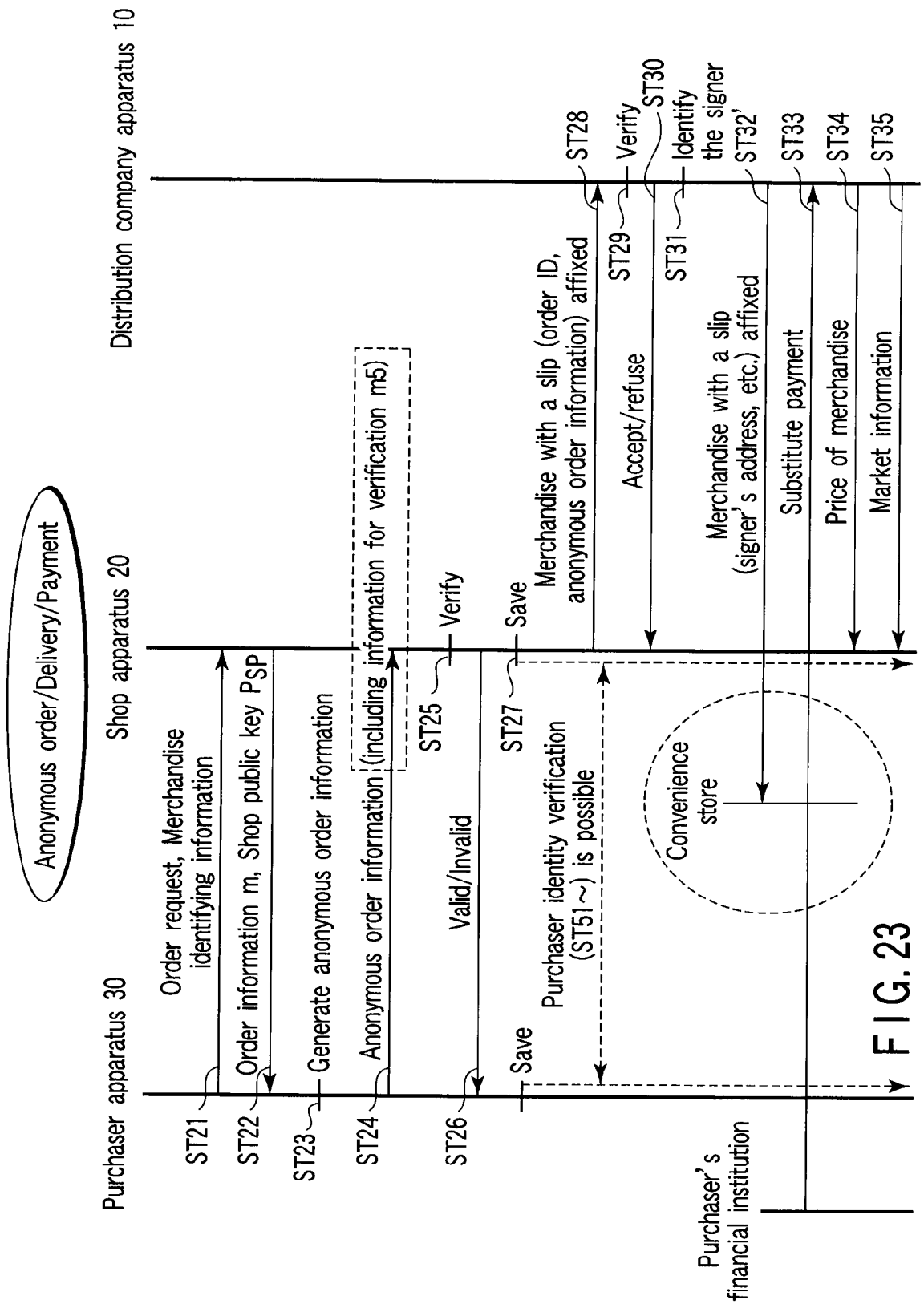
FIG. 23 is a sequence diagram for explaining the operations of an anonymous order, delivery and payment in the same embodiment.

(Anonymous Order/Delivery/Payment: FIG. 23)

Now, steps ST21-ST22 are assumed to be executed, as described hereinbefore. Next, in the purchaser apparatus 30, the anonymous order information generating unit 35 reads the secret calculation value g^x' from the storage unit for a purchaser 31, when generating anonymous order information.

Then, the anonymous order generating unit 35 separately generates the purchaser identity verifying information m5= (h, y)=(g^r, h^x')(here, y=h^x'=(g^x')^r), based on the secret calculation value g^x', random number r, and base g.

The anonymous order information generating unit 35 generates anonymous order information that includes the purchaser identity verifying information m5 in a message m (ST23). At this time, the anonymous order information generating unit 35 generates the anonymous order information so as to include the secret message $E_{P\_GM}$ (m4) to a distribution company, specifying a convenience shop to receive merchandise, by the operation of a purchaser.

Thereafter, the anonymous order information generating unit 35 sends the anonymous order information to the shop apparatus 20 through the anonymous order unit 34 (ST24). The anonymous order information generating unit 35 writes the anonymous order information into the storage unit for a purchaser 31, together with m1, m2, m3, m4 and $P_{SP}$.

When the anonymous order information is received, the shop apparatus 20 executes the steps ST25-ST27, as described hereinbefore. As a result, when the order information and anonymous order information are saved in the storage unit for shop 21, the purchaser identity verifying operation described later becomes possible.

The following steps ST28-ST34 of delivery and payment are executed as described before, except that the merchandise delivery destination is a convenience store. The delivery destination is specified by the secret message $E_{P\_GM}$ (m4) in the step ST23.

Figure 24:
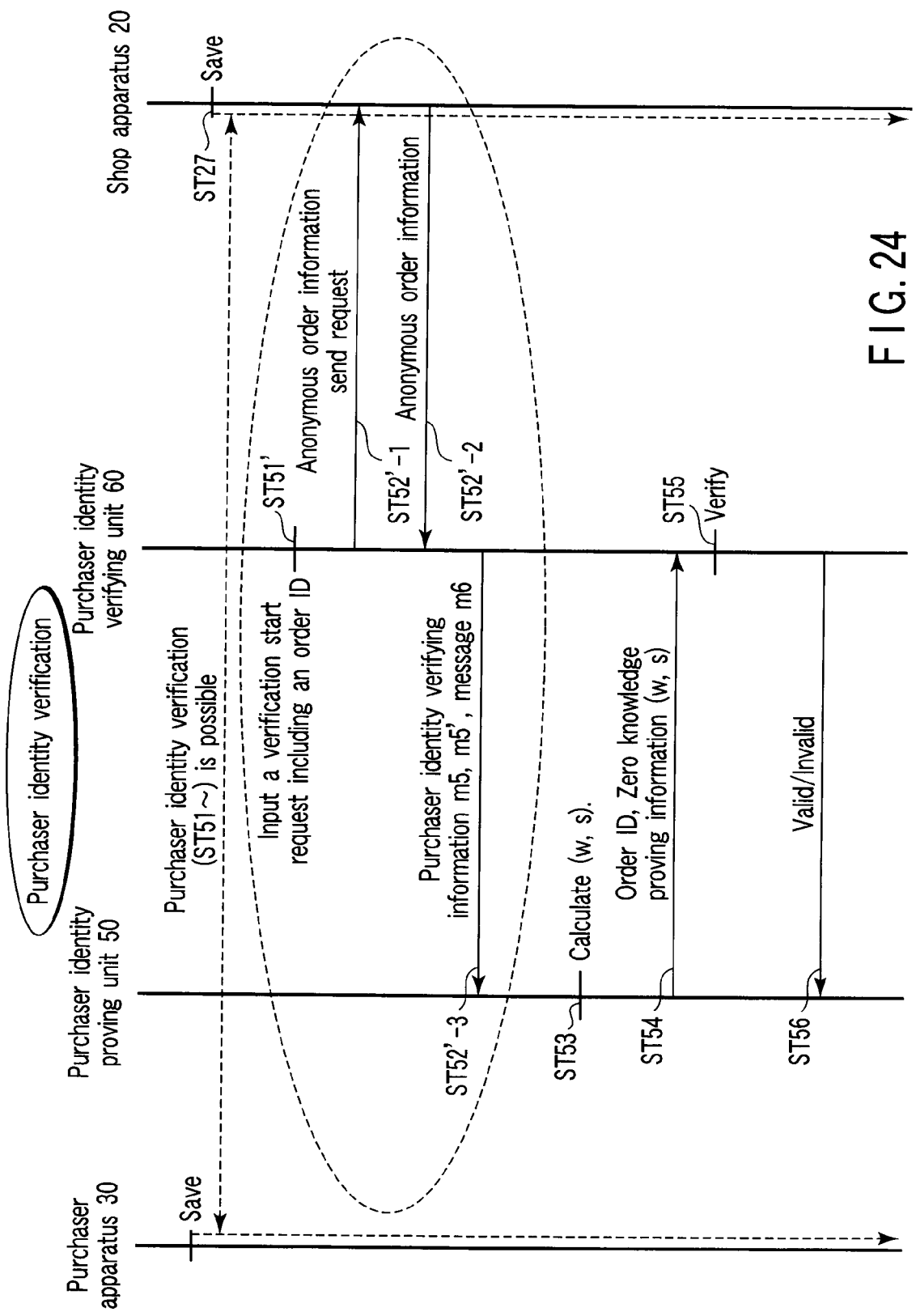
FIG. 24 is a sequence diagram for explaining the operation of a purchaser identity verifying process in the same embodiment.

(Purchaser Identity Verification; FIG. 24)

It is assumed that after the above-mentioned step ST27, a purchaser wants to make a request concerning a past order to the shop apparatus 20.

A purchaser goes to a convenience store specified as a place to receive merchandise, and asks a salesclerk to input a verification start request including one or more pieces of past order ID.

When the number of order IDs is one, the same operations as those on and after the step ST51 in the second embodiment may be performed. When the number of order IDs is three or more, it is easy to expand from the case of two order IDs. Therefore, an explanation will be given on the case of two order IDs.

In the purchaser identity verifying unit 60, when a verification start request including two past order IDs is input by the operation of a salesclerk (ST51'), the purchaser identity verifying unit 29 controls the anonymous order information receiving unit 62, to read two anonymous pieces of order information corresponding to "two order IDs".

The anonymous order information receiving unit 62 sends the shop apparatus 20 a sending request including the two order IDs corresponding to two pieces of anonymous order information (ST52'-1).

In the shop apparatus 20, when the request including two order IDs is received, the anonymous order information sending unit 71 verifies that the order IDs are included in the order acceptance list in the storage unit for a shop 21. When the order IDs are found included in the order acceptance list as a result of the verification, the anonymous order information sending unit 71 reads the two pieces of anonymous order information corresponding to the two order IDs from the storage unit for a shop 21, and sends them to the anonymous order information receiving unit 62 (ST52'-2).

The anonymous order information receiving unit 62 writes these two pieces of anonymous order information into the storing unit for verification 61. The purchaser identity verifying unit 29 takes out the purchaser identity verifying information m5=(h, j), m5'=(h7, y'), respectively from two pieces of anonymous order information in the storing unit for verification 61. Further, the purchaser identity verifying unit 29 generates a message m6 including a random number a. Thereafter, the purchaser identity verifying unit 29 sends the purchaser identity verifying unit 50 these pieces of purchaser identity verifying information m5, m5' and message m6.

When the purchaser identity verifying information m5, m5' and message m6 are received, the purchaser identity verifying unit 50 calculates the zero knowledge proving information w, s∈z, as described before (ST53). The zero knowledge proof (w, s) indicates that the discrete logarithm x' of y for the base h is the same as the discrete logarithm x' of y' for the base h'.

$$w=H(y\|y'\|h\|h'\|h''\|m6)$$

$$s=t-wx'$$

Thereafter, the purchaser identity proving unit 39 sends the purchaser identity verifying unit 60 a request including two order IDs and zero knowledge proving information (w, s) (ST54).

When the request including two order IDs and zero knowledge proving information (w, s) is received, the purchaser identity verifying unit 60 further checks whether the following verifying equation is established, based on the purchaser identity verifying information m5 and m5' in the anonymous order information related to those order IDs, received zero knowledge proving information (w, s) and message m6 including a random number a (ST55).

$$w=H(y\|y'\|h\|h'\|h^s \cdot y^w\|h'^s \cdot y'^w\|m6)$$

When the verifying equation is found established as a result of the verification, the purchaser identity verifying unit 60 returns the result of the verification "valid" to the purchaser identity proving unit 50 (ST56; valid), and accepts the request. The operations for the accepted request are executed as described hereinbefore. When the accepted request is a request to receive merchandise, a salesclerk delivers the corresponding merchandise to the purchaser.

As described above, according to this embodiment, only the purchaser identity proving function and verifying function are separated from the other functions, and the application of an anonymous order can be expanded in addition to the effect of the third embodiment, and the security can be improved.

For example, a new service such that a purchaser makes an anonymous order for merchandise from the purchaser apparatus through the internet, and receives the merchandise at a shop by confirming personal identity at the purchaser identity proving unit 60 (this is impossible by a conventional anonymous order) becomes possible, and the application of an anonymous order can be extended.

On the purchaser side, the purchaser apparatus 30 is separated from purchaser identity proving unit 60, and even if one of apparatus 30 and unit 60 is illegally used, illegal reception of merchandise by an illegal order can be prevented. For example, even if an illegal order is made by illegally analyzing and using the purchaser apparatus 30, the ordered merchandise cannot be received without the purchaser identity proving unit 60. Contrarily, even if the purchaser identity proving unit 60 is lost or stolen, merchandise cannot be ordered without the purchaser apparatus 30. Namely, unless both units 30 and 60 are illegally used, illegal acceptance of merchandise by an illegal order can be prevented.

Further, on the shop side, the order of accepting an anonymous order through the internet is separated from the function of confirming a purchaser at a shop, the security can be improved and management cost can be reduced.

Modification of Embodiment 4

<4-1> For transfer of anonymous order information between the shop apparatus 20 and purchaser identity verifying unit 60, online communication need not be used, and any means of delivering anonymous order information together with merchandise may be used.

Figure 25:
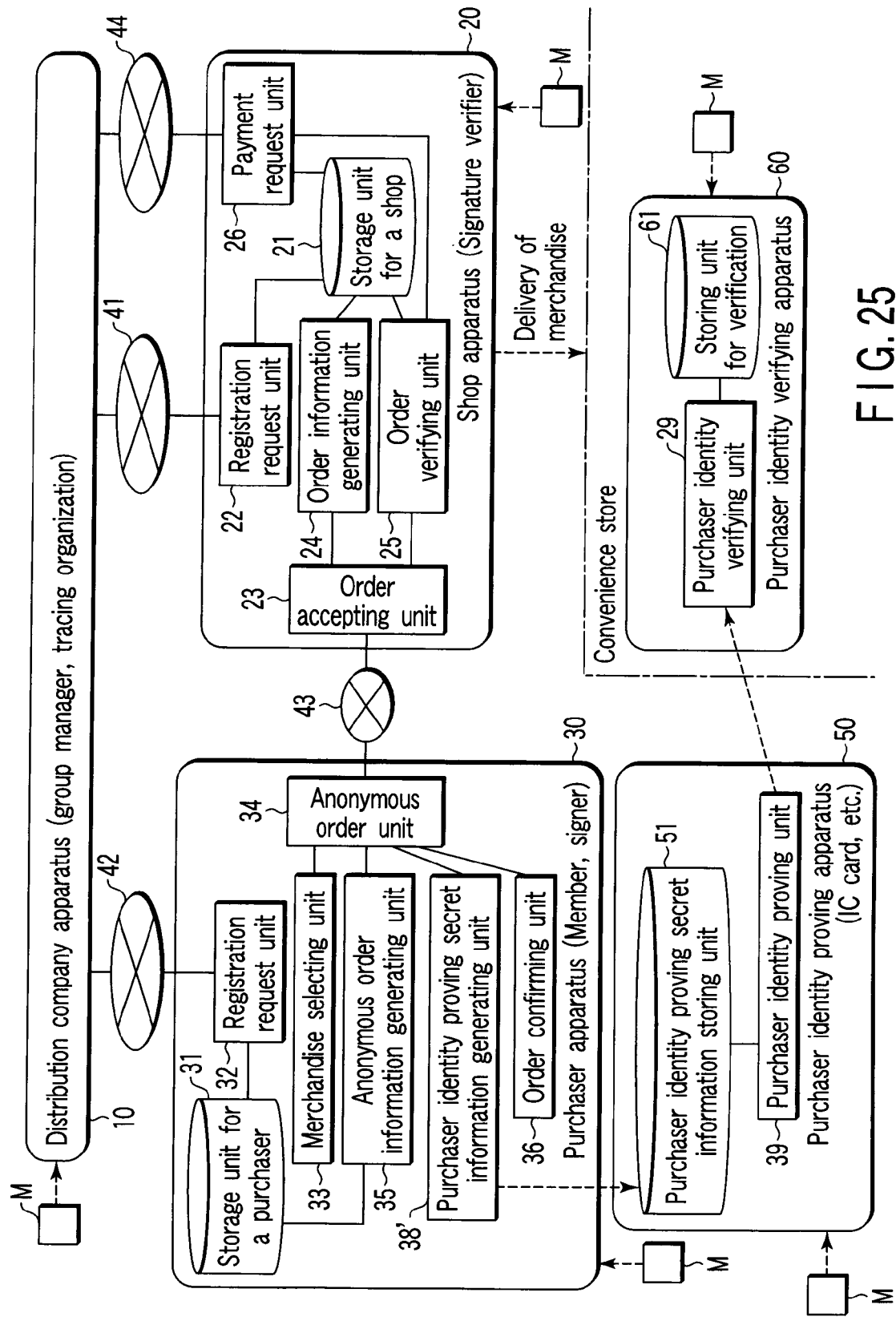
FIG. 25 is a schematic diagram showing the configuration of an anonymous order system according to a first modification of the same embodiment.

More specifically, as shown in FIG. 25, the embodiment of the invention may be modified to omit the configuration for transferring anonymous order information between the shop apparatus 20 and purchaser identity verifying unit 60 (an anonymous order information sending unit 71, a network 46 and an anonymous order information receiving unit 62).

In this modification, "a storage medium storing anonymous order information" is delivered together with merchandise, from the shop apparatus 20 to a convenience stored through the distribution company apparatus 10.

In a convenience store, after the step ST51', the operation may be executed from the step ST52' as described before, by reading anonymous order information from a storage medium.

This modification <4-1> can be applied to all of the following modifications, by omitting the anonymous order information sending unit 71, network 46 and anonymous order information receiving unit 62.

<4-2> An example of application to the third embodiment is described above. The fourth embodiment is also applicable to the first and second embodiments. In such cases, it is necessary to input the information upon placement of an order (e.g., an order ID) into the purchaser identity proving unit 50.

<1> of <4-2> When the modification is applied to the second embodiment, for example, in the purchaser identity proving unit 50, a secret information writing/processing unit 52 is added to the configuration shown in FIG. 19, as shown in FIG. 27. In the configuration shown in FIG. 19, the purchaser apparatus 30 is further provided with a secret information writing request unit 81.

Figure 28:
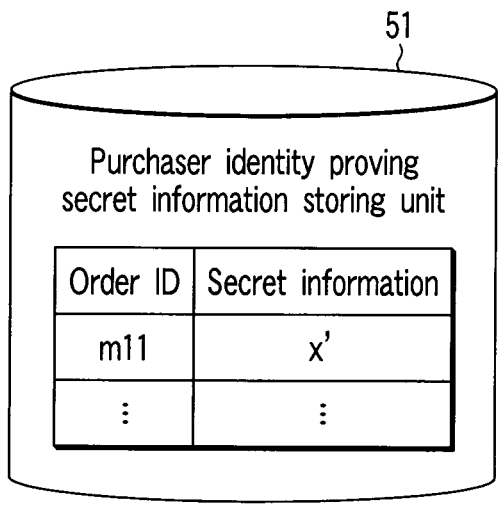
FIG. 28 is a schematic diagram showing the configuration of a purchaser identity proving secret information storing unit in the same modification.

When an order ID and purchaser identity proving secret information x' are received from the secret information writing request unit 81 through a communication channel 46, the secret information writing/processing unit 52 correlates and writes the order ID and purchaser identity proving secret information x' into the purchaser identity proving secret information storing unit 51, as shown in FIG. 28.

The secret information writing request unit 81 has the function of sending the secret information writing unit 52 an order ID and purchaser identity proving secret information x' for each anonymous order.

In the process of handling an anonymous order, communication is safely performed between the purchaser apparatus 30 and purchaser identity proving unit 50 each time an order is placed, and operations of correlating and writing the purchaser identity proving secret information x' and order ID for each order into the purchaser identity proving secret information storing unit 51 (ST27'-1, ST27'-2) are added, as shown in FIG. 28 and FIG. 29). Thus, the purchaser identity proving unit 50 is necessary even when an order is placed. The purchaser identity proving unit 50 reads the purchaser identity proving secret information x' each time an order is placed even though the content is different, and desirably has tamper-resistance.

In the operation of proving the purchaser identity, as shown in FIG. 30, after the purchaser identity proving unit 50 inputs "a verification start request including an order ID" into the purchaser identity verifying unit 60 in the step ST51', the operations at and after the step ST52"-1 are executed as described before.

Figure 31:
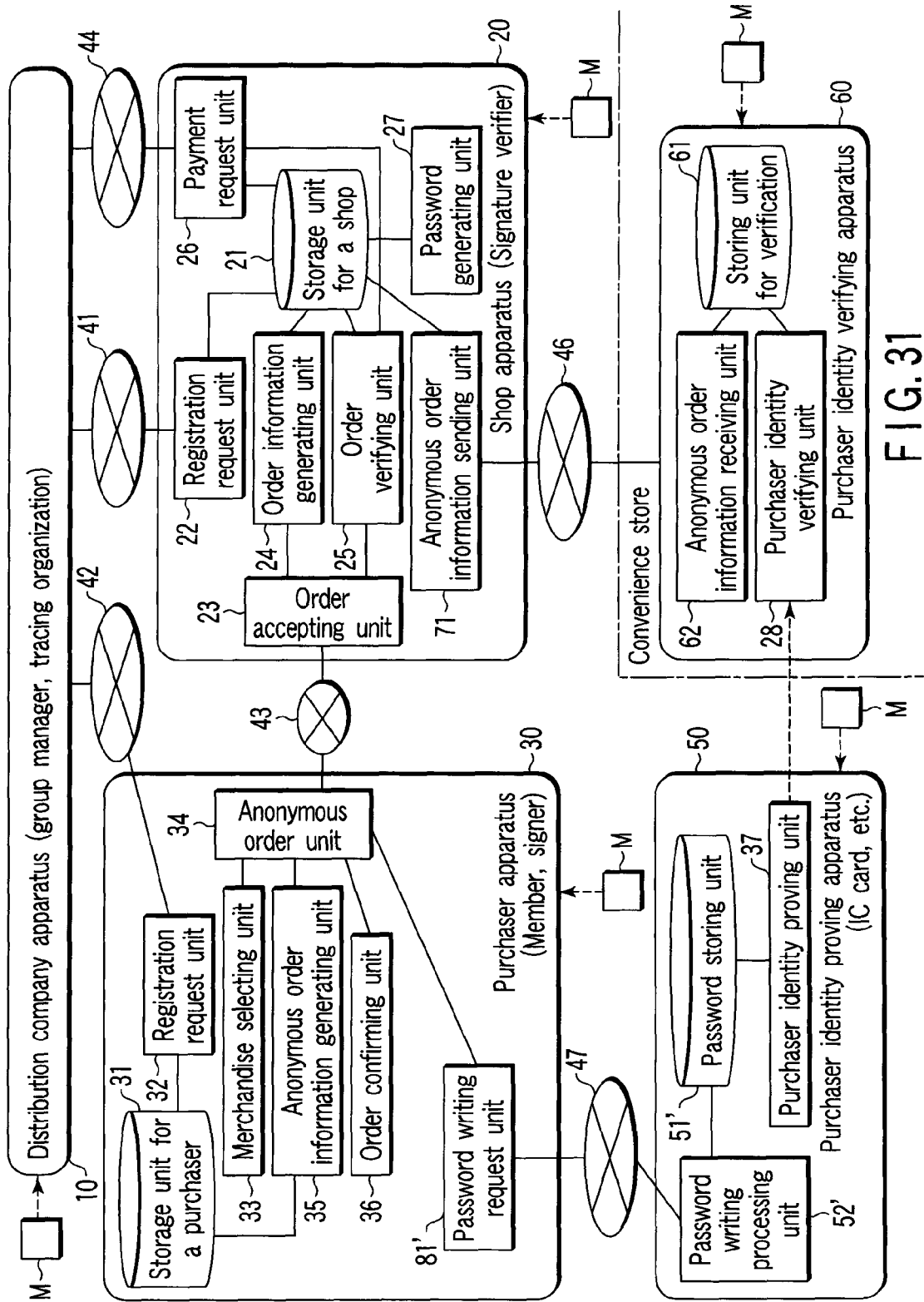
FIG. 31 is a schematic diagram showing the configuration of another anonymous order system of the same modification.

<2> of <4-2> When the modification is applied to the first embodiment, in the purchaser identity proving unit 50, the purchaser identity proving secret information storing unit 51 is replaced by a password storing unit 51', and a password writing/processing unit 52' is added in the configuration shown in FIG. 19, as shown in FIG. 31. The purchaser apparatus 30 is further provided with a password writing request unit 81' in the configuration shown in FIG. 19.

Figure 32:
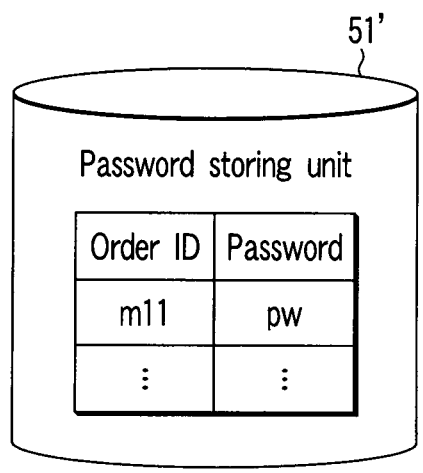
FIG. 32 is a schematic diagram showing the configuration of another storage unit for purchaser identity proving secret information in the same modification.

When an order ID and password PW are received from the password writing request unit 81' through the communication channel 46, the password writing/processing unit 52' correlates and writes the order ID and password PW into the password storing unit 51', as shown in FIG. 32.

The password writing request unit 81' has the function of sending an order ID and password PW to the password writing/processing unit 52' for each anonymous order.

Figure 33:
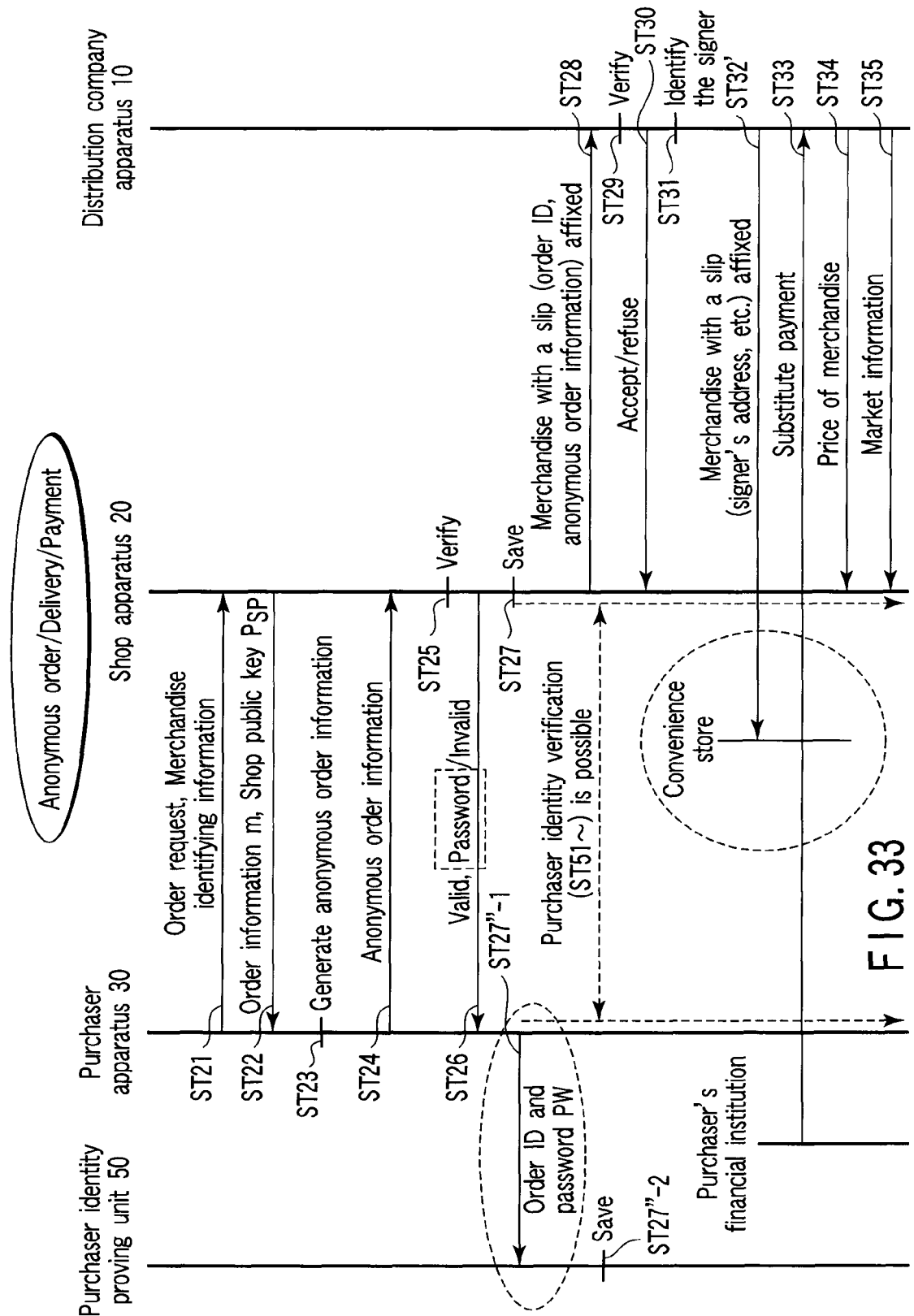
FIG. 33 is a sequence diagram for explaining the operations of another anonymous order, delivery and payment of the same modification.

In the process of handling an anonymous order, communication is safely performed between the purchaser apparatus 30 and purchaser identity proving unit 50 each time an order is placed, and operations of correlating and writing a password PW and an order ID for each order into the purchaser identity proving secret information storing unit 51' (ST27'-1, ST27'-2) are added, as shown in FIG. 32 and FIG. 33. Thus, the purchaser identity proving unit 50 is necessary even when an order is placed. The purchaser identity proving unit 50 reads the purchaser identity proving secret information x' each time an order is placed even though the content is different, and desirably has tamper-resistance.

In the operation of verifying the purchaser identity, as shown in FIG. 34, the purchaser identity proving unit 50 inputs "a request including an order ID and a password" into the purchaser identity verifying unit 60 (ST41"). The purchaser identity verifying unit 60 sends a password sending request including an order ID to the shop apparatus 20 (ST42"-1), and receives a corresponding password from the shop apparatus 20, when the corresponding order ID exists (ST42"-2).

Thereafter, the purchaser identity verifying unit 60 verifies that both passwords are identical, and when they are found identical, returns the verification result "valid" to the purchaser identity proving unit 50 (ST43"; valid), and accepts the request.

Contrarily, when both passwords PW are found not identical as a result of the verification in the step ST42", the purchaser identity verifying unit 60 returns the verification result "invalid" to the purchaser identity proving unit 50 (ST43"; invalid).

<4-3> When the purchaser identity proving unit 50 has low processing capacity or does not have sufficient computing power (e.g., in the case of a memory card), and computations are impossible, the purchaser identity proving secret information x' may be read from the purchaser identity proving unit 50, and certified/verified in the purchaser identity verifying unit 60. However, in this case, it is preferable to establish a safe communication channel for reading to prevent leakage of the purchaser identity proving secret information x', and to ensure the security by making the purchaser identity verifying unit 60 damper-resistant, for example.

Figure 35:
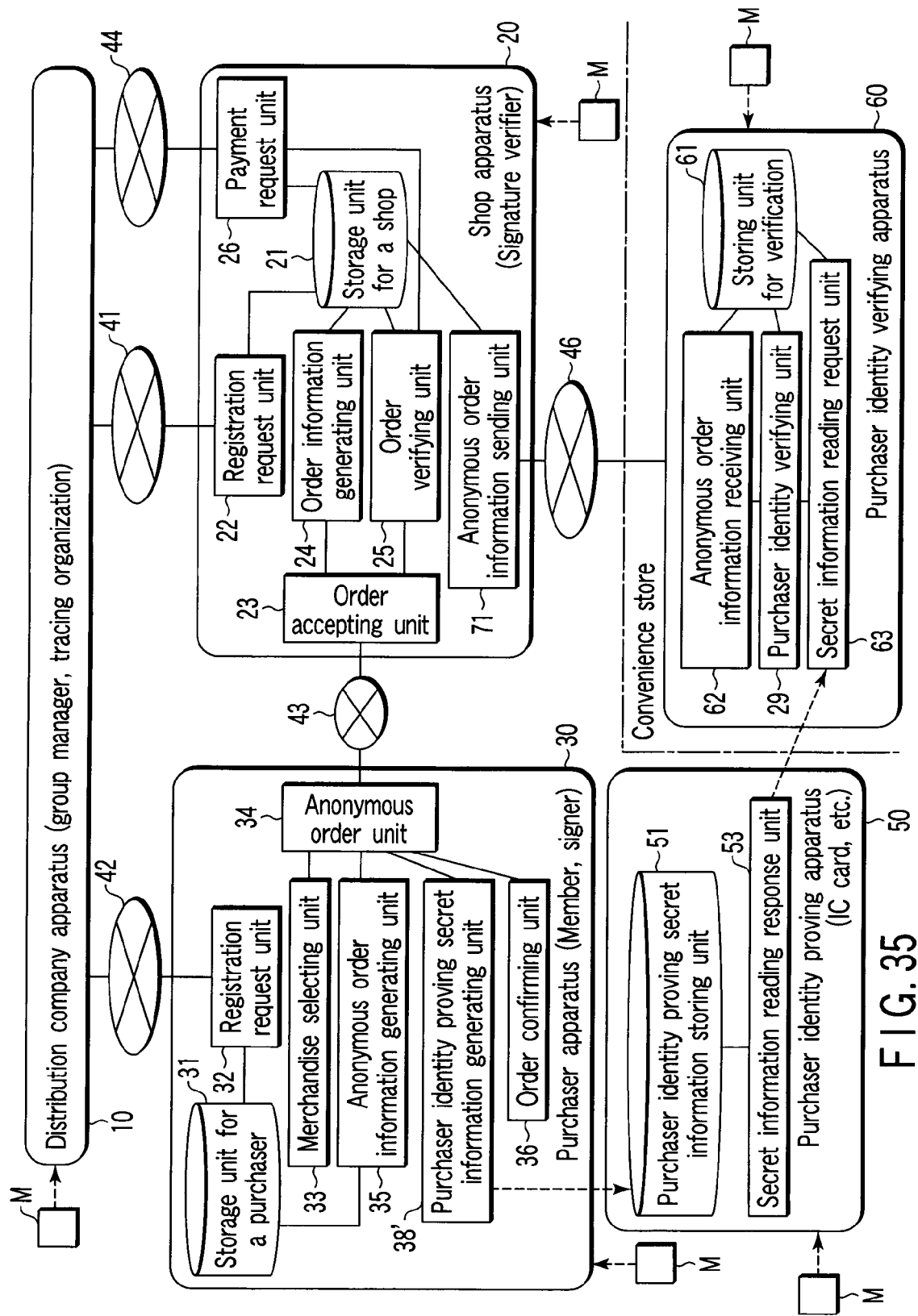
FIG. 35 is a schematic diagram showing the configuration of an anonymous order system according to a third modification of the fourth embodiment of the invention.

More specifically, the purchaser identity proving unit 50 is provided with a secret information reading response unit 53, instead of the purchaser identity proving unit 39 shown in FIG. 19, as shown in FIG. 35. Further, the purchaser identity verifying unit 60 is also provided with a secret information reading request unit 63 in the configuration shown in FIG. 19.

The secret information reading response unit 53 sends the secret information reading request unit 64 the purchaser identity proving secret information x' in the purchaser identity proving secret information storing unit 51, in response to the sending request receiving from the secret information reading request 63.

The secret information reading request unit 63 has the following functions (f63-1) and (f63-2).

(f63-1): This function is controlled by the purchaser identity verifying unit 29, and sends the secret information reading response unit 53 a request to send the purchaser identity proving secret information x'.

(f63-2): This function sends the purchaser identity verifying unit 29 the purchaser identity proving secret information received from the secret information reading/answering unit 63.

Figure 36:
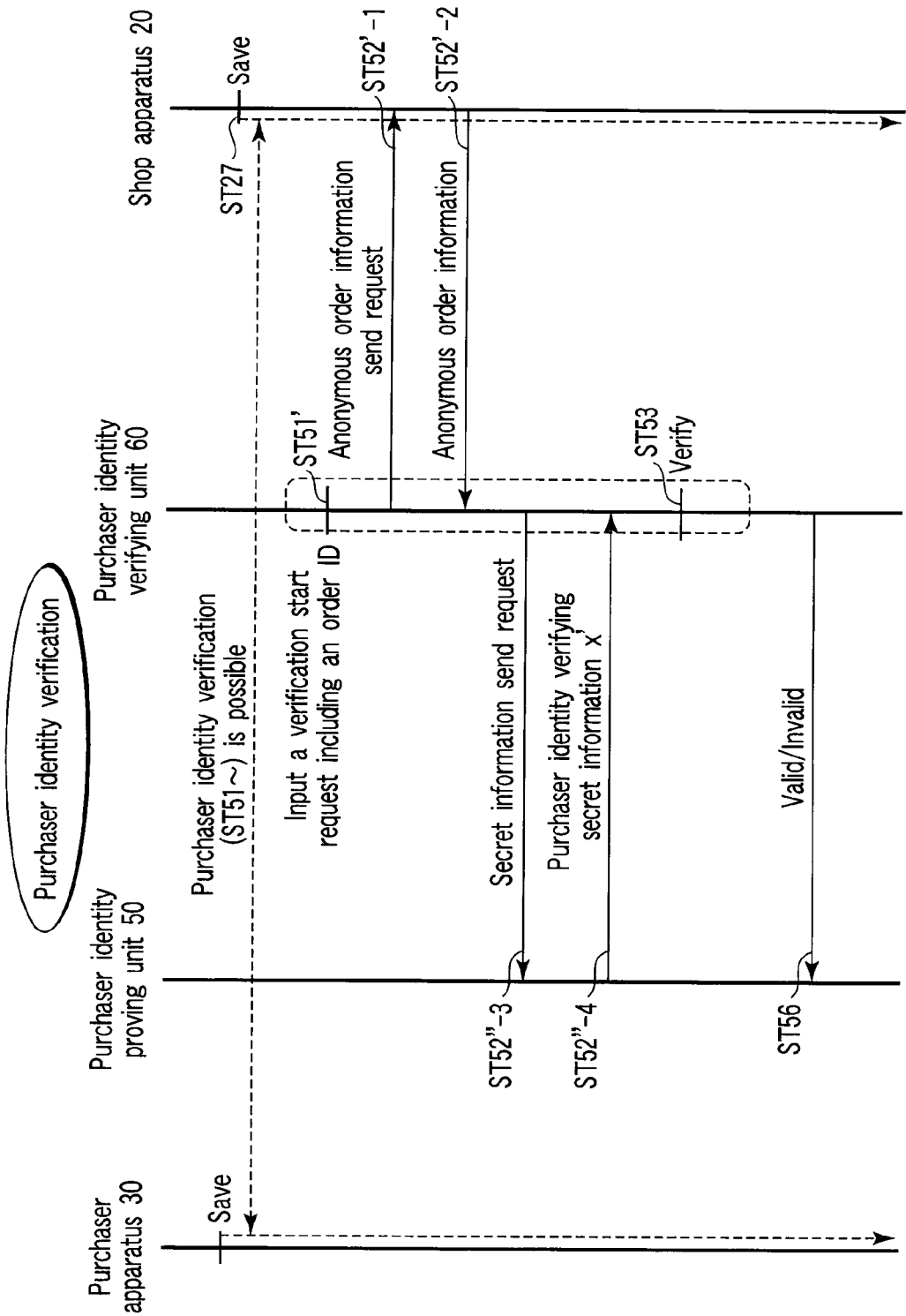
FIG. 36 is a sequence diagram for explaining the operation of a purchaser identity verifying process in the same modification.

In the process of verifying the purchaser identity, as shown in FIG. 36, the steps ST51'-ST52'-2 as described before, and one or more pieces of anonymous order information is written in the storing unit for verification 61. The purchaser identity verifying unit 29 takes out purchaser identity verifying information from each piece of anonymous order information in the storing unit 61 for verification.

Thereafter, the purchaser identity verifying unit 60 sends a secret information sending request to the purchaser identity proving unit 50 (ST52"-3).

In response to the sending request, the purchaser identity proving unit 50 sends the purchaser identity verifying unit 60 the purchaser identity verifying secret information x' in the purchaser identity proving secret information storing unit 51 (ST52"-4).

Then, the purchaser identity verifying unit 60 verifies that y=h^x' is established for each piece of anonymous order information m5=(h, y), based on the purchaser identity proving secret information x' (ST53).

Thereafter, the operations on and after the step ST56 are executed according to the result of verification, as described hereinbefore.

The technique described above for the embodiment can be stored as a program to be executed by a computer in memory mediums including magnetic disks (Floppy™ disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the OS (operating system) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

The techniques used in the embodiments described hereinbefore can also be expressed as follows.

1. An anonymous order program stored in a storage medium (M) readable from a computer used in a shop apparatus (20) configured to communicate with both of a manager apparatus (10) configured to pay for a purchaser's anonymous order by a group signature scheme having a tracing function, and a purchaser apparatus (30) for making an anonymous order for a sales object by the group signature scheme, comprising: a first program code (27) to cause the computer to execute writing of "anonymous order information including an order ID and a group signature" received from a purchaser apparatus in the past, and a password issued corresponding to the anonymous order information, in being correlated with each other, into a storage unit (21) of a computer of the shop apparatus; a second program code (24) to issue an order ID based on sales object identifying information received from a purchaser apparatus of a purchaser, and to cause the computer to execute sending of the order ID to the purchaser apparatus; a third program code (25) to cause the computer to execute verification of the group signature, when the anonymous order information including an order ID and a group signature is received from a purchaser apparatus; a fourth program code (27) to issue a password corresponding to anonymous order recent information, and to cause the computer to execute saving of the anonymous order recent information and password in the storage unit, when the result of verifying the group signature is valid; a fifth program code (27) to cause the computer to execute sending of the issued password to the purchaser apparatus; a sixth program code (26) to cause the computer to execute sending of anonymous order information to the manager apparatus; a seventh program code (28) to cause the computer to execute verification of the order ID and password by referring to the storage unit, when a request including the order ID and password in the past is received from a purchaser apparatus; and an eighth program code (28) to cause the computer to execute acceptance of the request, when the result of verifying the order ID and password is valid.

2. An anonymous order program stored in a storage medium (M) readable from a computer used in a purchaser apparatus (30) configured to communicate with both of a manager apparatus (10) configured to pay for a purchaser's anonymous order by a group signature scheme having a tracing function, and a shop apparatus (20) for receiving an anonymous order for a sales object by the group signature scheme, comprising: a first program code (35) to cause the computer to execute writing of past anonymous order information and password, in being correlated with each other, into a storage unit (31) of a computer of the purchaser apparatus; a second program code (35) to cause the computer of the purchaser apparatus to execute generation of anonymous order information including an order ID and a group signature, by the operation of a purchaser, when the order ID is received from the shop apparatus; a third program code (35) to cause the computer to execute sending of obtained anonymous information to the shop apparatus; a fourth program code (35) to cause the computer to execute writing of a password received from the shop apparatus in correspondence with the sending, into a storage unit (31) of the computer, by correlating with anonymous order recent information; a fifth program code (37) to cause the computer to execute generation of a request including an order ID and a password in the storage unit, by the operation of a purchaser; and a sixth program code (37) to cause the computer to execute sending of an obtained request to the shop apparatus.

3. An anonymous order program stored in a storage medium (M) readable from a computer used in a shop apparatus (20) configured to communicate with both of a manager apparatus (10) configured to pay for a purchaser's anonymous order by a group signature scheme having a tracing function, and a purchaser apparatus (30) for making an anonymous order for a sales object by the group signature scheme, comprising: a first program code (25) to cause the computer to execute writing of anonymous order information into a storage unit (21) of a computer of a shop apparatus, when "anonymous order information including an order ID, purchaser identity verifying information and a group signature" is received from the purchaser apparatus, after purchaser identity proving secret information corresponding to the order ID, purchaser identity verifying information generated based on the purchaser identity proving secret information corresponding to the order ID and unable to estimate, and a group signature based on the order ID and purchaser identity verifying information are generated by a purchaser apparatus in the past, with respect to purchaser identity proving secret information which is itself unable to be estimated from the manager apparatus and shop apparatus, and unable to be estimated from the manger apparatus and shop apparatus even based on the purchaser identity verifying information generated based on the purchaser identity proving secret information; a second program code (24) to issue an order ID based on sales object identifying information received from a purchaser apparatus of a purchaser, and to cause the computer to execute sending the order ID to the purchaser apparatus; a third program code (25) to cause the computer to execute verification of the group signature, when the anonymous order information including an order ID, purchaser identity verifying information and group signature is received from a purchaser apparatus; a fourth program code (25) to cause the computer to execute saving of anonymous order recent information in the storage unit, when the result of verifying the group signature is valid; a fifth program code (25) to cause the computer to execute sending of anonymous order information to the manager apparatus; a sixth program code (29) to cause the computer to execute retrieval of purchaser identity verifying information concerning the order ID from a storage unit, when "a past order ID" and "zero knowledge proving information that a purchaser knows purchaser identity verifying secret information corresponding the order ID" are received from a purchaser apparatus; a seventh program code (29) to cause the computer to execute verification of the zero knowledge proving information, based on the retrieved purchaser identity verifying information; and an eighth program code (29) to cause the computer to execute acceptance of the request, when the result of verifying the zero knowledge proving information is valid.

4. The anonymous order program according to item 3, wherein the sixth program code (29) is a code to cause the computer to execute retrieval of one or more pieces of purchaser identity verifying information concerning the one or more pieces of order ID from the storage unit, when a request including "one or more past order ID" and "zero knowledge proving information that purchaser identity proving secret information corresponding to the one or more order ID is common and that a purchaser knows that" is received from a purchaser apparatus, and the seventh program code (29) is a code to cause the computer to execute verification of the zero knowledge proving information, based on the retrieved one or more pieces of purchaser identity verifying information.

5. An anonymous order program stored in a storage medium (M) readable from a computer used in a purchaser apparatus (30) configured to communicate with both of a manager apparatus (10) configured to pay for a purchaser's anonymous order by a group signature scheme having a tracing function, and a shop apparatus (20) for receiving an anonymous order for a sales object by the group signature scheme, comprising: a first program code (38) to cause the computer to execute writing of past "anonymous order information including an order ID, purchaser identity verifying information corresponding to the order ID and generated based on purchaser identity proving secret information, and a group signature" and "purchaser identity proving secret information", in being correlated with each other, into a storage unit (31) of a computer of the shop apparatus, with respect to purchaser identity proving secret information which is itself unable to estimate from the manager apparatus and shop apparatus, and unable to estimate from the manger apparatus and shop apparatus even based on the purchaser identity verifying information generated based on the purchaser identity proving secret information; a second program code (35) to cause the computer to execute generation of anonymous order information including the order ID, purchaser identity verifying information and a group signature, by the operation of a purchaser, when an order ID is received from the shop apparatus; a third program code (35) to cause the computer to execute sending of obtained anonymous order information to the shop apparatus; a fourth program code (39) to cause the computer to execute retrieval of purchaser identity proving secret information concerning a past order ID from the storage unit, by the operation of a purchaser; a fifth program code to cause the computer to execute generation of zero knowledge proving information that a purchaser knows the purchaser identity proving secret information corresponding to the order ID; a sixth program code (39) to cause the computer to execute generation of a request including the order ID and zero knowledge proving information, by the operation of a purchaser; and a seventh program code (39) to cause the computer to execute sending of an obtained request to the shop apparatus.

6. The anonymous order program according to item 5, wherein the fourth program code (39) is a code to cause the computer to execute retrieval of common purchase identity proving secret information concerning one or more pieces of past order ID from the storage unit, by the operation of a purchaser; the fifth program code (39) is a code to cause the computer to execute generation of zero knowledge proving information that the purchaser identity proving secret information is common and that a purchaser knows it, based on the retrieved purchaser identity proving secret information; and the sixth program code (39) is a code to cause the computer to execute generation of a request including the one or more pieces of order ID and zero knowledge proving information, by the operation of a purchaser.

7. A shop apparatus (20) configured to communicate with both of a manager apparatus (10) configured to pay for a purchaser's anonymous order by a group signature scheme having a tracing function, and a purchaser apparatus (30) for making an anonymous order for a sales object by the group signature scheme, comprising: a storage device (21) which is configured to store "anonymous order information including an order ID and a group signature" received from a purchaser apparatus in the past, and a password issued corresponding to the anonymous order information, in being correlated with each other; an order ID issuing device (24) which is configured to issue an order ID based on sales object identifying information received from a purchaser apparatus of a purchaser, and to send the order ID to the purchaser apparatus; a signature verifying device (25) which is configured to verify the group signature, when the anonymous order information including an order ID and a group signature is received from a purchaser apparatus; a password issuing device (27) which is configured to issue a password corresponding to anonymous order recent information, and to save the anonymous order recent information and password in the storage device, when the result of verifying the group signature is valid; a password sending device (27) which is configured to send the issued password to the purchaser apparatus; an anonymous order sending device (26) which is configured to send anonymous order information to the manager apparatus; a password verifying device (28) which is configured to verify the order ID and password by referring to the storage device, when a request including a past order ID and a password is received from a purchaser apparatus; and a request accepting device (28) which is configured to accept the request, when the result of verifying the order ID and password is valid.

8. A purchaser apparatus (30) configured to communicate with both of a manager apparatus (10) configured to pay for a purchaser's anonymous order by a group signature scheme having a tracing function, and a shop apparatus (20) for receiving an anonymous order for a sales object by the group signature scheme, comprising: a storage device (31) which is configured to store past anonymous order information and password; an anonymous order generating device (35) which is configured to generate anonymous order information including an order ID and a group signature, by the operation of a purchaser, when an order ID is received from the shop apparatus; an anonymous order sending device (35) which is configured to send obtained anonymous order information to the shop apparatus; a password writing device (35) which is configured to write a password received from the shop apparatus in response to the sending, by correlating with the anonymous order recent information, into the storage device; a request generating device (37) which is configured to generate a request including an order ID and password in the storage unit, by the operation of a purchaser; and a request sending device (37) which is configured to send an obtained request to the shop apparatus.

9. A program stored in a storage medium (M) readable from a computer used in a purchaser identity proving unit (50), which holds purchaser identity proving secret information written from a purchaser apparatus (30) configured to communicate with both of a manager apparatus (10) configured to pay for a purchaser's anonymous order by a group signature scheme having a tracing function, and a shop apparatus (20) for receiving an anonymous order for a sales object by the group signature scheme, comprising: a first program code (50) to cause the computer to execute writing of purchaser identity proving secret information to be input from the purchaser apparatus upon initial setting, into a storage unit (51) of a computer of the purchaser identity proving unit; a second program code (39) to be used independently of the purchaser apparatus, and to cause the computer to execute generation of zero knowledge proving information that purchaser identity proving secret information concerning one or more pieces of past order ID is common and that a purchaser knows it, based on purchaser identity proving secret information in the storage unit, when the purchaser apparatus receives an order ID from the shop apparatus, after the purchaser apparatus generates anonymous order information including the order ID, purchaser identity verifying information corresponding to the order ID and generated based on purchaser identity proving secret information unable to estimate, and a group signature, based on "a secret calculation value which is calculated from the purchaser identity proving secret information upon initial setting, and is held", and the purchaser apparatus sends the generated anonymous information to the shop apparatus, with respect to purchaser identity proving secret information which is itself unable to estimate from the manager apparatus and shop apparatus, and unable to estimate from the manger apparatus and shop apparatus even based on purchaser identity verifying information generated based on the purchaser identity proving secret information; a third program code (39) to cause the computer to execute generation of a request including the one or more pieces of order ID and zero knowledge proving information; and a fourth program code (39) to cause the computer to execute sending of an obtained request to "a purchaser identity verifying unit configured to obtain anonymous order information from the shop apparatus".

10. A program stored in a storage medium (M) readable from a computer used in a purchaser apparatus, which is configured to communicate with both of a manager apparatus (10) configured to pay for a purchaser's anonymous order by a group signature scheme having a tracing function, a shop apparatus (20) for receiving an anonymous order for a sales object by the group signature scheme, and a purchaser identity proving unit (5) for receiving the anonymously ordered sales object, and is configured to write the purchaser identity proving secret information into the purchaser identity proving unit upon initial setting, when the purchaser identity proving unit generates zero knowledge proving information that purchaser identity proving secret information concerning one or more pieces of past order ID is common and that a purchaser knows it, based on previously stored purchaser proving secret information, upon reception of the sales object, and sends a request including the one or more pieces of order ID and zero knowledge proving information to a "purchaser identity verifying unit configured to obtain anonymous order information from the shop apparatus", comprising: a first program code (38') which generates purchaser identity proving secret information upon the initial setting, and causes a computer of the purchaser apparatus to execute calculation of a secret calculation value from the purchaser identity proving secret information; a second program code (38') which writes the generated purchaser identity proving secret information into the purchaser identity proving unit, and causes the computer to execute writing of the calculated secret calculation value into a storage unit (31) of the computer; a third program code (35) which causes the computer to execute generation of anonymous order information including an order ID, purchaser identity verifying information and a group signature, based on a secret calculation value in the storage unit, when the order ID is received from the shop apparatus, by the operation of a purchaser; and a fourth program code (35) to cause the computer to execute sending of obtained anonymous order information to the shop apparatus.

11. A program which is stored in a storage medium (M) readable from a computer used in a purchaser identity verifying unit (60) configured to obtain anonymous order information from a shop apparatus (20) configured to communicate with both of a manager apparatus (10) configured to pay for a purchaser's anonymous order by a group signature scheme having a tracing function, and a purchaser apparatus (30) for making an anonymous order for a sales object by the group signature scheme, when "anonymous order information including an order ID, purchaser identity verifying information and a group signature" is received from the purchaser apparatus, after purchaser identity proving secret information corresponding to the order ID, purchaser identity verifying information generated based on the purchaser identity proving secret information corresponding to the order ID and unable to estimate, and a group signature based on the order ID and purchaser identity verifying information are generated by a purchaser apparatus in the past, with respect to purchaser identity proving secret information which is itself unable to estimate from the manager apparatus and shop apparatus, and unable to estimate from the manger apparatus and shop apparatus even based on purchaser identity verifying information generated based on the purchaser identity proving secret information, the shop apparatus stores the anonymous order information, issues an order ID based on sales object identifying information received from a purchaser apparatus of a purchaser, and sends the order ID to the purchaser apparatus, and when anonymous order information including the order ID, purchaser identity verifying information and group signature is received from the purchaser apparatus, the shop apparatus verifies the group signature, and when the result of verification is valid, stores anonymous order recent information, and sends anonymous order information to the manager apparatus, comprising: a first program code (62) to cause a computer of the purchaser identity verifying unit to execute reading of one or more pieces of anonymous order information corresponding to "one or more past order ID" input after the anonymous order, with respect to a purchaser identity proving unit, into which the purchaser apparatus writes purchaser proving secret information upon initial setting; a second program code (62) to cause the computer to execute writing of one or more pieces of anonymous order information read from the shop apparatus into a storing unit (61) of the computer; a third program code (29) to cause the computer to execute acceptance of a request including "one or more past order ID" and "zero knowledge proving information that purchaser identity proving secret information corresponding to the one or more order ID is common and that a purchaser knows it" from the purchaser identity proving unit; a fourth program code (29) to cause the computer to execute verification of the zero knowledge proving information, based on one or more pieces of purchaser identity verifying information included in one or more pieces of anonymous order information in the storing unit, upon acceptance of the request; and a fifth program code (29) to cause the computer to execute acceptance of the request, when the result of verifying the zero knowledge proving information is valid.

What is claimed is:

1. A shop apparatus configured to communicate with both of a manager apparatus configured to pay for a purchaser's anonymous order by a group signature scheme having a tracing function, and a purchaser apparatus for making an anonymous order for a sales object by the group signature scheme, the shop apparatus comprising:

a storage device configured to store anonymous order information received from the purchaser apparatus to provide an unlinkable order, the anonymous order information including:

purchaser identity proving secret information that is a secret value corresponding to an order ID, that is specific to the anonymous order, and that cannot be estimated by the manager apparatus and the shop apparatus, purchaser identity verifying information that is based on the purchaser identity proving information, wherein the purchaser identity proving information cannot be estimated by the manager apparatus and the shop apparatus even based on the purchaser identity verifying information, and a group signature that is based on the order ID and the purchaser identity verifying information;

an order ID issuing device which is configured to issue an order ID based on sales object identifying information received from the purchaser apparatus of the purchaser, and to send the order ID to the purchaser apparatus;

a signature verifying device configured to verify a group signature, when the anonymous order information is received from a purchaser apparatus;

an anonymous order information writing device configured to write the anonymous order information into the storage device when the result of verifying the group signature is valid;

an anonymous order sending device configured to send anonymous order information to the manager apparatus;

a retrieving device configured to:

in response to a first request from the purchaser apparatus, retrieve purchaser identity verifying information concerning a past order ID from the storage device to cancel unlinkability for the past order ID including the past order ID and first zero knowledge proving information indicating the purchaser knows the purchaser identity proving secret information corresponding to the past order ID;

a zero knowledge verifying device configured to verify the zero knowledge proving information, based on the retrieved purchaser identity verifying information; and a request accepting device configured to accept the first request, when the result of verifying the zero knowledge proving information is valid.

2. The shop apparatus according to claim 1, wherein the retrieving device is configured to retrieve one or more pieces of the purchaser identity verifying information concerning one or more pieces of past order ID from the storage device when a second request including the one or more pieces of past order ID and second zero knowledge proving information indicating that the purchaser identity proving secret information corresponding to the one or more pieces of past order ID is common and that the purchaser knows the purchaser identity proving secret information is received from the purchaser apparatus to cancel unlinkability for the one or more pieces of past order ID; and the zero knowledge verifying device is configured to verify the second zero knowledge proving information based on the retrieved one or more pieces of purchaser identity verifying information.

3. A purchaser apparatus configured to communicate with both of a manager apparatus configured to pay for a purchaser's anonymous order by a group signature scheme having a tracing function, and a shop apparatus configured to receive an anonymous order for a sales object by the group signature scheme, the purchaser apparatus comprising:

an anonymous order generating device configured to generate anonymous order information to provide an unlinkable order in response to receiving an order ID from the shop apparatus, the anonymous order information including:

purchaser identity proving secret information that is a secret value corresponding to the order ID, that is specific to the anonymous order, and that cannot be estimated by the manager apparatus and the shop apparatus, purchaser identity verifying information that is based on the purchaser identity proving secret information, wherein the purchaser identity proving secret information cannot be estimated by the manager apparatus and the shop apparatus even based on the purchaser identity verifying information, and a group signature that is based on the order ID and the purchaser identity verifying information;

a storage device configured to store past anonymous order information and purchaser identity proving secret information correlated with each other, the past anonymous order information including the order ID, the purchaser identity verifying information corresponding to the order ID, and the group signature;

an anonymous order sending device configured to send the generated anonymous order information to the shop apparatus;

a retrieving device configured to retrieve the purchaser identity proving secret information concerning a past order ID from the storage device, by the operation of the purchaser;

a zero knowledge proof generating device configured to generate zero knowledge proving information indicating that the purchaser knows the purchaser identity proving secret information corresponding to the past order ID;

a request generating device configured to generate a first request to cancel unlinkability for the past order ID including the past order ID and the first zero knowledge proving information, by the operation of the purchaser; and a request sending device configured to send the first request to the shop apparatus.

4. The purchaser apparatus according to claim 3, wherein
the retrieving device is configured to retrieve common purchaser identity proving secret information concerning one or more pieces of past order ID from the storage device, by the operation of the purchaser;

the zero knowledge proving device is configured to generate second zero knowledge proving information indicating that the purchaser identity proving secret information corresponding to the one or more pieces of past order ID is common and that the purchaser knows the purchaser identity proving secret information based on the retrieved purchaser identity proving secret information; and the request generating device generates a second request including the one or more pieces of past order ID and the second zero knowledge proving information, by the operation of the purchaser, to cancel unlinkability for the one or more pieces of past order ID.

* * * * *